(12) United States Patent
Lee et al.

(10) Patent No.: US 11,743,452 B2
(45) Date of Patent: Aug. 29, 2023

(54) VIDEO ENCODING/DECODING METHOD AND DEVICE, AND RECORDING MEDIUM FOR STORING BITSTREAM

(71) Applicants: Electronics and Telecommunications Research Institute, Daejeon (KR); HANBAT NATIONAL UNIVERSITY INDUSTRY-ACADEMIC COOPERATION FOUNDATION, Daejeon (KR)

(72) Inventors: Ha Hyun Lee, Seoul (KR); Jung Won Kang, Daejeon (KR); Sung Chang Lim, Daejeon (KR); Jin Ho Lee, Daejeon (KR); Hui Yong Kim, Daejeon (KR); Hae Chul Choi, Daejeon (KR); Aram Back, Daejeon (KR); Dae Hyeok Gwon, Daejeon (KR)

(73) Assignees: Electronics and Telecommunications Research Institute, Daejeon (KR); HANBAT NATIONAL UNIVERSITY INDUSTRY-ACADEMIC COOPERATION FOUNDATION, Daejeon (KR)

(*) Notice: Subject to any disclaimer, the term of this patent is extended or adjusted under 35 U.S.C. 154(b) by 0 days.

(21) Appl. No.: 17/273,119

(22) PCT Filed: Sep. 3, 2019

(86) PCT No.: PCT/KR2019/011351
§ 371 (c)(1),
(2) Date: Mar. 3, 2021

(87) PCT Pub. No.: WO2020/050600
PCT Pub. Date: Mar. 12, 2020

(65) Prior Publication Data
US 2021/0297658 A1    Sep. 23, 2021

(30) Foreign Application Priority Data

Sep. 3, 2018    (KR) .................. 10-2018-0104628
Sep. 3, 2018    (KR) .................. 10-2018-0104629
Jun. 21, 2019   (KR) .................. 10-2019-0073815

(51) Int. Cl.
  *H04N 19/105*    (2014.01)
  *H04N 19/70*     (2014.01)
  (Continued)

(52) U.S. Cl.
  CPC ........ *H04N 19/105* (2014.11); *H04N 19/117* (2014.11); *H04N 19/159* (2014.11);
  (Continued)

(58) Field of Classification Search
  CPC .. H04N 19/105; H04N 19/117; H04N 19/159; H04N 19/176; H04N 19/70;
  (Continued)

(56) References Cited

U.S. PATENT DOCUMENTS

2016/0337649 A1    11/2016   Chuang et al.
2017/0374369 A1*   12/2017   Chuang .................. H04N 19/70
(Continued)

FOREIGN PATENT DOCUMENTS

KR    101561461 B1 *  10/2015
KR    101561461 B1    10/2015
(Continued)

*Primary Examiner* — Joseph W Becker
(74) *Attorney, Agent, or Firm* — William Park & Associates Ltd.

(57) ABSTRACT

An image encoding/decoding method is disclosed. Present invention of the method of decoding an image comprises determining a prediction mode for a current block and performing prediction on the current block on the basis of the determined prediction mode.

9 Claims, 39 Drawing Sheets

(51) Int. Cl.
*H04N 19/117* (2014.01)
*H04N 19/159* (2014.01)
*H04N 19/176* (2014.01)
*H04N 19/82* (2014.01)

(52) U.S. Cl.
CPC ........... *H04N 19/176* (2014.11); *H04N 19/70* (2014.11); *H04N 19/82* (2014.11)

(58) Field of Classification Search
CPC .... H04N 19/82; H04N 19/184; H04N 19/593; H04N 19/11
See application file for complete search history.

(56) References Cited

U.S. PATENT DOCUMENTS

2018/0098074 A1 4/2018 Heo et al.
2018/0098089 A1 4/2018 Chen et al.

FOREIGN PATENT DOCUMENTS

| KR | 1020170126918 A | | 11/2017 | |
|----|-----------------|---|---------|------------|
| KR | 20180057727 A | * | 5/2018 | ........... H04N 19/174 |
| KR | 1020180044969 A | | 5/2018 | |
| KR | 1020180057727 A | | 5/2018 | |
| KR | 20180059444 A | * | 6/2018 | ............. H04N 19/51 |
| KR | 1020180059444 A | | 6/2018 | |
| WO | 2013058520 A1 | | 4/2013 | |
| WO | 2017041676 A1 | | 3/2017 | |
| WO | 2017052009 A1 | | 3/2017 | |

* cited by examiner

FIG. 12

| MPM List | |
|---|---|
| $MPM_1$ | ∠ 3.25 |
| $MPM_2$ | ∠ 7.75 |
| $MPM_3$ (Angular_average) | ∠ 5.5 |
| $MPM_4$ | ∠ 3.5 |

| Intra prediction mode of spatially neighboring block | |
|---|---|
| Top block mode | 15 |
| Top right block mode | 15 |
| Left block mode | 25 |
| Top left block mode | 27 |
| Bottom left block mode | 22 |
| Intra prediction mode of temporally neighboring block | |
| Temporally neighboring block mode | 15 |
| Propagated intra prediction mode | |
| Propagated intra prediction mode | 12 |

| MPM List | |
|---|---|
| $MPM_1$ | 25 |
| $MPM_2$ | 15 |
| $MPM_3$ | 27 |
| $MPM_4$ | 22 |
| $MPM_5$ | 20 |
| ... | ... |

FIG. 14

| Intra prediction mode of spatially neighboring block | |
|---|---|
| Top block mode | ∠14.5 |
| Top right block mode | ∠17.5 |
| Left block mode | ∠14.5 |
| Top left block mode | ∠14.5 |
| Bottom left block mode | ∠127.25 |
| Intra prediction mode of temporally neighboring block | |
| Temporally neighboring block mode | ∠135.5 |
| Propagated intra prediction mode | |
| Propagated intra prediction mode | ∠90.25 |

| MPM List | |
|---|---|
| $MPM_1$ | ∠14.5 |
| $MPM_2$ | ∠17.75 |
| $MPM_3$ | ∠127.25 |
| $MPM_4$ | ∠135.75 |
| $MPM_5$ (Angular_average) | ∠15.25 |
| $MPM_6$ (Angular_average) | ∠130.0 |
| ... | ... |

FIG. 15

| Intra prediction mode obtained from neighboring blocks for MPM list construction | |
|---|---|
| 1st Intra mode | 15 |
| 2nd Intra mode | 25 |
| 3rd Intra mode | 27 |
| 4th Intra mode | 22 |
| 5th Intra mode | 26 |
| 6th Intra mode | 22 |
| 7th Intra mode | 21 |
| ... | ... |

| MPM List | |
|---|---|
| $MPM_1$ | 15 |
| $MPM_2$ | 25 |
| $MPM_3$ | 27 |
| $MPM_4$ | 22 |
| $MPM_5$ | 26 |
| ... | ... |

→

| MPM List | |
|---|---|
| $MPM_1$ | 15 |
| $MPM_2$ | 25 |
| $MPM_3$ | 22 |
| $MPM_4$ | 27 |
| $MPM_5$ | 26 |
| ... | ... |

FIG. 31

```
If candIntraPredModeB is equal to candIntraPredModeA and candIntraPredModeA is greater than INTRA_DC,
candModeList[ x ] with x = 0..4 is derived as follows:
    candModeList[ 0 ] = candIntraPredModeA
    candModeList[ 1 ] = 2 + ( ( candIntraPredModeA + 61 ) % 64 )
    candModeList[ 2 ] = 2 + ( ( candIntraPredModeA − 1 ) % 64 )
    candModeList[ 3 ] = INTRA_DC
    candModeList[ 4 ] = 2 + ( ( candIntraPredModeA + 60 ) % 64 )
Otherwise if candIntraPredModeB is not equal to candIntraPredModeA and candIntraPredModeA or
candIntraPredModeB is greater than INTRA_DC, the following applies:
    The variables minAB and maxAB are derived as follows:
        minAB = Min( candIntraPredModeA, candIntraPredModeB )
        maxAB = Max( candIntraPredModeA, candIntraPredModeB )
    If candIntraPredModeA and candIntraPredModeB are both greater than INTRA_DC, candModeList[ x ]
    with x = 0..4 is derived as follows:
        candModeList[ 0 ] = candIntraPredModeA
        candModeList[ 1 ] = candIntraPredModeB
        candModeList[ 2 ] = INTRA_DC
        If maxAB − minAB is in the range of 2 to 62, inclusive, the following applies:
            candModeList[ 3 ] = 2 + ( ( maxAB + 61 ) % 64 )
            candModeList[ 4 ] = 2 + ( ( maxAB − 1 ) % 64 )
        Otherwise, the following applies:
            candModeList[ 3 ] = 2 + ( ( maxAB + 60 ) % 64 )
            candModeList[ 4 ] = 2 + ( ( maxAB ) % 64 )
    Otherwise (candIntraPredModeA or candIntraPredModeB is greater than INTRA_DC),
    candModeList[ x ] with x = 0..4 is derived as follows:
        candModeList[ 0 ] = maxAB
        candModeList[ 1 ] = INTRA_DC
        candModeList[ 2 ] = 2 + ( ( maxAB + 61 ) % 64 )
        candModeList[ 3 ] = 2 + ( ( maxAB − 1 ) % 64 )
        candModeList[ 4 ] = 2 + ( ( maxAB + 60 ) % 64 )
Otherwise, the following applies:
    candModeList[ 0 ] = INTRA_DC
    candModeList[ 1 ] = INTRA_ANGULAR50
    candModeList[ 2 ] = INTRA_ANGULAR18
    candModeList[ 3 ] = INTRA_ANGULAR46
    candModeList[ 4 ] = INTRA_ANGULAR54
```

FIG. 33

```
If candIntraPredModeA and candIntraPredModeB are not greater than INTRA_DC,
candModeList[ x ] with x = 0..4 is derived as follows:
   candModeList[ 0 ] = INTRA_DC
   candModeList[ 1 ] = INTRA_ANGULAR50
   candModeList[ 2 ] = INTRA_ANGULAR18
   candModeList[ 3 ] = INTRA_ANGULAR46
   candModeList[ 4 ] = INTRA_ANGULAR54
Otherwise, the following applies:
   The variables minAB and maxAB are derived as follows:
      minAB = Min( candIntraPredModeA, candIntraPredModeB )
      maxAB = Max( candIntraPredModeA, candIntraPredModeB )
   If candIntraPredModeB is not equal to candIntraPredModeA and candIntraPredModeB and
   candIntraPredModeA are greater than INTRA_DC, the following applies:
      candModeList[ 0 ] = candIntraPredModeA
      candModeList[ 1 ] = candIntraPredModeB
      candModeList[ 2 ] = INTRA_DC
      If maxAB − minAB is in the range of 2 to 62, inclusive, the following applies:
         candModeList[ 3 ] = 2 + ( ( maxAB + 61 ) % 64 )
         candModeList[ 4 ] = 2 + ( ( maxAB − 1 ) % 64 )
      Otherwise, the following applies:
         candModeList[ 3 ] = 2 + ( ( maxAB + 60 ) % 64 )
         candModeList[ 4 ] = 2 + ( ( maxAB ) % 64 )
   Otherwise, the following applies:
      candModeList[ 0 ] = maxAB
      candModeList[ 1 ] = INTRA_DC
      candModeList[ 2 ] = 2 + ( ( maxAB + 61 ) % 64 )
      candModeList[ 3 ] = 2 + ( ( maxAB − 1 ) % 64 )
      candModeList[ 4 ] = 2 + ( ( maxAB + 60 ) % 64 )
```

FIG. 35

```
CategoryIDX = (candIntraPredModeA > INTRA_DC) + (candIntraPredModeB > INTRA_DC)
if CategoryIDX is equal to 0, candModeList[ x ] with x = 0..4 is derived as follows:
    candModeList[ 0 ] = INTRA_DC
    candModeList[ 1 ] = INTRA_ANGULAR50
    candModeList[ 2 ] = INTRA_ANGULAR18
    candModeList[ 3 ] = INTRA_ANGULAR46
    candModeList[ 4 ] = INTRA_ANGULAR54
Otherwise, the following applies:
    CategoryIDX = CategoryIDX - (candIntraPredModeA == candIntraPredModeB)
    The variables minAB and maxAB are derived as follows:
        minAB = Min( candIntraPredModeA, candIntraPredModeB )
        maxAB = Max( candIntraPredModeA, candIntraPredModeB )
    if CategoryIDX is equal to 0, candModeList[ x ] with x = 0..4 is derived as follows:
        candModeList[ 0 ] = maxAB
        candModeList[ 1 ] = INTRA_DC
        candModeList[ 2 ] = 2 + ( ( maxAB + 61 ) % 64 )
        candModeList[ 3 ] = 2 + ( ( maxAB - 1 ) % 64 )
        candModeList[ 4 ] = 2 + ( ( maxAB + 60 ) % 64 )
    Otherwise, the following applies:
        candModeList[ 0 ] = candIntraPredModeA
        candModeList[ 1 ] = candIntraPredModeB
        candModeList[ 2 ] = INTRA_DC
        If maxAB - minAB is in the range of 2 to 62, inclusive, the following applies:
            candModeList[ 3 ] = 2 + ( ( maxAB + 61 ) % 64 )
            candModeList[ 4 ] = 2 + ( ( maxAB - 1 ) % 64 )
        Otherwise, the following applies:
            candModeList[ 3 ] = 2 + ( ( maxAB + 60 ) % 64 )
            candModeList[ 4 ] = 2 + ( ( maxAB ) % 64 )
```

FIG. 36

```
numIntraAngular = candIntraPredModeA > INTRA_DC + candIntraPredModeB > INTRA_DC
If numIntraAngular is equal to 0, candModeList[ x ] with x = 0..4 is derived as follows: (조건1)
      candModeList[ 0 ] = INTRA_DC
      candModeList[ 1 ] = INTRA_ANGULAR50
      candModeList[ 2 ] = INTRA_ANGULAR18
      candModeList[ 3 ] = INTRA_ANGULAR46
      candModeList[ 4 ] = INTRA_ANGULAR54
Otherwise, the following applies:
      The variables minAB and maxAB are derived as follows:
            minAB = Min( candIntraPredModeA, candIntraPredModeB )
            maxAB = Max( candIntraPredModeA, candIntraPredModeB )
      If numIntraAngular is equal to 2 and candIntraPredModeB is not equal to candIntraPredModeA,
      the following applies: (조건2)
            candModeList[ 0 ] = candIntraPredModeA
            candModeList[ 1 ] = candIntraPredModeB
            If maxAB - minAB is equal to 1, inclusive, the following applies:
                  candModeList[ 2 ] = 2 + ( ( minAB + 61 ) % 64 )
                  candModeList[ 3 ] = 2 + ( ( maxAB - 1 ) % 64 )
                  candModeList[ 4 ] = 2 + ( ( minAB + 60 ) % 64 )
            Otherwise, if maxAB - minAB is greater than or equal to 62, the following applies:
                  candModeList[ 2 ] = 2 + ( ( minAB - 1 ) % 64 )
                  candModeList[ 3 ] = 2 + ( ( maxAB + 61) % 64 )
                  candModeList[ 4 ] = 2 + ( minAB % 64 )
            Otherwise, if maxAB - minAB is equal to 2, the following applies:
                  candModeList[ 2 ] = 2 + ( ( minAB - 1 ) % 64 )
                  candModeList[ 3 ] = 2 + ( ( minAB + 61) % 64 )
                  candModeList[ 4 ] = 2 + ( ( maxAB - 1 ) % 64 )
            Otherwise, the following applies:
                  candModeList[ 2 ] = 2 + ( ( minAB + 61 ) % 64 )
                  candModeList[ 3 ] = 2 + ( ( minAB - 1) % 64 )
                  candModeList[ 4 ] = 2 + ( ( maxAB + 61 ) % 64 )
      Otherwise, the following applies:
            candModeList[ 0 ] = maxAB
            candModeList[ 1 ] = 2 + ( ( maxAB + 61 ) % 64 )
            candModeList[ 2 ] = 2 + ( ( maxAB - 1 ) % 64 )
            candModeList[ 3 ] = 2 + ( ( maxAB + 60 ) % 64 )
            candModeList[ 4 ] = 2 + ( ( maxAB ) % 64 )
```

FIG. 38

```
numIntraAngular = candIntraPredModeA > INTRA_DC + candIntraPredModeB > INTRA_DC
If numIntraAngular is equal to 0, candModeList[ x ] with x = 0..4 is derived as follows:
    candModeList[ 0 ] = INTRA_DC
    candModeList[ 1 ] = INTRA_ANGULAR50
    candModeList[ 2 ] = INTRA_ANGULAR18
    candModeList[ 3 ] = INTRA_ANGULAR46
    candModeList[ 4 ] = INTRA_ANGULAR54
Otherwise, the following applies:
    The variables minAB and maxAB are derived as follows:
        minAB = Min( candIntraPredModeA, candIntraPredModeB )
        maxAB = Max( candIntraPredModeA, candIntraPredModeB )
    If numIntraAngular is equal to 2 and candIntraPredModeB is not equal to candIntraPredModeA,
    the following applies:
        candModeList[ 0 ] = candIntraPredModeA
        candModeList[ 1 ] = candIntraPredModeB
        If maxAB - minAB is greater than 1 and is less than 62, the following applies:
            candModeList[ 2 ] = 2 + ( ( minAB - 1 ) % 64 )
            candModeList[ 3 ] = 2 + ( ( minAB + 61 ) % 64 )
            candModeList[ 4 ] = 2 + ( ( maxAB - 1 ) % 64 )
        Otherwise,
            candModeList[ 2 ] = 2 + ( ( minAB + 59 ) % 64 )
            candModeList[ 3 ] = 2 + ( ( maxAB + 56) % 64 )
            candModeList[ 4 ] = 2 + ( ( maxAB + 57) % 64 )
    Otherwise, the following applies:
        candModeList[ 0 ] = maxAB
        candModeList[ 1 ] = 2 + ( ( maxAB + 61 ) % 64 )
        candModeList[ 2 ] = 2 + ( ( maxAB - 1 ) % 64 )
        candModeList[ 3 ] = 2 + ( ( maxAB + 60 ) % 64 )
        candModeList[ 4 ] = 2 + ( ( maxAB ) % 64 )
```

FIG. 40

```
numIntraAngular = candIntraPredModeA > INTRA_DC + candIntraPredModeB > INTRA_DC
If numIntraAngular is equal to 0, candModeList[ x ] with x = 0..4 is derived as follows: (조건1)
        candModeList[ 0 ] = INTRA_DC
        candModeList[ 1 ] = INTRA_ANGULAR50
        candModeList[ 2 ] = INTRA_ANGULAR18
        candModeList[ 3 ] = INTRA_ANGULAR46
        candModeList[ 4 ] = INTRA_ANGULAR54
Otherwise, the following applies:
    The variables minAB and maxAB are derived as follows:
        minAB = Min( candIntraPredModeA, candIntraPredModeB )
        maxAB = Max( candIntraPredModeA, candIntraPredModeB )
    If numIntraAngular is equal to 2 and candIntraPredModeB is not equal to candIntraPredModeA,
    the following applies: (조건2)
        candModeList[ 0 ] = candIntraPredModeA
        candModeList[ 1 ] = candIntraPredModeB
        If maxAB - minAB is greater than 3, inclusive, the following applies:
            candModeList[ 2 ] = 2 + ( ( minAB - 1 ) % 64 )
            candModeList[ 3 ] = 2 + ( ( maxAB + 61 ) % 64 )
            candModeList[ 4 ] = 2 + ( minAB % 64 )
        Otherwise,
            candModeList[ 2 ] = 2 + ( ( minAB + 61 ) % 64 )
            candModeList[ 3 ] = 2 + ( ( maxAB - 1 ) % 64 )
            candModeList[ 4 ] = 2 + ( (minAB + 60) % 64 )
    Otherwise, the following applies:
        candModeList[ 0 ] = maxAB
        candModeList[ 1 ] = 2 + ( ( maxAB + 61 ) % 64 )
        candModeList[ 2 ] = 2 + ( ( maxAB - 1 ) % 64 )
        candModeList[ 3 ] = 2 + ( ( maxAB + 60 ) % 64 )
        candModeList[ 4 ] = 2 + ( ( maxAB ) % 64 )
```

VIDEO ENCODING/DECODING METHOD AND DEVICE, AND RECORDING MEDIUM FOR STORING BITSTREAM

TECHNICAL FIELD

The present invention relates to a method and an apparatus for encoding/decoding an image. More particularly, the present invention relates to a method and an apparatus for encoding/decoding an image on the basis of an intra prediction mode and a syntax element merge mode.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency, etc. Image data may be effectively compressed by using such image compression technology, and may be transmitted or stored.

DISCLOSURE

Technical Problem

An objective of the present invention is to provide an image encoding/decoding method and apparatus capable of improving compression efficiency, and a recording medium in which a bitstream generated by the method or apparatus is stored.

Another objective of the present invention is to provide an image encoding/decoding method and apparatus capable of improving compression efficiency by using intra prediction mode, and a recording medium in which a bitstream generated by the method or apparatus is stored.

A further object of the present invention is to provide an image encoding/decoding method and apparatus capable of improving compression efficiency by using syntax element merge mode, and a recording medium in which a bitstream generated by the method or apparatus is stored.

Technical Solution

According to the present invention, a video decoding method comprises determining a prediction mode for a current block and performing prediction on the current block on the basis of the determined prediction mode.

In the video decoding method, wherein when the prediction mode for the current block is determined to be an intra prediction mode, the performing of the prediction on the current block on the basis of the determined prediction mode includes deriving a first MPM group and a second MPM group for deriving the intra prediction mode of the current block, determining whether the intra prediction mode of the current block is included in at least one among the first MPM group and the second MPM group and determining the intra prediction mode for the current block by using the first MPM group and the second MPM group.

In the video decoding method, the method further comprises deriving an MPM group indicator for the current block when the intra prediction mode of the current block is included in at least one among the first MPM group and the second MPM group, wherein the MPM group indicator indicates, among the first MPM group and the second MPM group, the MPM group that includes the intra prediction mode of the current block.

In the video decoding method, wherein the first MPM group includes a planar mode.

In the video decoding method, the method further comprises deriving an MPM indicator of the current block when the MPM group indicator indicates the second MPM group and determining the intra prediction mode of the current block by using the second MPM group and the MPM indicator, wherein the MPM indicator indicates, among MPMs included in the second MPM group, the MPM that is the same as the intra prediction mode of the current block.

In the video decoding method, the method further comprises deriving an MPM-excluded intra prediction mode indicator for the current block when the intra prediction mode of the current block is not included in at least one among the first MPM group and the second MPM group and determining the intra prediction mode of the current block by using the MPM-excluded intra prediction mode indicator, wherein the MPM-excluded intra prediction mode indicator indicates one of the intra prediction modes excluding MPMs that are included in the first MPM group and the second MPM group among all the intra prediction modes.

In the video decoding method, wherein when the prediction mode for the current block is determined to be an inter prediction mode, the performing of the prediction on the current block on the basis of the determined prediction mode includes determining whether a syntax element merge mode for the current block is applied, determining a syntax element merge reference block of the current block and deriving encoding information of the current block from the syntax element merge reference block, wherein the encoding information of the current block includes at least one among partitioning-related encoding information, prediction-related encoding information, and transform-related encoding information.

In the video decoding method, wherein the prediction-related encoding information of the current block includes information on an adaptive motion vector resolution of the current block.

In the video decoding method, wherein the information on the adaptive motion vector resolution includes an interpolation filter index used to determine an interpolation filter coefficient for the current block.

In the video decoding method, wherein the syntax element merge reference block is determined to be at least one among a top left neighboring block, a top neighboring block, a top right neighboring block, a bottom left neighboring block, a bottom neighboring block, and a temporally corresponding block.

According to the present invention, a video encoding method comprises determining a prediction mode for a current block and performing prediction on the current block on the basis of the determined prediction mode.

In the video encoding method, wherein when the prediction mode for the current block is determined to be an intra prediction mode, the performing of the prediction on the current block on the basis of the determined prediction mode includes determining the intra prediction mode of the current block, deriving a first MPM group and a second MPM group of the current block and determining whether the intra prediction mode of the current block is included in at least one among the first MPM group and the second MPM group.

In the video encoding method, the method further comprises encoding an MPM group indicator for the current block when the intra prediction mode of the current block is included in at least one among the first MPM group and the second MPM group, wherein the MPM group indicator indicates, among the first MPM group and the second MPM group, the MPM group that includes the intra prediction mode of the current block.

In the video encoding method, wherein the first MPM group includes a planar mode.

In the video encoding method, the method further comprises encoding an MPM indicator of the current block when the MPM group indicator indicates the second MPM group, wherein the MPM indicator indicates, among MPMs included in the second MPM group, the MPM that is the same as the intra prediction mode of the current block.

In the video encoding method, the method further comprises encoding an MPM-excluded intra prediction mode indicator for the current block when the intra prediction mode of the current block is not included in at least one among the first MPM group and the second MPM group, wherein the MPM-excluded intra prediction mode indicator indicates one of the intra prediction modes excluding MPMs that are included in the first MPM group and the second MPM group among all the intra prediction modes.

In the video encoding method, wherein when the prediction mode for the current block is determined to be an inter prediction mode, the performing of the prediction on the current block on the basis of the determined prediction mode includes determining encoding information for the current block, determining whether a syntax element merge mode for the current block is applied, determining a syntax element merge reference block of the current block and encoding a syntax element merge index of the current block by using the syntax element merge reference block and the encoding information, wherein the encoding information of the current block includes at least one among partitioning-related encoding information, prediction-related encoding information, and transform-related encoding information.

In the video encoding method, wherein the prediction-related encoding information of the current block includes information on an adaptive motion vector resolution of the current block.

In the video encoding method, wherein the information on the adaptive motion vector resolution includes an interpolation filter index used to determine an interpolation filter coefficient for the current block.

According to the present invention, a computer-readable recording medium storing a bitstream that is received by an apparatus for decoding an image and is used to reconstruct a current block included in a current picture, wherein the bitstream includes information on a prediction mode of the current block, the information on the prediction mode is used to determine the prediction mode of the current block, and the determined prediction mode is used to perform prediction on the current block.

Advantageous Effects

According to the present invention, it is possible to provide an image encoding/decoding method and apparatus capable of improving compression efficiency and to provide a recording medium in which a bitstream generated by the method or apparatus is stored.

In addition, according to the present invention, it is possible to provide an image encoding/decoding method and apparatus capable of improving compression efficiency by using intra prediction mode and a recording medium in which a bitstream generated by the method or apparatus is stored.

In addition, according to the present invention, it is possible to provide an image encoding/decoding method and apparatus capable of improving compression efficiency by using syntax element merge mode and a recording medium in which a bitstream generated by the method or apparatus is stored.

DESCRIPTION OF DRAWINGS

FIG. 10 is a diagram illustrating an encoding or decoding method using an intra prediction mode according to an embodiment of the present invention.

FIGS. 11 to 19 are diagrams illustrating a method of deriving an MPM or an MPM list according to several embodiments of the present invention.

FIG. 31 is a diagram illustrating a syntax structure according to an embodiment of the present invention.

FIG. 33 is a diagram illustrating a syntax structure according to another embodiment of the present invention.

FIG. 35 is a diagram illustrating a syntax structure according to still another embodiment of the present invention.

FIG. 36 is a diagram illustrating a syntax structure according to still another embodiment of the present invention.

FIG. 38 is a diagram illustrating a syntax structure according to still another embodiment of the present invention.

FIG. 40 is a diagram illustrating a syntax structure according to still another embodiment of the present invention.

BEST MODE

Figure 1:
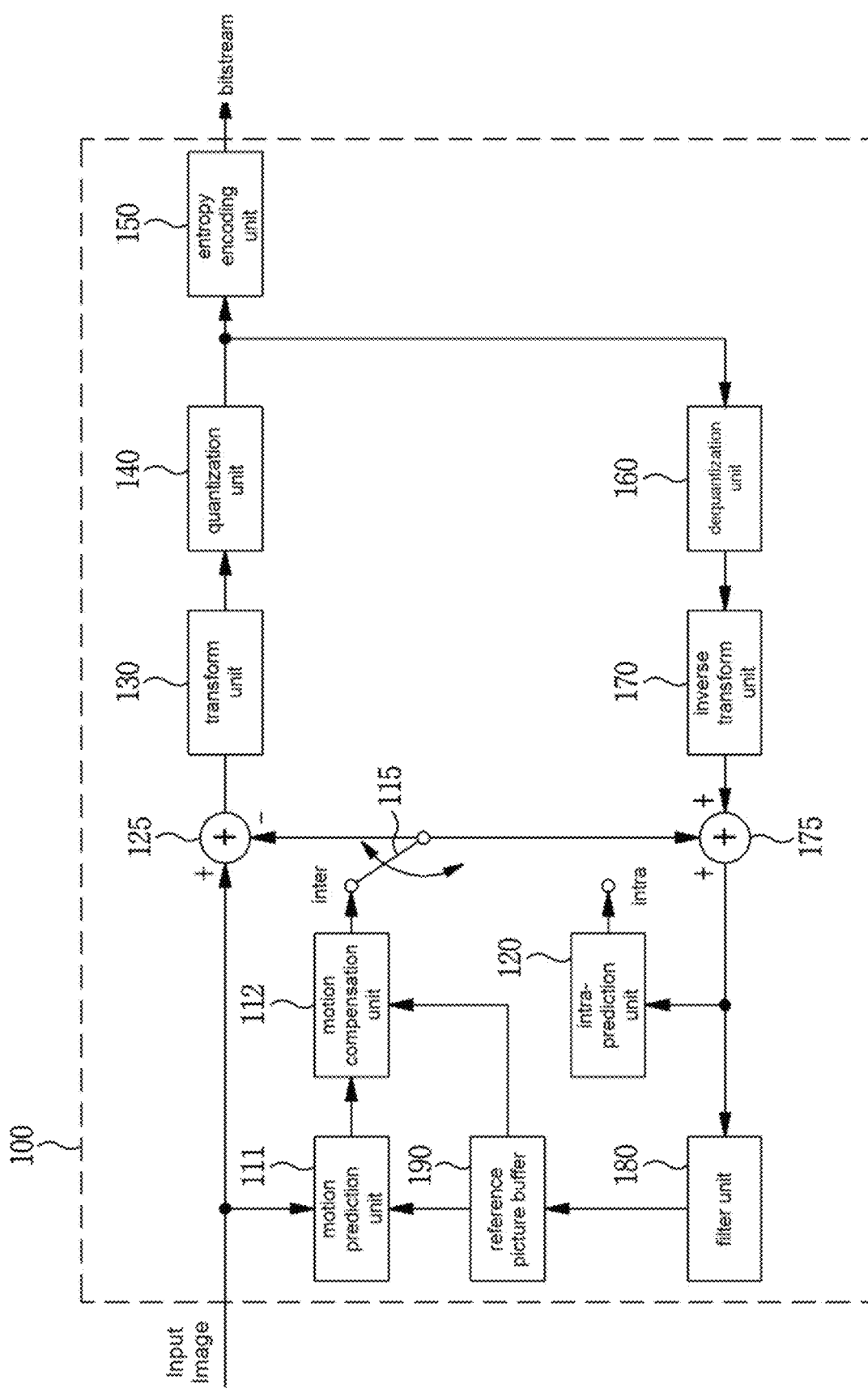
FIG. 1 is a view of a block diagram showing a configuration of an encoding apparatus to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/ minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture in a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best 23 matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
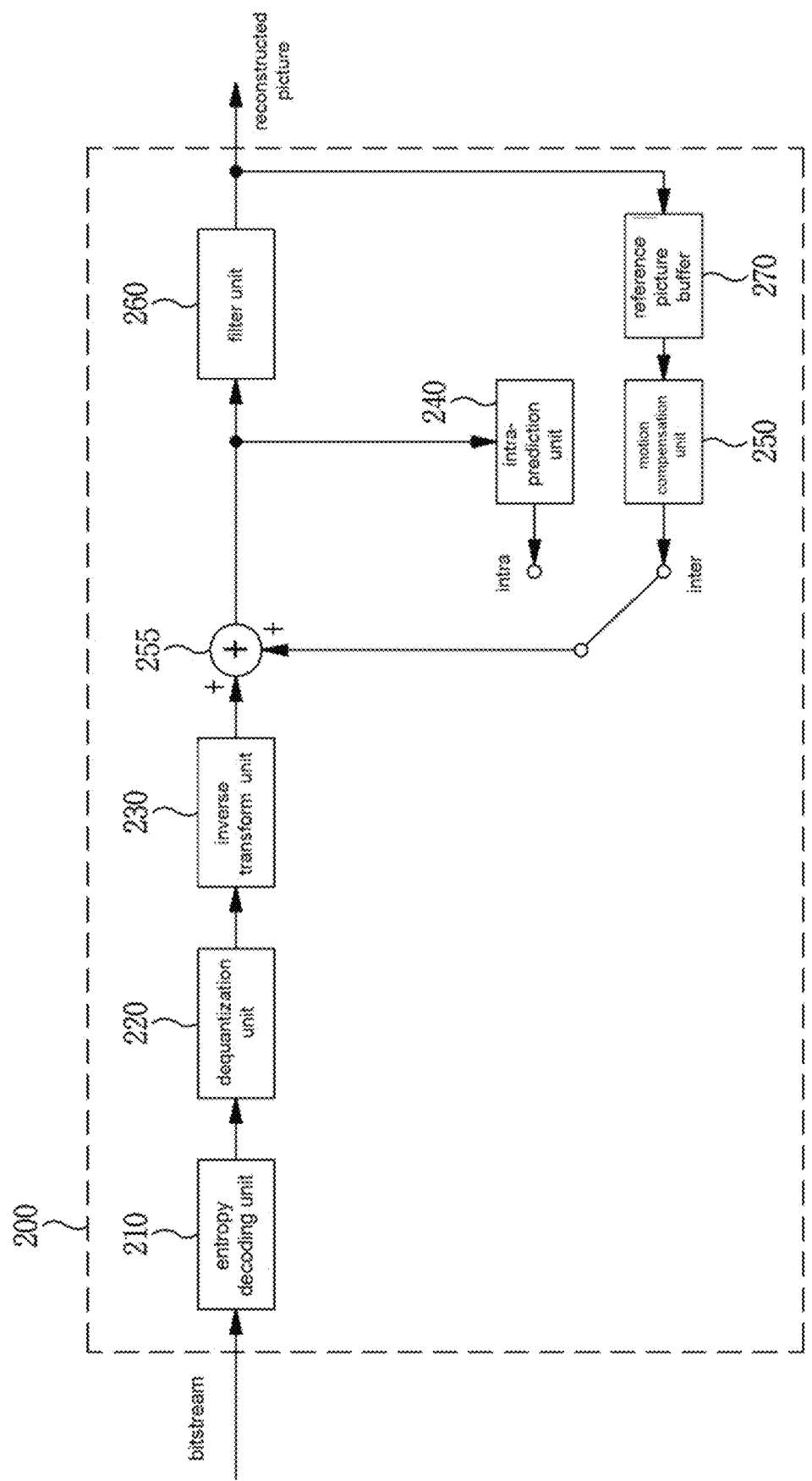
FIG. 2 is a view of a block diagram showing a configuration of a decoding apparatus to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
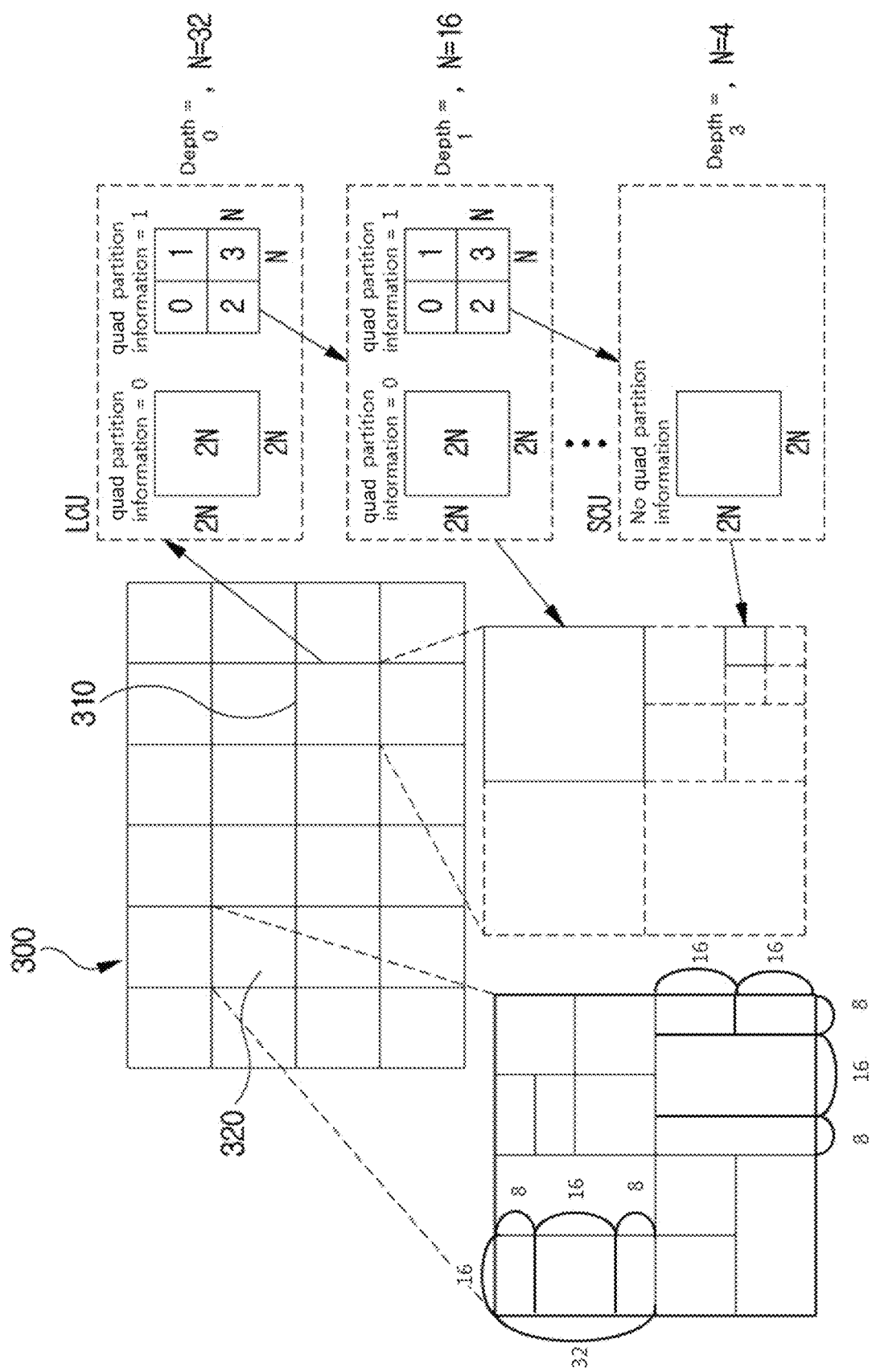
FIG. 3 is a view schematically showing a partition structure when encoding and decoding an image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N⇐64) Binary tree partitioning in horizontal direction for coding units

N×128 (N⇐64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
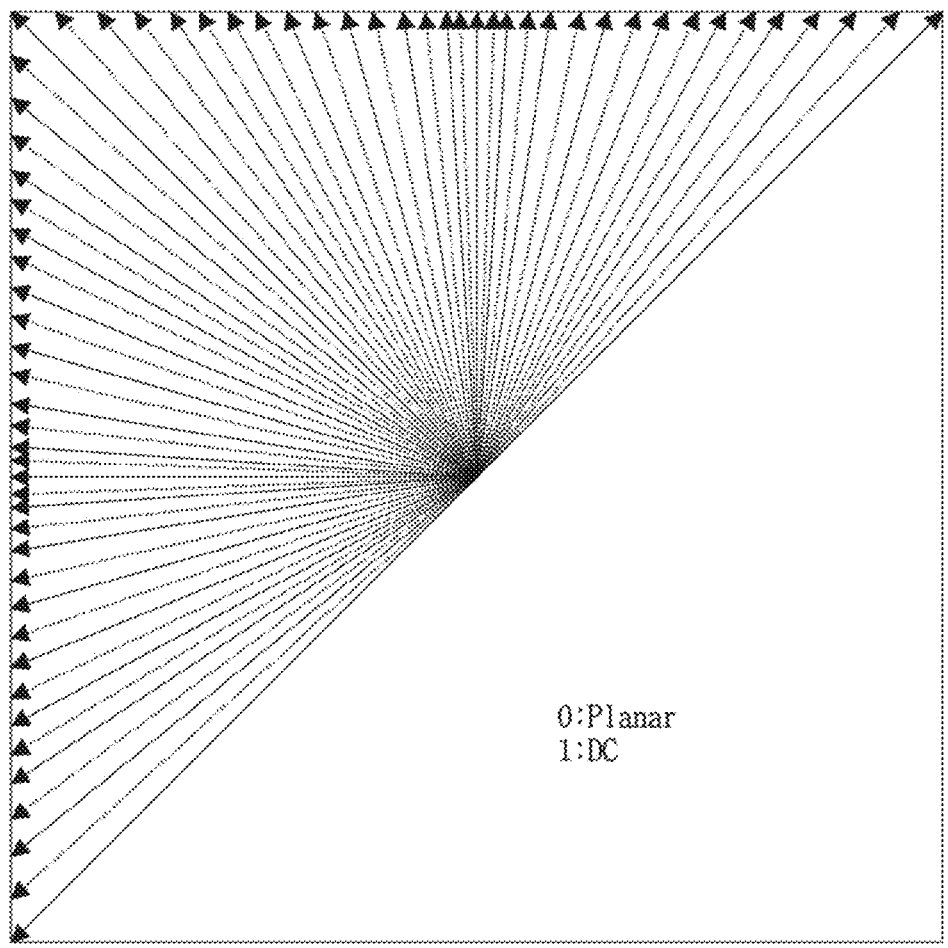
FIG. 4 is a view showing an example of intra-prediction.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
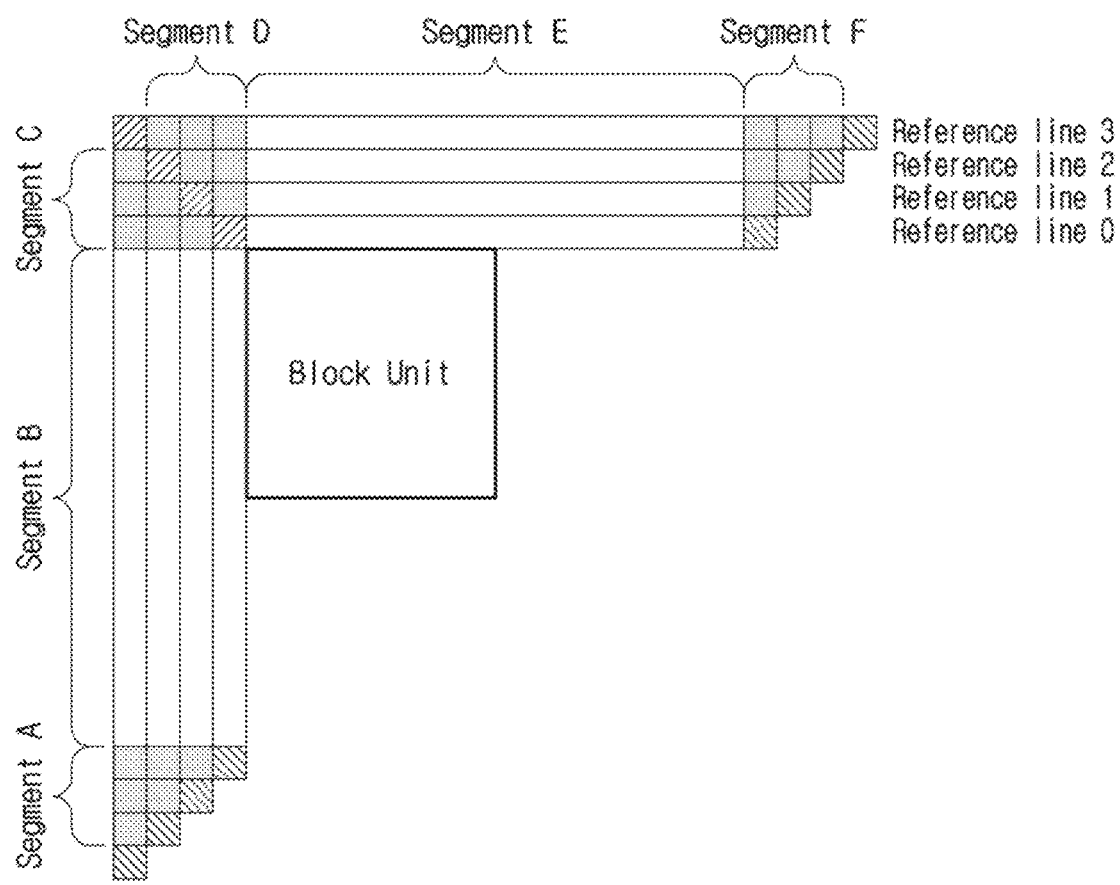
FIG. 7 is a view showing reference samples that are usable for intra-prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of a left upper side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
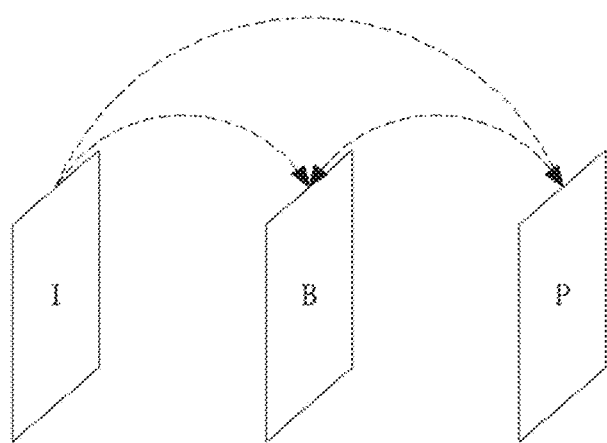
FIG. 5 is a view showing an example of inter-prediction.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current block may be the merge mode. The merge mode may mean a method of merging motion information of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information existing in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
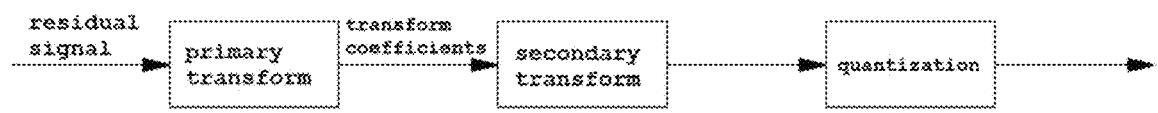
FIG. 6 is a view showing an example of transform and quantization.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M⇐64, N⇐64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, a method of encoding and decoding an image on the basis of an intra prediction mode according to an embodiment of the present invention will be described with reference to the accompanying drawings.

In the following description, the terms below may have the meanings as follows.

A temporally neighboring block may refer to, in images with different points in time, a block (co-located block) of which the position within one image is the same as the position of the current block within the other image.

A spatially neighboring block may refer to a block spatially adjacent to the current block.

Figure 8:
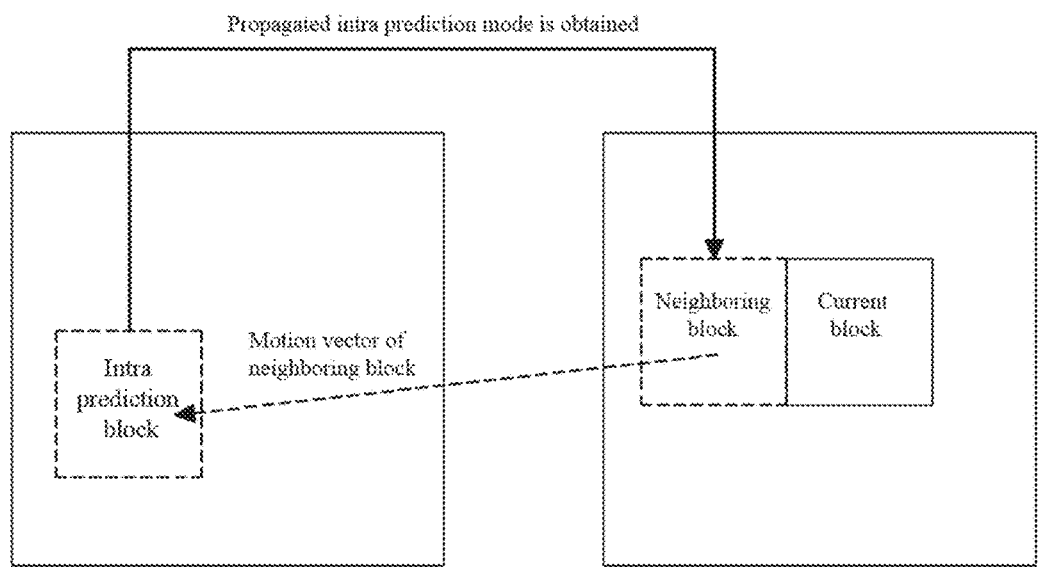
FIGS. 8 and 9 are diagrams illustrating a propagated intra prediction mode.
Figure 9:
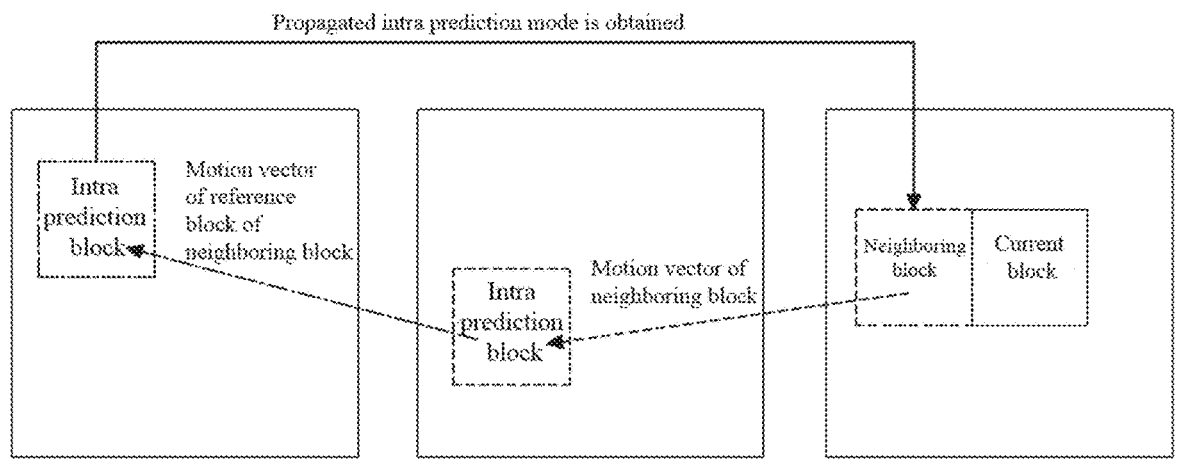

FIGS. 8 and 9 are diagrams illustrating a propagated intra prediction mode.

According to FIG. 8, the propagated intra prediction mode may refer to, when a prediction mode of a block that the temporally or spatially neighboring block references using a motion vector is an intra prediction mode, the intra prediction mode of the reference block.

According to FIG. 9, the propagated intra prediction mode may refer to, when the spatially neighboring block of the current block is in the inter prediction mode and the motion vector of the block references a block of which the prediction mode is also the inter prediction mode, the intra prediction mode of the reference block that is derived using the motion vectors of the respective reference blocks again until the intra prediction mode is obtained.

A most probable mode (MPM) may refer to an intra prediction mode that has a high probability of being used as an intra prediction mode in the current block. The MPM may be derived/selected from the spatially/temporally neighboring block.

A MPM neighboring block may refer to at least one block among the spatially neighboring block, the temporally neighboring block, and the block that the temporally or spatially neighboring block references using the motion vector.

A MPM group may refer to a subset group including at least one MPM of all MPMs.

An MPM group indicator may refer to an indicator that indicates one MPM group when two or more MPM groups are generated.

For example, the syntax element intra_luma_mpm_flag may be a flag that indicates whether the intra prediction mode of the current block is derived/selected using the MPM.

As another example, the syntax element prev_intra_pred_mode flag may perform the function of intra_luma_mpm_flag.

An MPM indicator may refer to an indicator that indicates a particular MPM of all MPMs or of MPMs in an MPM group.

An MPM-excluded intra prediction mode may refer to an intra prediction mode excluding MPMs from all intra prediction modes.

An MPM-excluded intra prediction mode indicator may refer to an indicator that indicates a particular intra prediction mode among MPM-excluded prediction modes.

An MPM difference (MPMD) may refer to a difference value in value (or number) of the intra prediction mode of the current block, value (or number) of the MPM, or in angle.

An MPM difference (MPMD) flag may refer to a flag that indicates whether the intra prediction mode of the current block is derived/selected using the MPMD.

For example, the syntax element candIntraPredModeA may be a syntax element indicating the intra prediction mode of the neighboring block that is positioned on the spatial left of the current block.

For example, the syntax element candIntraPredModeB may be a syntax element indicating the intra prediction mode of the neighboring block that is positioned at the spatial top of the current block.

For example, the syntax element INTRA_ANGULARXX may be a syntax element that indicates a number or a value of the angular mode among the intra prediction modes. Herein, XX may represent a number or a value of a specific angular mode.

For example, the syntax element MaxAB may be a syntax element indicating a mode number that has the greater value among candIntraPredModeA and candIntraPredModeB. Further, the syntax element MinAB may be a syntax element indicating a mode number that has the smaller value among candIntraPredModeA and candIntraPredModeB.

Figures 10, 11:
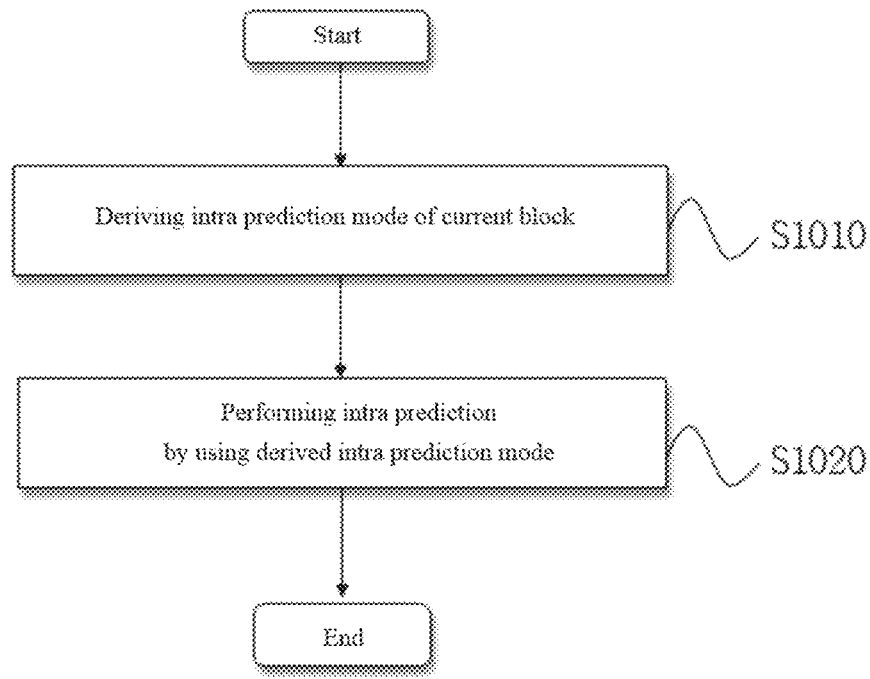

FIG. 10 is a diagram illustrating an encoding or decoding method using an intra prediction mode according to an embodiment of the present invention.

The encoding/decoding method shown in FIG. 10 may be performed by the encoding apparatus 100 or the decoding apparatus 200.

The encoding/decoding method according to the present invention may include, deriving an intra prediction mode at step S1010, and performing intra prediction by using the derived intra prediction mode at step S1020.

For example, at step S1010, in order to derive the intra prediction mode, at least one among the MPM, the MPM-excluded intra prediction mode, intra_luma_mpm_flag, the MPM group, the MPM group indicator, the MPM indicator, the MPMD, the MPM-excluded intra prediction mode indicator, and the MPMD indicator may be used.

As another example, at step S1010, in order to derive the intra prediction mode, at least one among the MPM, the MPM list, the MPM-excluded intra prediction mode, intra_luma_mpm_flag, the MPM indicator, intra_luma_not_planar_flag, and the MPM-excluded intra prediction mode indicator may be used.

For example, in deriving the intra prediction mode by using the MPM, at least one among the intra prediction mode of the temporally neighboring block, the intra prediction mode of the spatially neighboring block, the propagated intra prediction mode, and the MPM group indicator may be used.

For example, in generating the MPM list, at least one MPM may be generated according to at least one among candIntraPredModeA and candPredModeB.

For example, whether to perform the derivation of the intra prediction mode (S1010) and the generation of the MPM may be determined on the basis of at least one among an encoding parameter, picture information, slice information, a quantization parameter (QP), a coded block flag (CBF), a block size, a block depth, a block shape, an entropy encoding/decoding method, an intra prediction mode of a neighboring block, and a temporal hierarchy level.

Herein, the block may be at least one among a coding tree block, a coding block, a prediction block, a transform block, and a block in a predetermined size.

Hereinafter, a method of generating the MPM according to several embodiments of the present invention will be described in detail.

In deriving or generating the MPM of the current block, at least one among the intra prediction mode of the temporally neighboring block, the intra prediction mode of the spatially neighboring block, the propagated intra prediction mode, and the MPM group indicator may be used.

Herein, the MPM may indicate at least one among the intra prediction direction or the mode number. When two or more MPMs are generated, the MPMs are classified into at least one group.

Herein, by using the intra prediction mode of the temporally neighboring block, the intra prediction mode of the spatially neighboring block, and the propagated intra prediction mode, at least one MPM may be derived and may constitute the MPM list.

The MPM may be derived from at least one among the temporally neighboring block, the spatially neighboring block, and the block obtained from the motion vector of the neighboring block. Herein, the weighted sum of at least two MPMs of the derived MPMs may be obtained to derive/generate a new MPM.

For example, a weighting factor may be derived/selected according to the frequency of a particular intra prediction mode in a set including at least one among the intra prediction mode of the spatially neighboring block, the intra prediction mode of the temporally neighboring block, the propagated intra prediction mode, and the intra prediction mode of the MPM list.

For example, in constructing the MPM list, in a set including at least one among the intra prediction mode of the spatially neighboring block, the intra prediction mode of the temporally neighboring block, and the propagated intra prediction mode, according to the frequency of any intra prediction mode, the intra prediction mode similar to any intra prediction mode (differing by a predetermined size), or the intra prediction mode within any range, the order of intra prediction modes in the generated MPM list may be changed.

As another example, in constructing the MPM list, in a set including at least one among the intra prediction mode of the spatially neighboring block, the intra prediction mode of the temporally neighboring block, and the propagated intra prediction mode, according to the frequency of any intra prediction mode, the intra prediction mode similar to any intra prediction mode (differing by a predetermined size), or the intra prediction mode within any range, the MPM group to which the intra prediction modes belong may be changed.

In an operation such as division, and the like for deriving a new MPM candidate, at least one among rounding off, rounding up, rounding down, and the like may be used.

According to the frequencies of intra prediction modes, the weighting factor may be applied to the mode having a predetermined frequency. Also, according to the frequencies of intra prediction modes, the mode having a predetermined frequency may be excluded.

For example, the weighted sum of at least two MPM candidates included in the MPM list may be obtained to derive a new MPM candidate.

FIGS. 11 to 19 are diagrams illustrating a method of deriving an MPM or an MPM list according to several embodiments of the present invention.

In the following figures, the value of the MPM may indicate a value of the intra prediction mode or a number of the intra prediction mode.

FIG. 11 shows an example of deriving a new MPM candidate by obtaining the weighted sum of the prediction mode values of two or more MPM candidates. By obtaining the weighted sum of some MPM candidates of at least two MPM candidates included in the MPM list, a new MPM candidate may be derived/generated. For example, when three MPM candidates are derived from the MPM neighboring blocks and are modes 21, 25, and 35, mode 23, which is the average of modes 21 and 25, is derived as a new MPM candidate.

For example, a new MPM candidate (MPM_4) may be derived according to Equation 1 below.

$$MPM\_4=(MPM\_1+MPM\_2+MPM\_3)/3 \quad \text{[Equation 1]}$$

FIG. 12 shows an example of deriving an intra prediction mode angle of a new MPM candidate by obtaining the weighted sum of the intra prediction mode angles of two or more MPM candidates. For example, when two MPM candidates are derived from the MPM neighboring blocks and have intra prediction mode angles of 3.25 degrees and 7.75 degrees, respectively, the angle of 5.5 degrees, which is the average, is determined as an intra prediction mode angle of a new MPM candidate.

For example, an intra prediction mode angle of a new MPM candidate (MPM_3) may be derived according to Equation 2 below.

$$MPM\_3=(MPM\_1+MPM\_2)/2 \quad \text{[Equation 2]}$$

FIG. 13 shows another example of deriving a new MPM candidate by obtaining the weighted sum of the prediction mode values of two or more MPM candidates. For example, the weighting factor may be derived considering the frequency of the intra prediction mode in a set including at least one among the intra prediction mode of the spatially neighboring block, the intra prediction mode of the temporally neighboring block, the propagated intra prediction mode, and the intra prediction mode of the MPM list.

For example, in FIG. 13, when four MPM candidates are derived from the MPM neighboring blocks and in the set including the intra prediction mode of the spatially neighboring block, the intra prediction mode of the temporally neighboring block, and the propagated intra prediction mode, the frequencies of modes 25, 15, 27, and 22 are 1, 3, 1, and 1, respectively, the weighting factors are determined as shown in Equation 3 below according to the frequencies, so that mode 20 is derived as a new MPM (MPM_5) candidate. In the example in FIG. 13, n1, n2, n3, and n4 may be 1, 3, 1, and 1, respectively.

$$MPM\_5=(n1*MPM\_1+n2*MPM\_2+n3*MPM\_3+n4*MPM\_4)/(n1+n2+n3+n4) \quad \text{[Equation 3]}$$

Also, according to the frequency, different weighting factors may be applied. For example, to the mode having the highest frequency or the frequency equal to or greater than a predetermined frequency, a value greater than the frequency of the mode may be applied as a weighting factor. On the other hand, to the mode having the lowest frequency or the frequency equal to or smaller than a predetermined frequency, a value smaller than the frequency of the mode may be applied as a weighting factor.

FIG. 14 shows an example of deriving an intra prediction mode angle of a new MPM candidate by obtaining the weighted sum of the intra prediction mode angles of two or more MPM candidates.

For example, in FIG. 14, in the case where four MPM candidates are derived from the neighboring blocks and have intra prediction modes ∠14.5, ∠17.75, ∠127.25, and ∠135.75, respectively, and where in a set including the intra prediction mode of the spatially neighboring block, the intra prediction mode of the temporally neighboring block, and the propagated intra prediction mode, the frequencies of respective angles are 3, 1, 1, and 1, respectively, MPM candidates MPM_5 and MPM_6 having intra prediction mode angles of ∠15.25 and ∠130.0 may be derived as shown in Equation 4 according to the frequencies. In the example in FIG. 14, n1, n2, n3, and n4 may be 1, 3, 1, and 1, respectively.

$$MPM\_5=(n1*MPM\_1+n2*MPM\_2)/(n1+n2)$$

$$MPM\_6=(n3*MPM\_3+n4*MPM\_4)/(n3+n4) \quad \text{[Equation 4]}$$

FIG. 15 shows an example of changing the order of MPM candidates. In constructing the MPM list, in a set including at least one among the intra prediction mode of the spatially neighboring block, the intra prediction mode of the temporally neighboring block, and the propagated intra prediction mode, according to the frequency of any intra prediction mode, the intra prediction mode similar to any intra prediction mode (differing by a predetermined size), or the intra prediction mode within any range, the ranking of a particular intra prediction mode in the MPM list may be changed.

For example, when any MPM is repeatedly derived in a set of the intra prediction modes of the neighboring blocks, the ranking of the MPM is changed to be higher (to have higher priority). In FIG. 15, mode 22 is determined as the fourth in the MPM list. However, mode 22 is repeatedly derived from the neighboring blocks, and thus the ranking of mode 22 is modified to be the third, which is one of the higher rankings.

For example, when any MPM is repeatedly derived in a set of the intra prediction modes of the neighboring blocks, the ranking of the MPM is modified to the higher ranking by n from the original ranking. Herein, n (n is an integer greater than 0) may vary according to the frequency of repetition.

Figure 16:
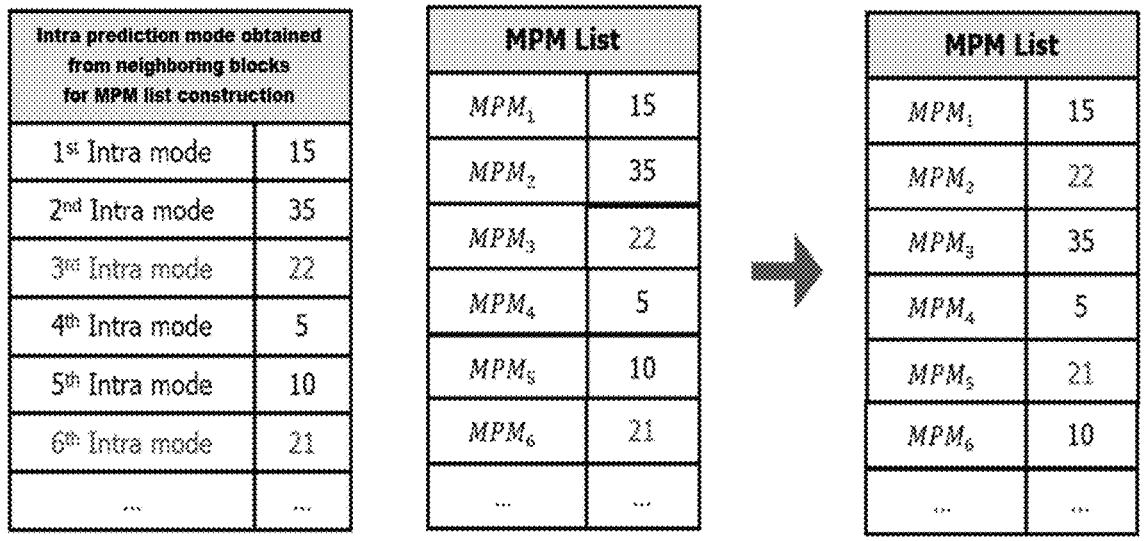

FIG. 16 shows another example of changing the order of MPM candidates. For example, when similar MPMs occur in a set of the intra prediction modes of the neighboring blocks, the rankings of the similar MPMs are changed to be higher (to have higher priorities). In the example in FIG. 16, when the rankings of the similar modes (having little difference in mode number) are not changed, mode 22 is determined to be the third in the MPM list and mode 21 is determined to be the sixth in the MPM list. However, the frequency of the intra prediction modes (modes 22 and 21) having the difference of 3 or less is greater than that of the other modes, and thus prediction modes 22 and 21 are modified to have higher priorities than other intra prediction modes.

For example, when similar MPMs occur in a set of the intra prediction modes of the neighboring blocks, the rankings of the similar MPMs are modified to be higher by n from the original rankings depending on the number of the similar MPMs. Herein, n (n is an integer greater than 0) may vary according to the number of similar MPMs.

As another example, when the rankings of the similar MPMs are modified to be higher than the original rankings, the rankings of some MPMs of the similar MPMs may be modified to be higher by m from the original rankings. Herein, m (m is an integer greater than 0) may be different from the n.

Figure 17:
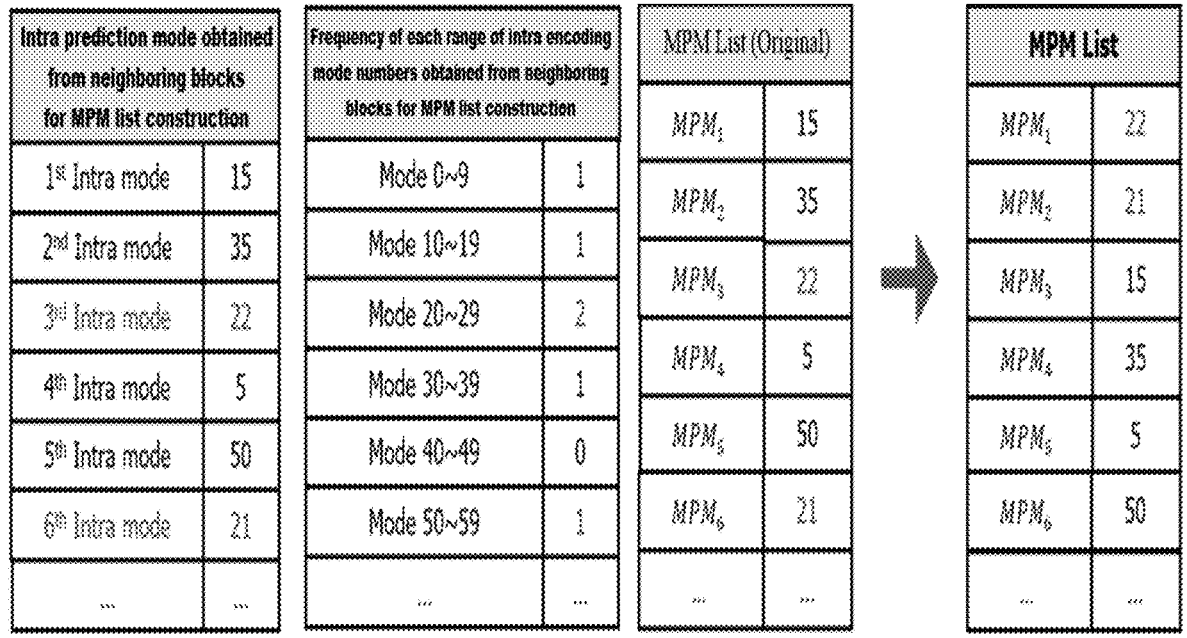

FIG. 17 shows still another example of changing the order of MPM candidates. In a set of the intra prediction modes of the neighboring blocks, according to the frequency of each range of intra encoding mode numbers, the order of intra prediction modes in the MPM list may be changed. In the example in FIG. 17, in the set of the intra prediction modes of the neighboring blocks, two intra prediction modes are derived from a range of 20 to 29, and thus intra prediction modes 22 and 21 included in the range are changed to have higher rankings in the MPM list.

For example, when the ranking of a particular MPM candidate is changed, a different range value is applied for each MPM mode and thus the order is changed. For example, the applied value may be determined on the basis of the original ranking of the MPM mode.

Figure 18:
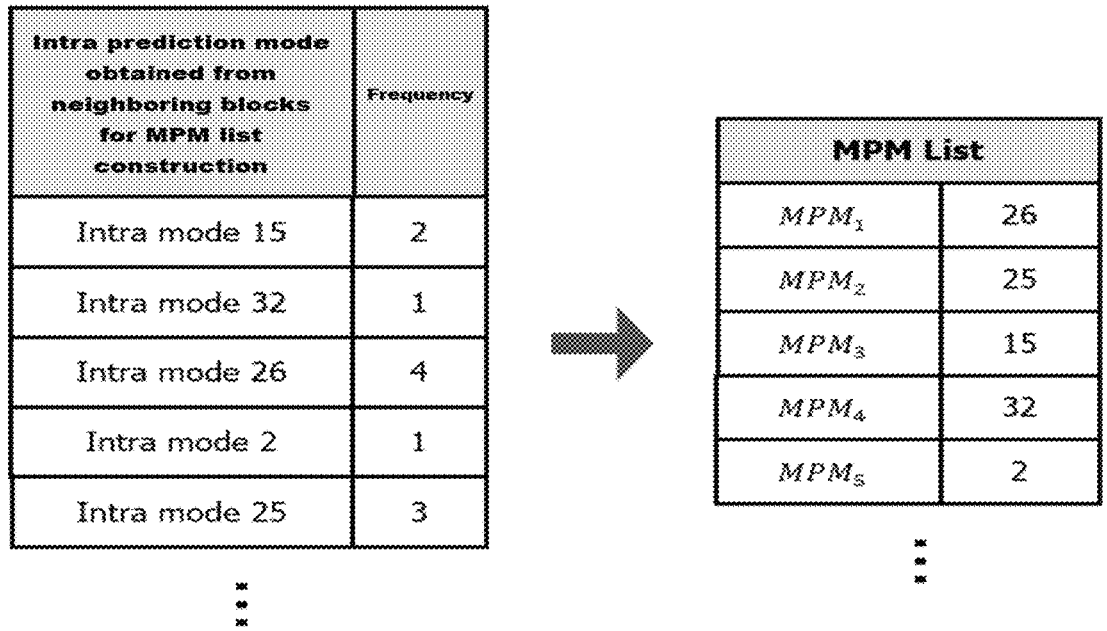

FIG. 18 shows still another example of deriving an MPM list. In the example in FIG. 18, when a set of the intra prediction modes of the neighboring blocks includes intra prediction modes 15, 32, 26, 2, 25, . . . , and the frequencies of the respective intra prediction modes are 2, 1, 4, 1, 3, . . . , the MPM list is derived as modes 26, 25, 15, 32, 2, . . . , in that order according to the frequencies.

Herein, when intra prediction modes having the same frequency are present, the order of intra prediction modes in the MPM list is determined according to a predefined order.

For example, the predefined order may be determined according to the position of the neighboring block having the intra prediction mode. For example, the predefined order may be the left neighboring block, the top neighboring block, the bottom left neighboring block, the top right neighboring block, and the top left neighboring block, but is not limited thereto.

As another example, the predefined order may be determined according to the intra prediction modes of the MPM candidates. For example, the predefined order may be DC, Planar, Horizontal, Vertical, and Angular modes, but is not limited thereto.

As still another example, only for the intra prediction mode of which the frequency is equal to or greater than a predetermined value, the ranking of the intra prediction mode in the MPM list may be changed. For example, in the example in FIG. 18, only for the intra prediction mode of which the frequency is equal to or greater than 4, the ranking of the intra prediction mode in the MPM list may be changed. In this case, the MPM list may be derived as modes 26, 15, 32, 2, 25, . . . , in that order.

Figure 19:
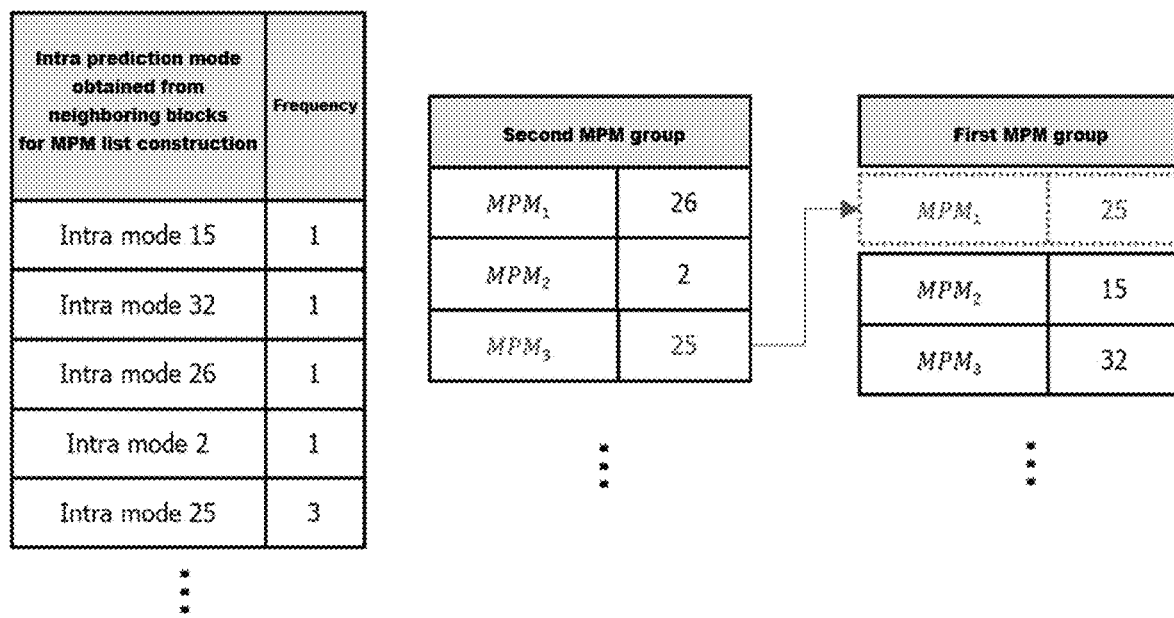

FIG. 19 shows an example of changing a group to which an MPM candidate belongs from a particular MPM group to another group. In constructing the MPM list, in a set including at least one among the intra prediction mode of the spatially neighboring block, the intra prediction mode of the temporally neighboring block, and the propagated intra prediction mode, according to the frequency of any intra prediction mode, the intra prediction mode similar to any intra prediction mode (differing by a predetermined size), or the intra prediction mode within any range, the MPM group to which a particular intra prediction mode belongs may be changed.

For example, according to the frequency of the intra prediction mode, the group to which the MPM belongs may be changed from a second group to a first group. In the example in FIG. 19, when intra prediction modes of the neighboring blocks are modes 15, 32, 26, 2, 25, . . . , and the frequencies of the respective intra prediction modes are 1, 1, 1, 1, 3, . . . , the group to which intra prediction mode 25 having the highest frequency belongs is changed from a second group (secondary MPM list) to a first group (primary MPM list).

Also, the group to which the intra prediction mode having a low frequency belongs may be changed from a first group to a second group.

Figure 20:
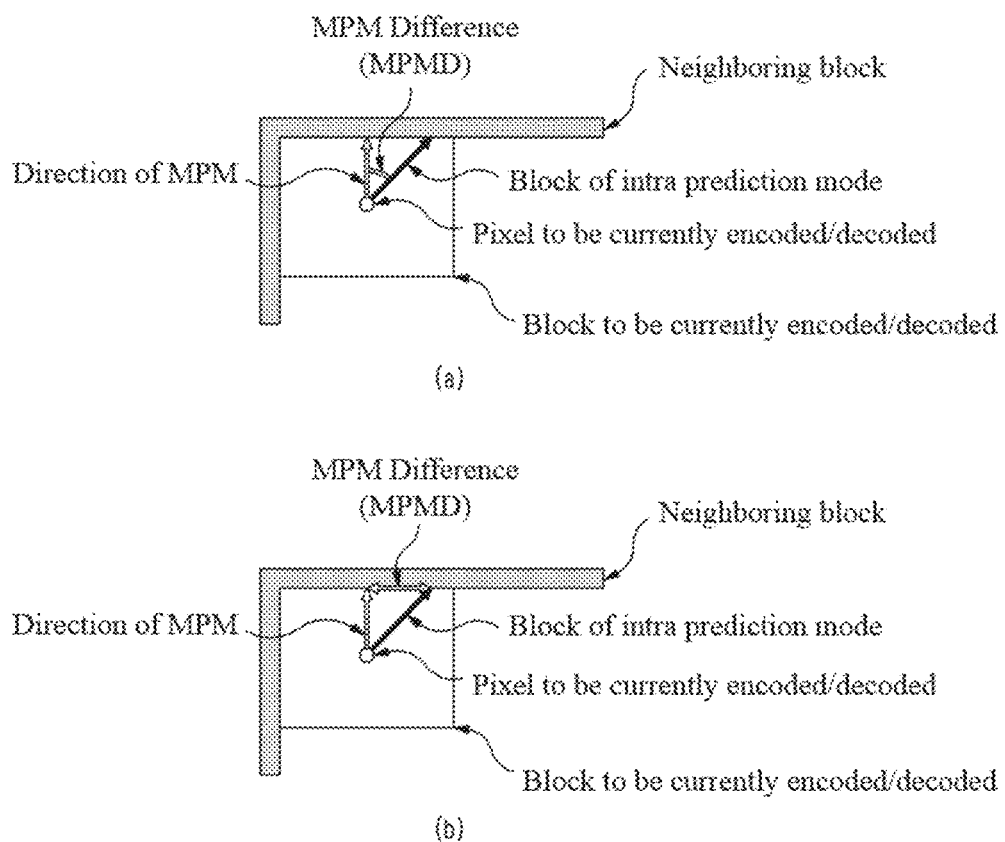
FIG. 20 is a diagram illustrating a method of deriving an intra prediction mode by using a MPMD according to an embodiment of the present invention.

FIG. 20 is a diagram illustrating a method of deriving an intra prediction mode by using a MPMD according to an embodiment of the present invention.

Herein, MPMD may refer to a difference between the MPM and the intra prediction mode of the current block. For example, MPMD may indicate either a difference in intra prediction mode value or a difference in intra prediction mode angle. When the intra prediction mode of the current block is Mode_pred and the i-th MPM candidate in the MPM list is MPM_i, the intra prediction mode of the current block is derived using MPMD according to Equation 5 below.

$$\text{Mode\_pred} = MPM\_i + MPMD \qquad \text{[Equation 5]}$$

That is, the intra prediction mode of the current block may be derived using the sum of MPM and MPMD.

Hereinafter, a method of determining an intra prediction mode derivation method will be described. According to several embodiments of the present invention, a method of determining an intra prediction mode may be selected by the syntax element intra_luma_mpm_flag.

Figure 21:
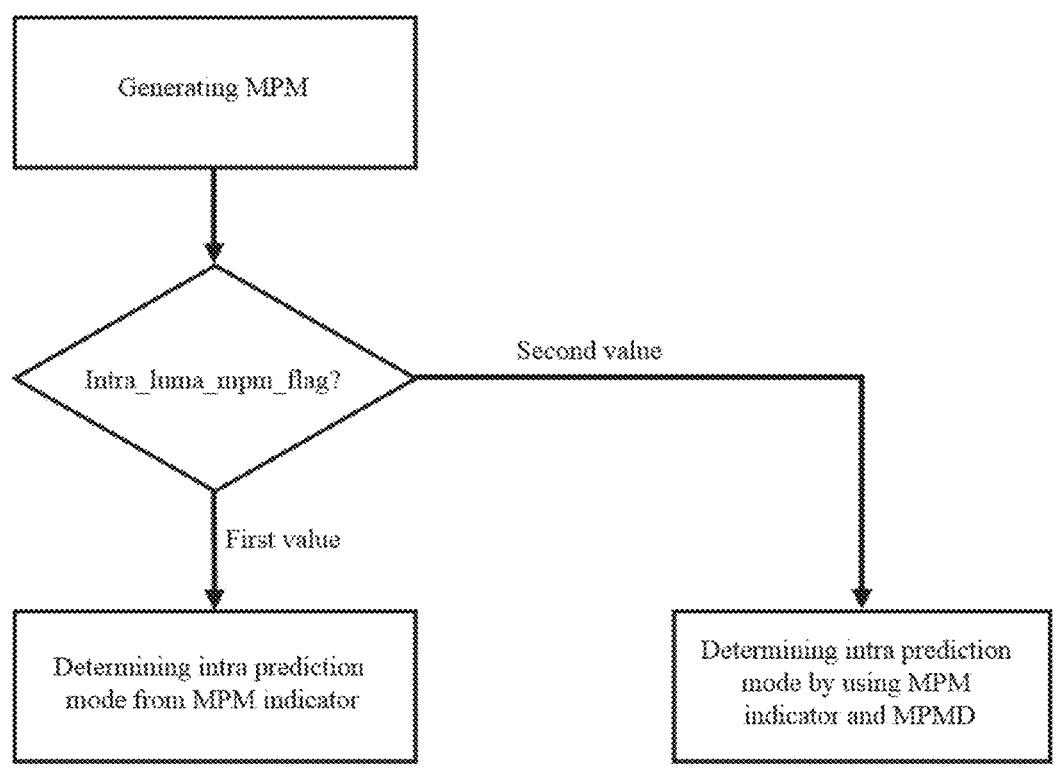
FIGS. 21 to 28 are flowcharts illustrating a method of deriving an intra prediction mode by using an MPM or an MPM list according to several embodiments of the present invention.

FIG. 21 shows an example where an intra prediction mode determination method is selected by intra_luma_mpm_flag.

When intra_luma_mpm_flag has a first value, it indicates that the intra prediction mode of the current block is one of the MPMs. When intra_luma_mpm_flag has a second value, it indicates that the intra prediction mode of the current block is not one of the MPMs.

For example, when intra_luma_mpm_flag has a first value, the MPM indicator is signaled. In this case, the intra prediction mode that the MPM indicator specifies among the MPMs may be derived as the current intra prediction mode. On the other hand, when intra_luma_mpm_flag has a second value, the MPMD is signaled. In this case, using the sum of the MPMD and the intra prediction mode of at least one of the MPMs, the intra prediction mode of the current block may be determined.

For example, when intra_luma_mpm_flag has a second value, the MPMD is signaled and the intra prediction mode of the current block is determined using the sum of the MPMD and the first intra prediction mode among the MPMs.

As another example, when intra_luma_mpm_flag has a second value, the MPM indicator and the MPMD are signaled and using the sum of the MPMD and the intra prediction mode that the MPM indicator specifies among the MPMs, the intra prediction mode of the current block is determined.

Figure 22:
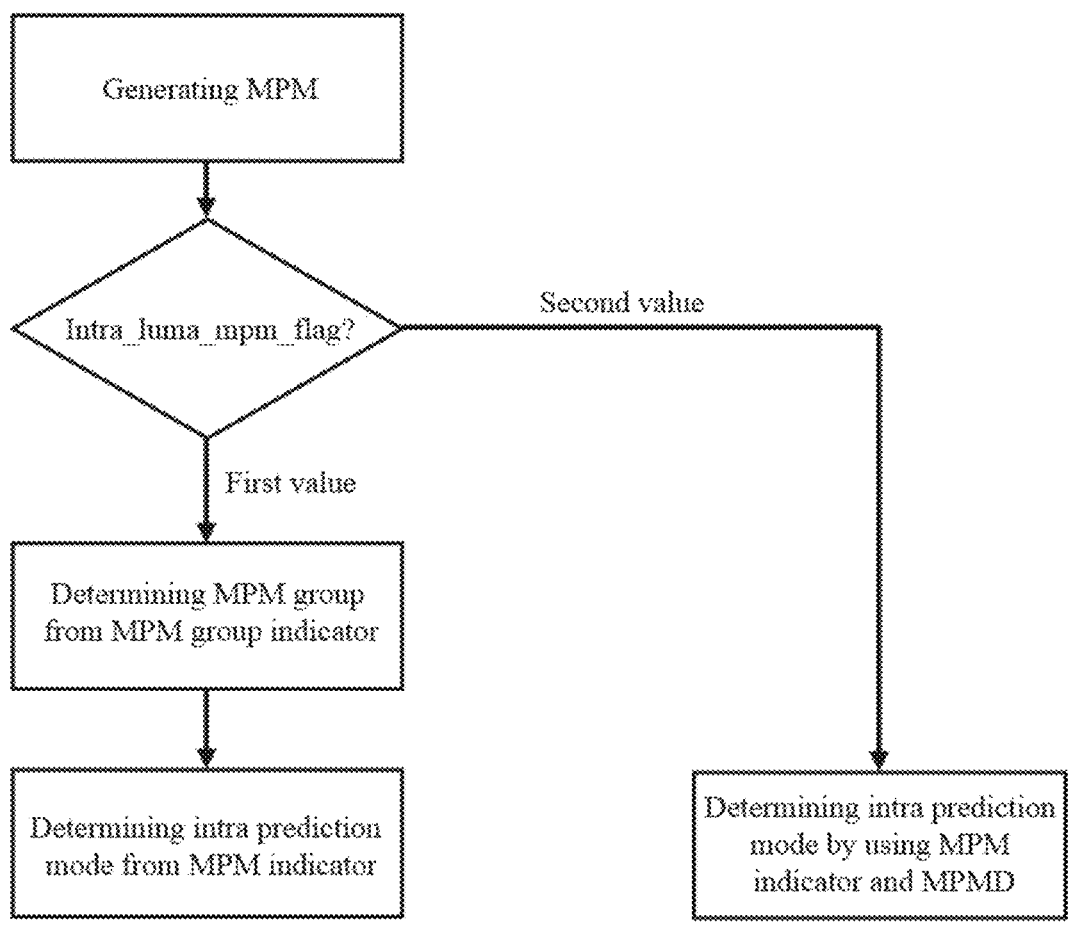

FIG. 22 shows another example where an intra prediction mode determination method is selected by intra_luma_mpm_flag.

When the MPMs are generated, the MPMs are classified into at least two groups. For example, the MPMs may be classified into a first MPM group and a second MPM group. For example, the first MPM group may include only a Planar mode, which is one type of intra prediction mode, and the second MPM group may include intra prediction modes other than the Planar mode.

When intra_luma_mpm_flag has a first value, it indicates that the intra prediction mode of the current block is one of the MPMs. When intra_luma_mpm_flag has a second value, it indicates that the intra prediction mode of the current block is not one of the MPMs.

For example, when intra_luma_mpm_flag has a first value, the MPM group indicator and the MPM indicator are signaled. Among the MPMs in the MPM group that MPM group indicator specifies, the intra prediction mode that the MPM indicator specifies is derived as the intra prediction mode of the current block. On the other hand, when intra_luma_mpm_flag has a second value, the MPMD is signaled. In this case, using the sum of the MPMD and the intra prediction mode of at least one of the modes in the first MPM group, the intra prediction mode of the current block may be determined.

For example, when intra_luma_mpm_flag has a second value, the MPMD is signaled and using the sum of the MPMD and the first intra prediction mode among the modes in the first MPM group, the intra prediction mode of the current block is determined.

As another example, when intra_luma_mpm_flag has a second value, the MPM indicator and the MPMD are signaled and using the sum of the MPMD and the intra prediction mode that the MPM indicator specifies among the modes in the first MPM group, the intra prediction mode of the current block is determined.

As another example, when intra_luma_mpm_flag has a first value, the MPM group indicator and the MPM indicator are signaled. The intra prediction mode that the MPM indicator specifies among the MPMs in the MPM group that the MPM group indicator specifies may be derived as the intra prediction mode of the current block. When the MPM group indicator indicates a first MPM group, the intra prediction mode of the current block may be determined to be a Planar mode. On the other hand, when the MPM group indicator indicates a second MPM group, the intra prediction mode that the MPM indicator specifies among the modes in the second MPM group is determined as the intra prediction mode of the current block.

In the meantime, when intra_luma_mpm_flag has a second value, the MPM-excluded intra prediction mode indicator is signaled. In this case, the intra prediction mode that the MPM-excluded intra prediction mode indicator specifies is determined as the intra prediction mode of the current block.

Figure 23:
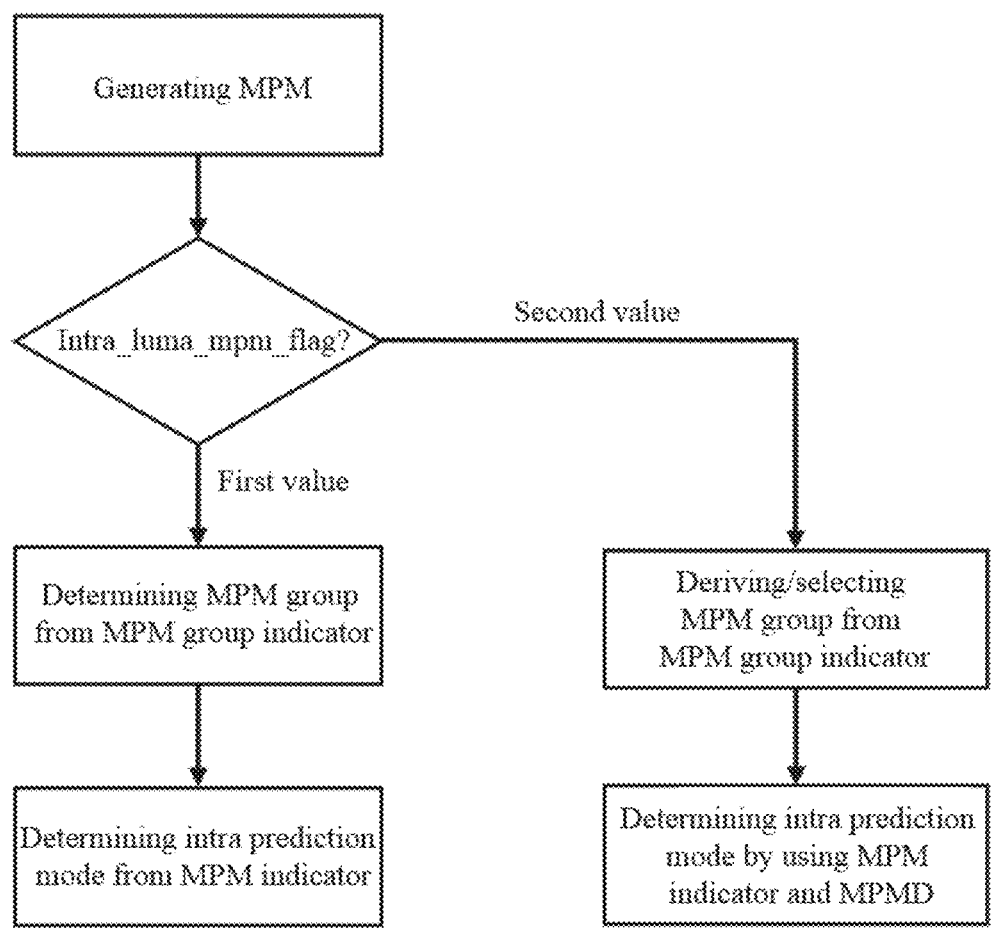

FIG. 23 shows still another example where an intra prediction mode determination method is selected by intra_luma_mpm_flag.

When the MPMs are generated, the MPMs are classified into at least two groups.

When intra_luma_mpm_flag has a first value, it indicates that the intra prediction mode of the current block is one of the MPMs. When intra_luma_mpm_flag has a second value, it indicates that the intra prediction mode of the current block is not one of the MPMs.

For example, when intra_luma_mpm_flag has a first value, the MPM group indicator and the MPM indicator are signaled. The intra prediction mode that the MPM indicator specifies among the MPMs in the MPM group that the MPM group indicator specifies may be derived as the intra prediction mode of the current block. On the other hand, when intra_luma_mpm_flag has a second value, the MPM group indicator and the MPMD are signaled. In this case, using the sum of the MPMD and at least one intra prediction mode in the MPM group that the MPM group indicator specifies, the intra prediction mode of the current block may be determined.

For example, when intra_luma_mpm_flag has a second value, the MPM group indicator and the MPMD are signaled and the MPM group is selected by the MPM group indicator. Using the sum of the MPMD and the first intra prediction mode among the modes in the selected MPM group, the intra prediction mode of the current block may be determined.

As another example, when intra_luma_mpm_flag has a second value, the MPM group indicator, the MPM indicator, and the MPMD are signaled, and the MPM group is selected by the MPM group indicator. Using the sum of the MPMD and the intra prediction mode that the MPM indicator indicates among the intra prediction modes in the selected MPM group, the intra prediction mode of the current block may be determined.

Figure 24:
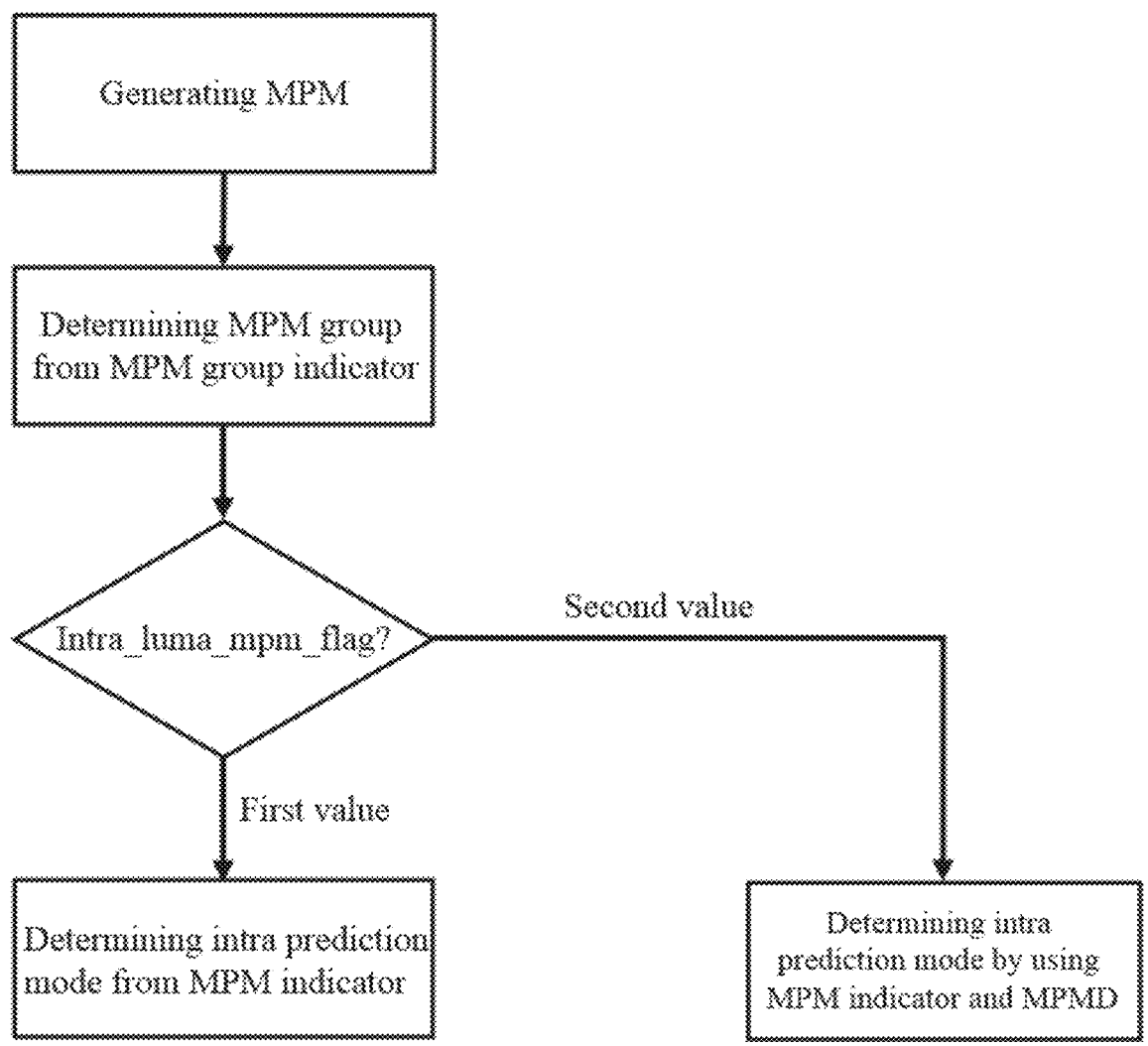

FIG. 24 shows still another example where an intra prediction mode determination method is selected by intra_luma_mpm_flag.

When the MPMs are generated, the MPMs are classified into at least two groups.

Before intra_luma_mpm_flag is signaled, the MPM group indicator may be signaled, and the MPM group indicator may be used to specify the MPM group.

When intra_luma_mpm_flag has a first value, in indicates that the intra prediction mode of the current block is one of the MPMs. When intra_luma_mpm_flag has a second value, it indicates that the intra prediction mode of the current block is not one of the MPMs.

For example, when intra_luma_mpm_flag has a first value, the MPM indicator is signaled. The intra prediction mode that the MPM indicator specifies among the MPMs in the MPM group that the MPM group indicator specifies may be determined as the intra prediction mode of the current block. On the other hand, when intra_luma_mpm_flag has a second value, the MPMD is signaled. In this case, using the sum of the MPMD and at least one intra prediction mode in the MPM group that the MPM group indicator specifies, the intra prediction mode of the current block may be determined.

For example, when intra_luma_mpm_flag has a second value, the MPM group indicator and the MPMD are signaled and the MPM group is selected by the MPM group indicator. Using the sum of the MPMD and the first intra prediction mode among the modes in the selected MPM group, the intra prediction mode of the current block may be determined.

As another example, when intra_luma_mpm_flag has a second value, the MPM indicator and the MPMD are signaled, and the MPM group is selected by the MPM group indicator. Using the sum of the MPMD and the intra prediction mode that the MPM indicator indicates among the intra prediction modes in the selected MPM group, the intra prediction mode of the current block may be determined.

Figure 25:
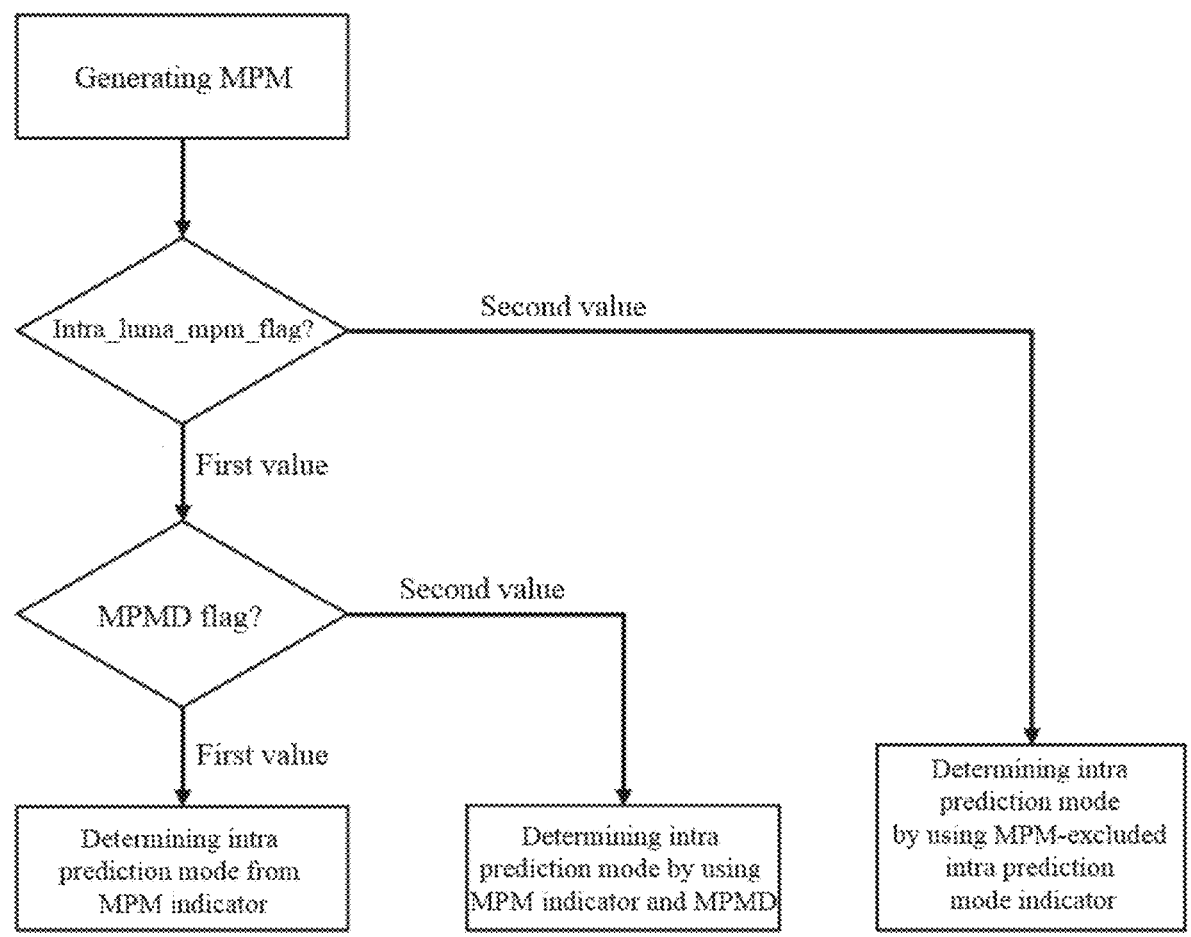

FIG. 25 shows still another example where an intra prediction mode determination method is selected by intra_luma_mpm_flag.

When intra_luma_mpm_flag has a first value, it indicates that the intra prediction mode of the current block is one of the MPMs. When intra_luma_mpm_flag has a second value, it indicates that the intra prediction mode of the current block is not one of the MPMs.

When the MPMD indicator has a first value, it indicates that the intra prediction mode of the current block is not derived using the MPMD. When the MPMD indicator has a second value, it indicates that the intra prediction mode of the current block is derived using the MPMD.

For example, when intra_luma_mpm_flag has a first value, the MPMD indicator is signaled. When the MPMD indicator has a first value, the MPM indicator is signaled. In this case, the intra prediction mode that the MPM indicator specifies may be determined as the intra prediction mode of the current block. In the meantime, when the MPMD indicator has a second value, the MPM indicator and the MPMD are signaled. In this case, using the sum of the MPMD and the intra prediction mode that the MPM indicator specifies, the intra prediction mode of the current block may be determined.

In the meantime, when intra_luma_mpm_flag has a second value, the MPM-excluded intra prediction mode indicator is signaled. In this case, the intra prediction mode that the MPM-excluded intra prediction mode indicator specifies may be determined as the intra prediction mode of the current block.

Figure 26:
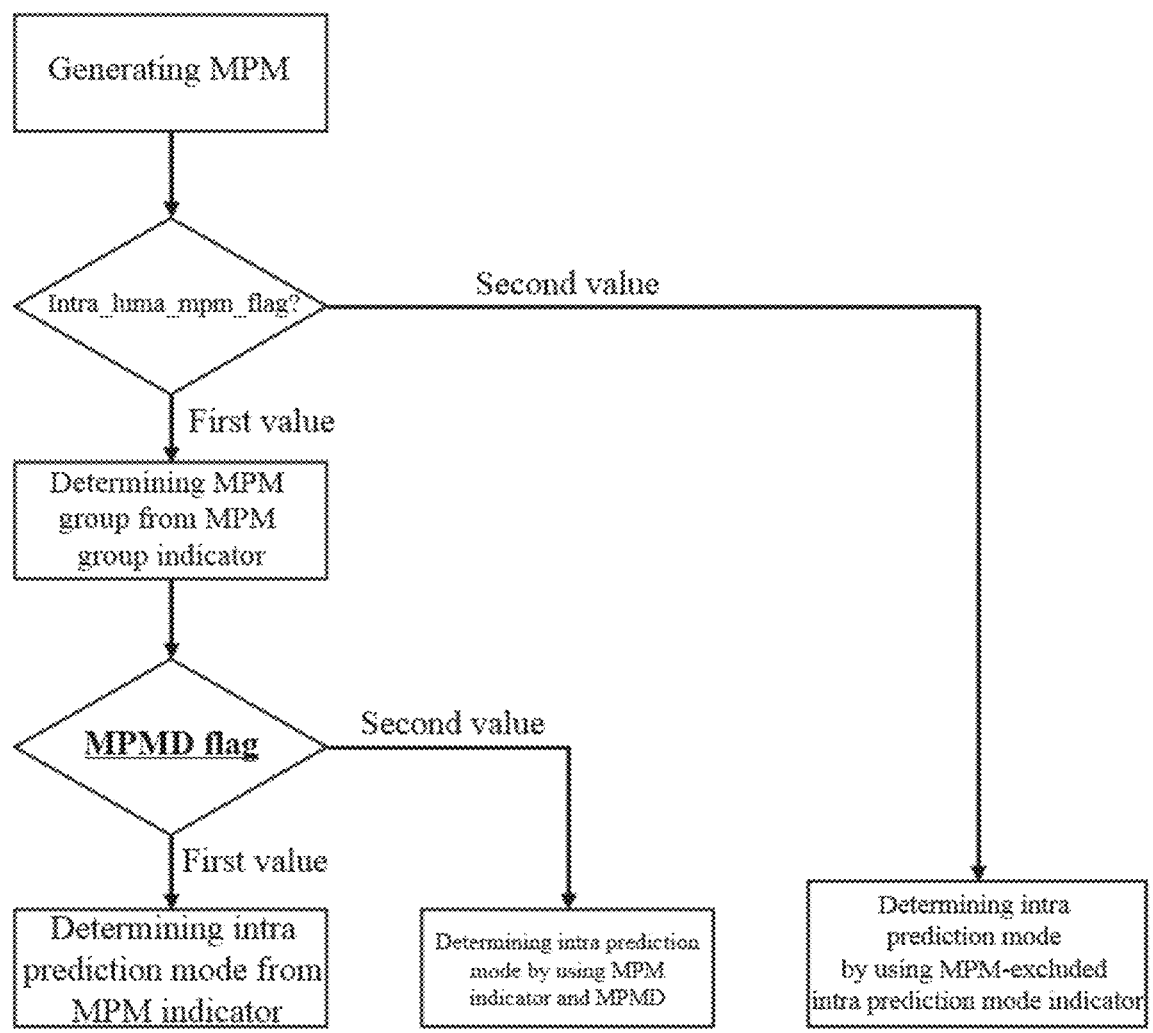

FIG. 26 shows still another example where an intra prediction mode determination method is selected by intra_luma_mpm_flag.

When the MPMs are generated, the MPMs are classified into at least two groups.

When intra_luma_mpm_flag has a first value, it indicates that the intra prediction mode of the current block is one of the MPMs. When intra_luma_mpm_flag has a second value, it indicates that the intra prediction mode of the current block is not one of the MPMs.

When the MPMD indicator has a first value, it indicates that the intra prediction mode of the current block is not derived using the MPMD. When the MPMD indicator has a second value, it indicates that the intra prediction mode of the current block is derived using the MPMD.

For example, when intra_luma_mpm_flag has a first value, the MPM group indicator, the MPM indicator, and the MPMD indicator are signaled. For the MPM group indicator, the MPM group to be used for determining the intra prediction mode of the current block may be determined. Herein, when the MPMD indicator has a first value, the intra prediction mode that the MPM indicator specifies among the MPMs in the MPM group that the MPM group indicator specifies may be determined as the intra prediction mode of the current block. In the meantime, when the MPMD indicator has a second value, the MPMD is signaled. Herein, using the sum of the MPMD and the intra prediction mode that the MPM indicator specifies among the MPMs in the MPM group that the MPM group indicator specifies, the intra prediction mode of the current block may be determined.

In the meantime, when intra_luma_mpm_flag has a second value, the MPM-excluded intra prediction mode indicator is signaled. In this case, the intra prediction mode that the MPM-excluded intra prediction mode indicator specifies may be determined as the intra prediction mode of the current block.

Figure 27:
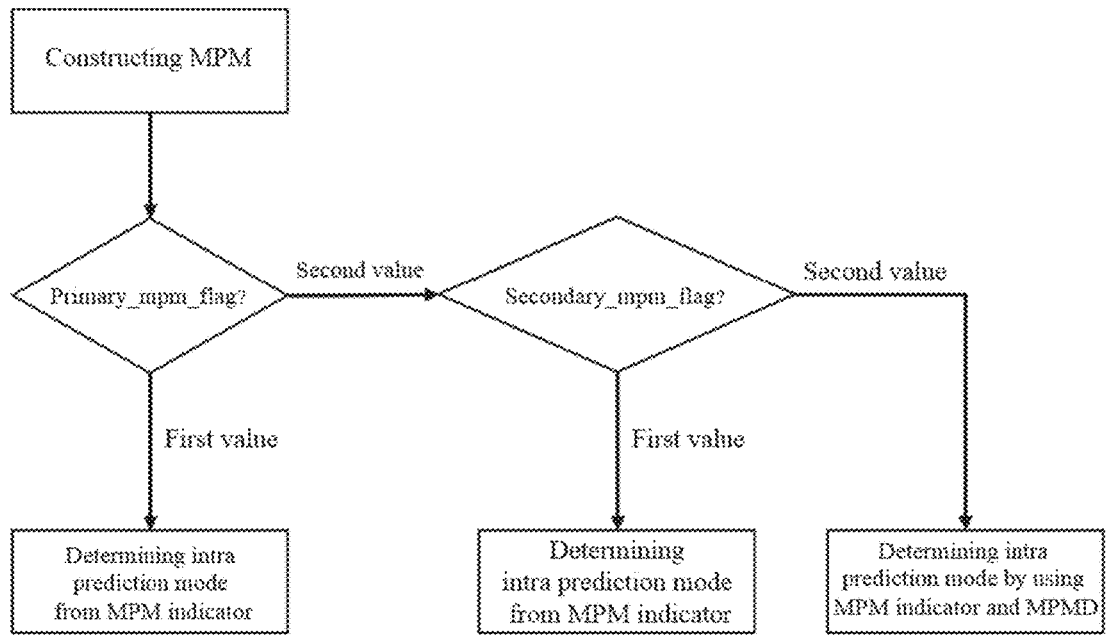

FIG. 27 shows an example where an intra prediction mode determination method is selected by primary_mpm_mode_flag and secondary_mpm_mode_flag.

When the MPMs are generated, the MPMs are classified into a first MPM group (primary MPM group) and a second MPM group (secondary MPM group).

For example, when primary_mpm_mode_flag has a first value, it indicates that the intra prediction mode of the current block is one of the MPMs in the first MPM group. When primary_mpm_mode_flag has a second value, it indicates that the intra prediction mode of the current block is not one of the MPMs in the first MPM group.

In the meantime, when secondary_mpm_mode_flag has a first value, it indicates that the intra prediction mode of the current block is one of the MPMs in the second MPM group. When secondary_mpm_mode_flag has a second value, it indicates that the intra prediction mode of the current block is not one of the MPMs in the second MPM group.

According to FIG. 27, when primary_mpm_mode_flag has a first value, the intra prediction mode that the MPM indicator specifies among the MPMs in the first MPM group is determined as the intra prediction mode of the current block.

In the meantime, when primary_mpm_mode_flag has a second value, secondary_mpm_mode_flag is signaled. According to the value of secondary_mpm_mode_flag, it is determined whether the intra prediction mode of the current block is derived from the second MPM group.

Herein, when secondary_mpm_mode_flag has a first value, the intra prediction mode that the MPM indicator specifies among the MPMs in the second MPM group is determined as the intra prediction mode of the current block.

In the meantime, when secondary_mpm_mode_flag has a second value, the MPMD is additionally signaled. Herein, using the sum of the MPMD and the intra prediction mode that the MPM indicator specifies, the intra prediction mode of the current block may be determined.

As another example, when secondary_mpm_mode_flag has a second value, the intra prediction mode of the current block is determined using the sum of the MPMD and the intra prediction mode that the MPM indicator specifies among the MPMs in the first MPM group.

Figure 28:
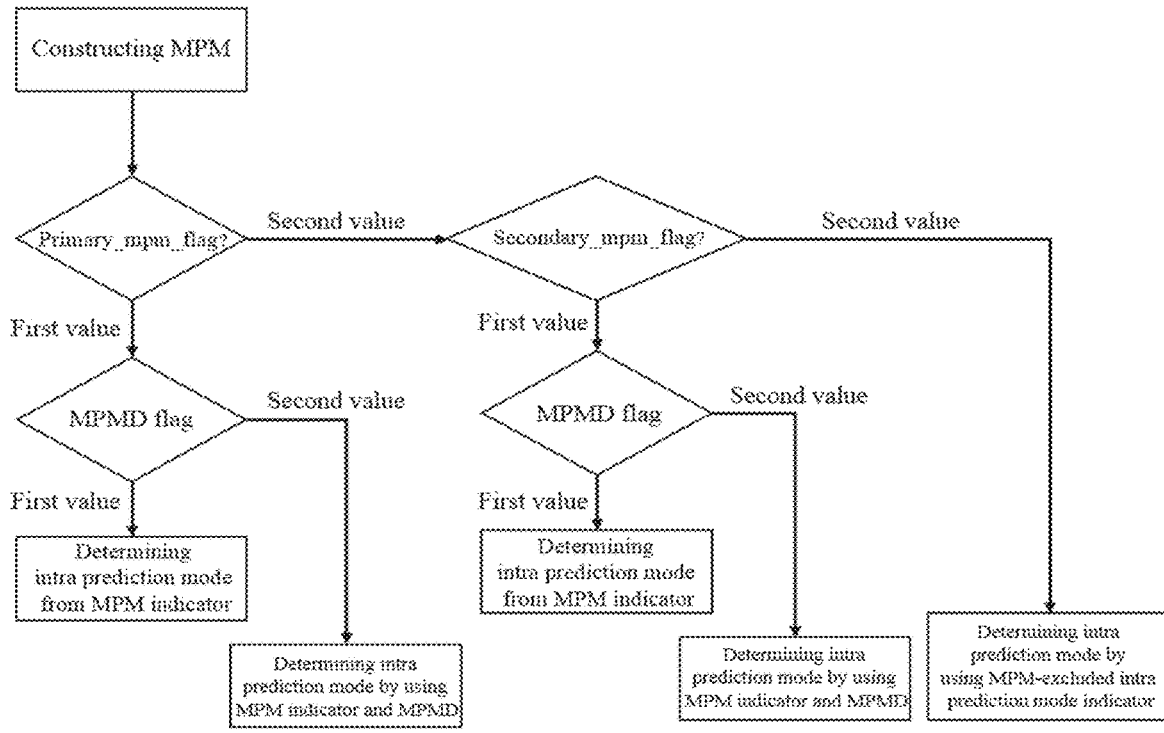

FIG. 28 shows an example where an intra prediction mode determination method is selected by primary_mpm_mode_flag and secondary_mpm_mode_flag.

When the MPMs are generated, the MPMs are classified into a first MPM group (primary MPM group) and a second MPM group (secondary MPM group).

For example, when primary_mpm_mode_flag has a first value, it indicates that the intra prediction mode of the current block is one of the MPMs in the first MPM group. When primary_mpm_mode_flag has a second value, it indicates that the intra prediction mode of the current block is not one of the MPMs in the first MPM group.

When the MPMD indicator has a first value, it indicates that the intra prediction mode of the current block is not derived using the MPMD. When the MPMD indicator has a second value, it indicates that the intra prediction mode of the current block is derived using the MPMD.

According to FIG. 28, when primary_mpm_mode_flag has a first value, the MPM indicator and the MPMD indicator are signaled. According to the MPMD indicator, it is determined whether the intra prediction mode of the current block is derived using the MPMD.

Herein, when the MPMD indicator has a first value, the intra prediction mode that the MPM indicator specifies among the MPMs in the first MPM group is determined as the intra prediction mode of the current block. In the meantime, when MPMD indicator has a second value, the MPMD is additionally signaled. Using the sum of the MPMD and the intra prediction mode that the MPM indicator specifies among the MPMs in the first MPM group, the intra prediction mode of the current block may be determined.

In the meantime, when primary_mpm_mode_flag has a second value, secondary_mpm_mode_flag is signaled. From the value of secondary_mpm_mode_flag, it is determined whether the intra prediction mode of the current block is determined using the second MPM group.

Herein, when secondary_mpm_mode_flag has a first value, the MPM indicator and the MPMD indicator are additionally signaled. According to the MPMD indicator, it is determined whether the intra prediction mode of the current block is derived using the MPMD.

Herein, when the MPMD indicator has a first value, the intra prediction mode that the MPM indicator specifies among the MPMs in the second MPM group is determined as the intra prediction mode of the current block. In the meantime, when MPMD indicator has a second value, the MPMD is additionally signaled. Using the sum of the MPMD and the intra prediction mode that the MPM indicator specifies among the MPMs in the second MPM group, the intra prediction mode of the current block may be determined.

In the meantime, when Secondary_mpm_mode_flag has a second value, the MPM-excluded intra prediction mode indicator is additionally signaled. The intra prediction mode that the MPM-excluded intra prediction mode indicator specifies may be determined as the intra prediction mode of the current block.

Figure 29:
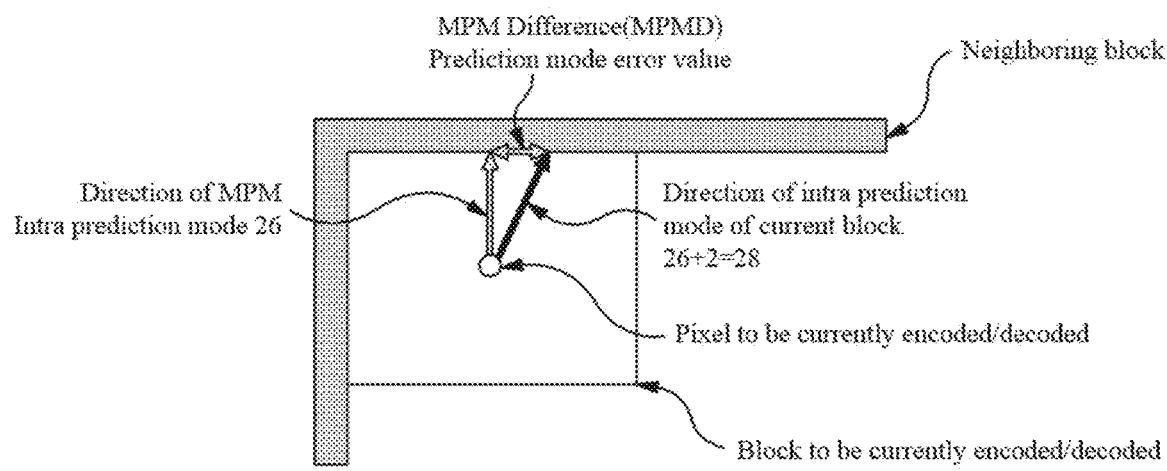
FIGS. 29 and 30 are diagrams illustrating a method of deriving an intra prediction mode by using an MPMD according to several embodiments of the present invention.
Figure 30:
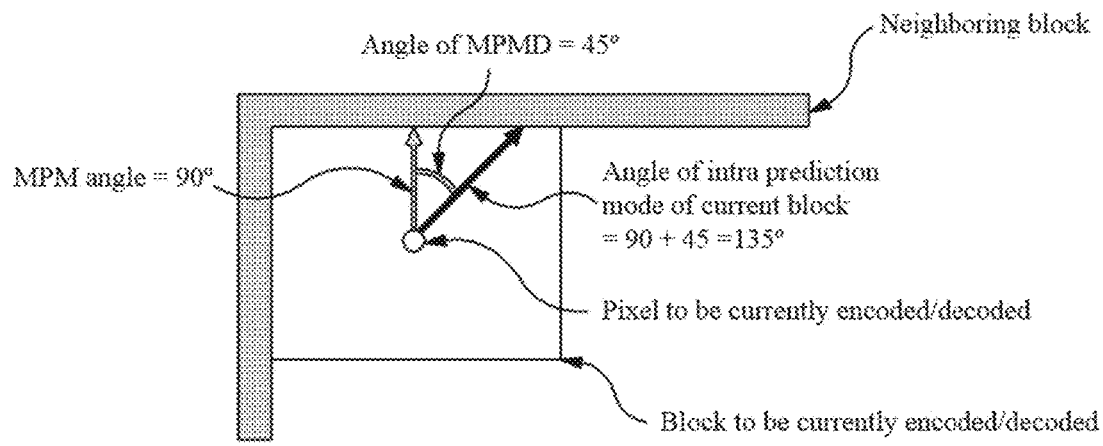

FIGS. 29 and 30 are diagrams illustrating a method of deriving an intra prediction mode by using an MPMD according to several embodiments of the present invention.

Using the sum of the MPM and the MPMD, the intra prediction mode of the current block may be determined. In the example in FIG. 29, when the intra prediction mode of the MPM is mode 26 and the value of the MPMD is 2, the intra prediction mode of the current block is determined to be mode 28.

In the example in FIG. 30, when the intra prediction mode angle of the MPM is 90 degrees and the value of the MPMD is 45 degrees, the intra prediction mode angle of the current block is determined to be 135 degrees.

Figure 32:
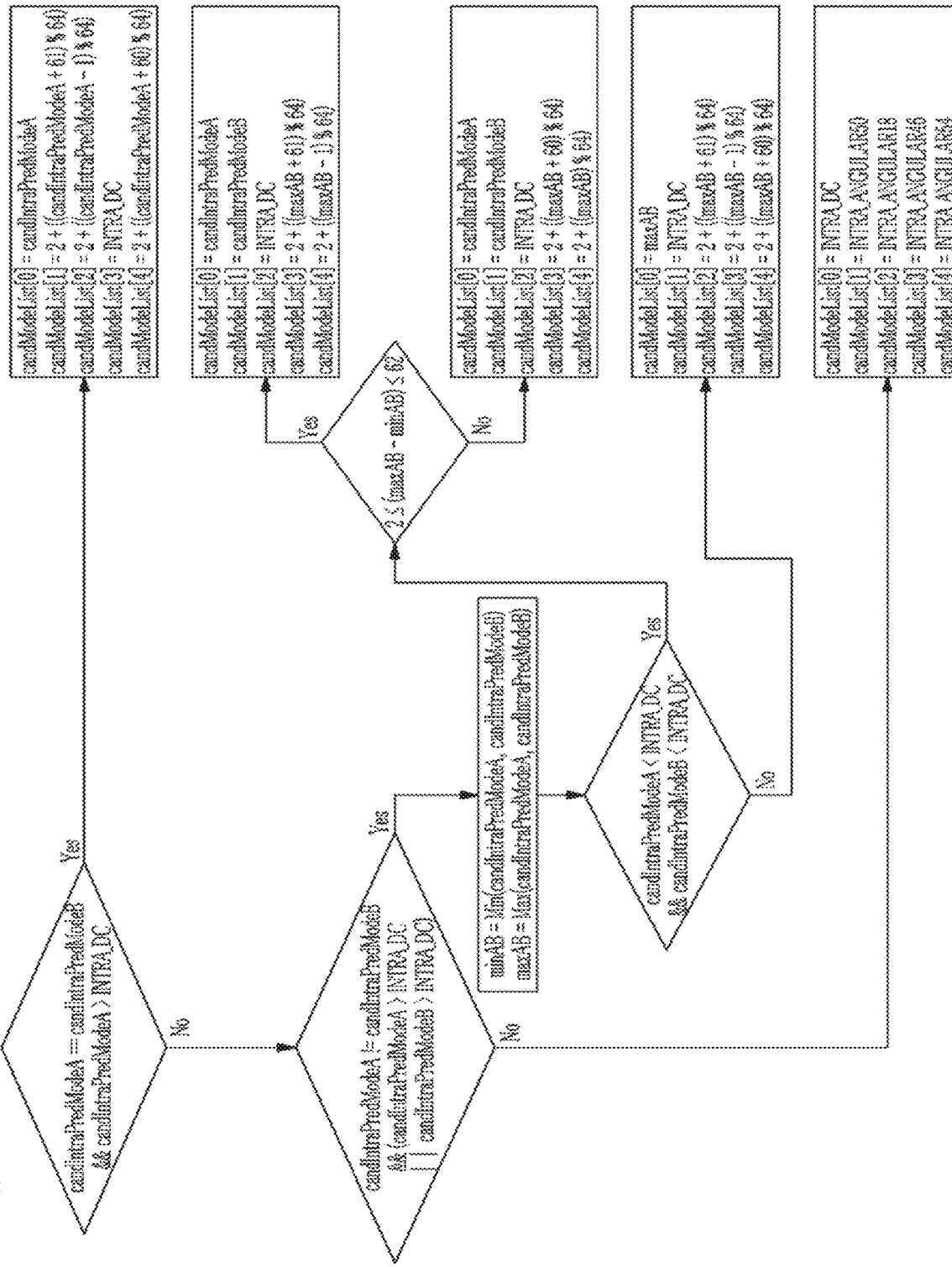
FIG. 32 is a diagram illustrating a method of generating an MPM list according to an embodiment of the present invention.

FIG. 31 is a diagram illustrating a syntax structure according to an embodiment of the present invention. FIG. 32 is a diagram illustrating a method of generating an MPM list according to an embodiment of the present invention. For example, FIG. 32 may be a flowchart illustrating the syntax structure in FIG. 31.

According to at least one of the intra prediction modes of the neighboring blocks that are positioned on the spatial left of the current block or the neighboring blocks that are positioned on the spatial top, the MPM list of the current block may be derived.

For example, the MPM list of the current block may be derived according to at least one among candIntraPredModeA and candIntraPredModeB. In the following description or tables, candIntraPredModeA may be referred to as Left and candIntraPredModeB may be referred to as Above.

For example, the MPM list may be determined to be at least one of four or seven categories in Table 1, Table 2, Table 3, and Table 4 below according to the intra prediction mode of the neighboring block.

TABLE 1

| Categories | MPM list |
|---|---|
| Category 1 | {Planar, Left, Left − 1, Left + 1, DC, Left − 2} |
| Category 2 | {Planar, Left, Above, DC, Max − 1, Max + 1} |
| Category 3 | {Planar, Max, DC, Max − 1, Max + 1, Max − 2} |
| Category 4 | {Planar, DC, VER, HOR, VER − 4, VER + 4} |

TABLE 2

| Categories | MPM list |
|---|---|
| Category 1 | {Left, Left − 1, Left + 1, DC, Left − 2} |
| Category 2 | {Left, Above, DC, Max − 1, Max + 1} |
| Category 3 | {Max, DC, Max − 1, Max + 1, Max − 2} |
| Category 4 | {DC, VER, HOR, VER − 4, VER + 4} |

TABLE 3

| Categories | MPM list |
|---|---|
| Category 1 | {Planar, Left, Left − 1, Left + 1, Left − 2, Left + 2} |
| Category 2-1 | {Planar, Left, Above, Min − 1, Max + 1, Min − 2} |
| Category 2-2 | {Planar, Left, Above, Min + 1, Max − 1, Min + 2} |
| Category 2-3 | {Planar, Left, Above, Min + 1, Min − 1, Max + 1} |
| Category 2-4 | {Planar, Left, Above, Min − 1, Min + 1, Max − 1} |
| Category 3 | {Planar, Max, Max − 1, Max + 1, Max − 2, Max + 2} |
| Category 4 | {Planar, DC, VER, HOR, VER − 4, VER + 4} |

TABLE 4

| Categories | MPM list |
|---|---|
| Category 1 | {Left, Left − 1, Left + 1, Left − 2, Left + 2} |
| Category 2-1 | {Left, Above, Min − 1, Max + 1, Min − 2} |
| Category 2-2 | {Left, Above, Min + 1, Max − 1, Min + 2} |
| Category 2-3 | {Left, Above, Min + 1, Min − 1, Max + 1} |
| Category 2-4 | {Left, Above, Min − 1, Min + 1, Max − 1} |
| Category 3 | {Max, Max − 1, Max + 1, Max − 2, Max + 2} |

TABLE 4-continued

| Categories | MPM list |
|---|---|
| Category 4 | {DC, VER, HOR, VER − 4, VER + 4} |

For example, the MPM list may be composed of six MPMs including the Planar mode or may be composed of five MPMs excluding the Planar mode.

In Table 1, Table 2, Table 3, and Table 4, Max may denote the prediction mode having a higher mode number among candIntraPredModeA and candIntraPredModeB, and Min may denote the prediction mode having a lower mode number among candIntraPredModeA and candIntraPredModeB. Also, VER may denote the mode number of the intra prediction mode in vertical direction, and HOR may denote the mode number of the intra prediction mode in horizontal direction.

Each category in Table 1, Table 2, Table 3, and Table 4 may represent the form of the MPM list constructed in the following cases.

Category 1 may be an example of an MPM list generated when candIntraPredModeA and candIntraPredModeB are the same and are greater than INTRA_DC.

For example, category 1 may be configured as the MPM list including six MPMs that are Planar mode, Left mode, Left−1 mode, Left+1 mode, DC mode, and Left−2 mode.

As another example, category 1 may be configured as the MPM list including five MPMs that are Left mode, Left−1 mode, Left+1 mode, DC mode, and Left−2 mode.

As still another example, category 1 may be configured as the MPM list including five MPMs that are Left mode, Left−1 mode, Left+1 mode, Left−2 mode, and Left+2 mode.

As still another example, category 1 may be configured as the MPM list including six MPMs that are Planar mode, Left mode, Left−1 mode, Left+1 mode, Left−2 mode, and Left+2 mode.

Category 2 may be an example of an MPM list generated when candIntraPredModeA and candIntraPredModeB differ and are greater than INTRA_DC.

For example, category 2 may be configured as the MPM list including six MPMs that are Planar mode, Left mode, Above mode, DC mode, Max−1 mode, and Max+1 mode.

As another example, category 2 may be configured as the MPM list including five MPMs that are Left mode, Above mode, DC mode, Max−1 mode, and Max+1 mode.

As still another example, category 2 may be configured according to the difference value between minAB and maxAB as follows.

Hereinafter, minAB may denote the prediction mode having a lower mode number among candIntraPredModeA and candIntraPredModeB. Also, maxAB may denote the prediction mode having a higher mode number among candIntraPredModeA and candIntraPredModeB.

For example, when the difference between maxAB and minAB is 1, category 2 is configured as the MPM list including five MPMs that are Left mode, Above mode, minAB−1 mode, maxAB+1 mode, and minAB−2 mode.

As another example, when the difference between maxAB and minAB is 1, category 2 is configured as the MPM list including six MPMs that are Planar mode, Left mode, Above mode, minAB−1 mode, maxAB+1 mode, and minAB−2 mode.

For example, when the difference between maxAB and minAB is equal to or greater than 62, category 2 is configured as the MPM list including five MPMs that are Left mode, Above mode, minAB+1 mode, maxAB−1 mode, and minAB−2 mode.

As another example, when the difference between maxAB and minAB is equal to or greater than 62, category 2 is configured as the MPM list including six MPMs that are Planar mode, Left mode, Above mode, minAB+1 mode, maxAB−1 mode, and minAB−2 mode.

For example, when the difference between maxAB and minAB is 2, category 2 is configured as the MPM list including five MPMs that are Left mode, Above mode, minAB+1 mode, minAB−1 mode, and maxAB+1 mode.

As another example, when the difference between maxAB and minAB is 2, category 2 is configured as the MPM list including six MPMs that are Planar mode, Left mode, Above mode, minAB+1 mode, minAB−1 mode, and maxAB+1 mode. In the meantime, if the above conditions are not met, category 2 is configured as the MPM list including five MPMs that are Left mode, Above mode, minAB−1 mode, minAB+1 mode, and maxAB−1 mode.

As another example, when the above conditions are not met, category 2 is configured as the MPM list including six MPMs that are Planar mode, Left mode, Above mode, minAB−1 mode, minAB+1 mode, and maxAB−1 mode.

Category 3 may be an example of an MPM list generated when candIntraPredModeA and candIntraPredModeB differ and one thereof is greater than INTRA_DC.

For example, category 3 may be configured as the MPM list including six MPMs that are Planar mode, Max mode, DC mode, Max−1 mode, Max+1 mode, and Max−2 mode. As another example, category 3 may be configured as the MPM list including five MPMs that are Max mode, DC mode, Max−1 mode, Max+1 mode, and Max−2 mode.

As another example, category 3 may be configured as the MPM list including five MPMs that are maxAB mode, maxAB−1 mode, maxAB+1 mode, maxAB−2 mode, and maxAB+2 mode.

As still another example, category 3 may be configured as the MPM list including six MPMs that are Planar mode, maxAB mode, maxAB−1 mode, maxAB+1 mode, maxAB−2 mode, and maxAB+2 mode.

Category 4 may be an example of an MPM list generated when both candIntraPredModeA and candIntraPredModeB are equal to or smaller than INTRA_DC, specifically, when candIntraPredModeA and candIntraPredModeB are the Planar or DC mode.

For example, category 4 may be configured as the MPM list including six MPMs that are Planar mode, DC mode, VER mode, HOR mode, VER−4 mode, and VER+4 mode. As another example, category 4 may be configured as the MPM list including five MPMs that are DC mode, VER mode, HOR mode, VER−4 mode, and VER+4 mode.

Specifically, the MPM list may be determined differently according to some conditions below.

For example, when candIntraPredModeA and candIntraPredModeB are the same and candIntraPredModeA is greater than INTRA_DC, the MPM list of the current block is derived as follows.

That is, when the intra prediction mode of the neighboring block positioned on the spatial left and the intra prediction mode of the neighboring block positioned on the spatial top are the same and the intra prediction mode of the neighboring block positioned on the spatial left is an angular mode, the MPM list (candModeList) of the current block is derived according to Equation 6 or Equation 7 below.

candModeList[0]=candIntraPredModeA candModeList[1]=2+((candIntraPredModeA+61)%64)

candModeList([2]=2+((candIntraPredModeA−1)%64)

candModeList[3]=INTRA_DC candModeList[4]=2+((candIntraPredModeA+60)%64)   [Equation 6]

candModeList[0]=candIntraPredModeA candModeList[1]=2+((candIntraPredModeA+61)%64)

candModeList[2]=2+((candIntraPredModeA−1)%64)

candModeList[3]=2+((candIntraPredModeA+60)%64)

candModeList[4]=2+(candIntraPredModeA%64)   [Equation 7]

As another example, when candIntraPredModeA and candIntraPredModeB differ, when candIntraPredModeA is greater than INTRA_DC, and when candIntraPredModeB is greater than INTRA_DC, the MPM list of the current block is derived as follows.

That is, when the intra prediction mode of the neighboring block positioned on the spatial left is different from the intra prediction mode of the neighboring block positioned on the spatial top, and when both the intra prediction mode of the neighboring block positioned on the spatial left and the intra prediction mode of the neighboring block positioned on the spatial top are angular modes, the MPM list of the current block is derived according to Equation 7 or Equation 8 below.

For example, when MaxAB−MinAB is equal to or greater than 2 and is equal to or smaller than 62, the MPM list (candModeList) of the current block is derived according to Equation 8 below.

candModeList[0]=candIntraPredModeA candModeList[1]=candIntraPredModeB candModeList[2]=INTRA_DC candModeList[3]=2+((maxAB+61)%64)

candModeList[4]=2+((maxAB−1)%64)   [Equation 8]

In the meantime, when MaxAB−MinAB is smaller than 2 or greater than 62, the MPM list (candModeList) of the current block is derived according to Equation 9 below.

candModeList[0]=candIntraPredModeA candModeList[1]=candIntraPredModeB candModeList[2]=INTRA_DC candModeList[3]=2+((maxAB+60)%64)

candModeList[4]=2+((maxAB)%64)   [Equation 9]

As still another example, when candIntraPredModeA and candIntraPredModeB differ, when candIntraPredModeA is greater than INTRA_DC, and when candIntraPredModeB is greater than INTRA_DC, the MPM list of the current block is derived as follows.

That is, when the intra prediction mode of the neighboring block positioned on the spatial left is different from the intra prediction mode of the neighboring block positioned on the spatial top, and when both the intra prediction mode of the neighboring block positioned on the spatial left and the intra prediction mode of the neighboring block positioned on the spatial top are angular modes, the MPM list of the current block is derived according to Equation 10, Equation 11, Equation 12, or Equation 13 below.

For example, when maxAB−minAB is equal to 1, the MPM list (candModeList) of the current block is derived according to Equation 10 below.

candModeList[0]=candIntraPredModeA candModeList[1]=candIntraPredModeB candModeList[2]=2+((minAB+61)%64)

candModeList[3]=2+((maxAB−1)%64)

candModeList[4]=2+((minAB+60)%64)　　　　[Equation 10]

For example, when maxAB−minAB is equal to or greater than 62, the MPM list (candModeList) of the current block is derived according to Equation M+1 below.

candModeList[0]=candIntraPredModeA candModeList[1]=candIntraPredModeB candModeList[2]=2+((minAB−1)%64)

candModeList[3]=2+((maxAB+61)%64)

candModeList[4]=2+(minAB%64)　　　　[Equation 11]

For example, when maxAB−minAB is equal to 2, the MPM list (candModeList) of the current block is derived according to Equation 12 below.

candModeList[0]=candIntraPredModeA candModeList[1]=candIntraPredModeB candModeList[2]=2+((minAB−1)%64)

candModeList[3]=2+((minAB+61)%64)

candModeList[4]=2+((maxAB−1)%64)　　　　[Equation 12]

For example, when the conditions are not met, the MPM list (candModeList) of the current block is derived according to Equation 13 below.

candModeList[0]=candIntraPredModeA candModeList[1]=candIntraPredModeB candModeList[2]=2+((minAB+61)%64)

candModeList[3]=2+((minAB−1)%64)

candModeList[4]=2+((maxAB+61)%64)　　　　[Equation 13]

As still another example, when candIntraPredModeA and candIntraPredModeB differ and either candIntraPredModeA or candIntraPredModeB is greater than INTRA_DC, the MPM list of the current block is derived as follows.

That is, when the intra prediction mode of the neighboring block positioned on the spatial left is different from the intra prediction mode of the neighboring block positioned on the spatial top, and when either the intra prediction mode of the neighboring block positioned on the spatial left or the intra prediction mode of the neighboring block positioned on the spatial top is an angular mode and the other is a non-angular mode, the MPM list (candModeList) of the current block is derived according to Equation 14 or Equation 15 below.

candModeList[0]=maxAB candModeList[1]=INTRA_DC candModeList[2]=2+((maxAB+61)%64)

candModeList[3]=2+((maxAB−1)%64)

candModeList[4]=2+((maxAB+60)%64)　　　　[Equation 14]

candModeList[0]=maxAB candModeList[1]=2+((maxAB+61)%64)

candModeList[2]=2+((maxAB−1)%64)

candModeList[3]=2+((maxAB+60)%64)

candModeList[4]=2+(maxAB%64)　　　　[Equation 15]

As still another example, when both candIntraPredModeA and candIntraPredModeB are equal to or smaller than INTRA_DC, the MPM list of the current block is derived as follows.

That is, when both the intra prediction mode of the neighboring block positioned on the spatial left and the intra prediction mode of the neighboring block positioned on the spatial top are non-angular modes, the MPM list of the current block is derived according to Equation 16 below.

For example, when both the intra prediction mode of the neighboring block positioned on the spatial left and the intra prediction mode of the neighboring block positioned on the spatial top are DC or Planar modes, the MPM list (candModeList) of the current block is derived according to Equation 16 below.

candModeList[0]=INTRA_DC candModeList[1]=INTRA_ANGULAR50 candModeList[2]=INTRA_ANGULAR18 candModeList[3]=INTRA_ANGULAR46 candModeList[4]=INTRA_ANGULAR54　　　　[Equation 16]

Figure 34:
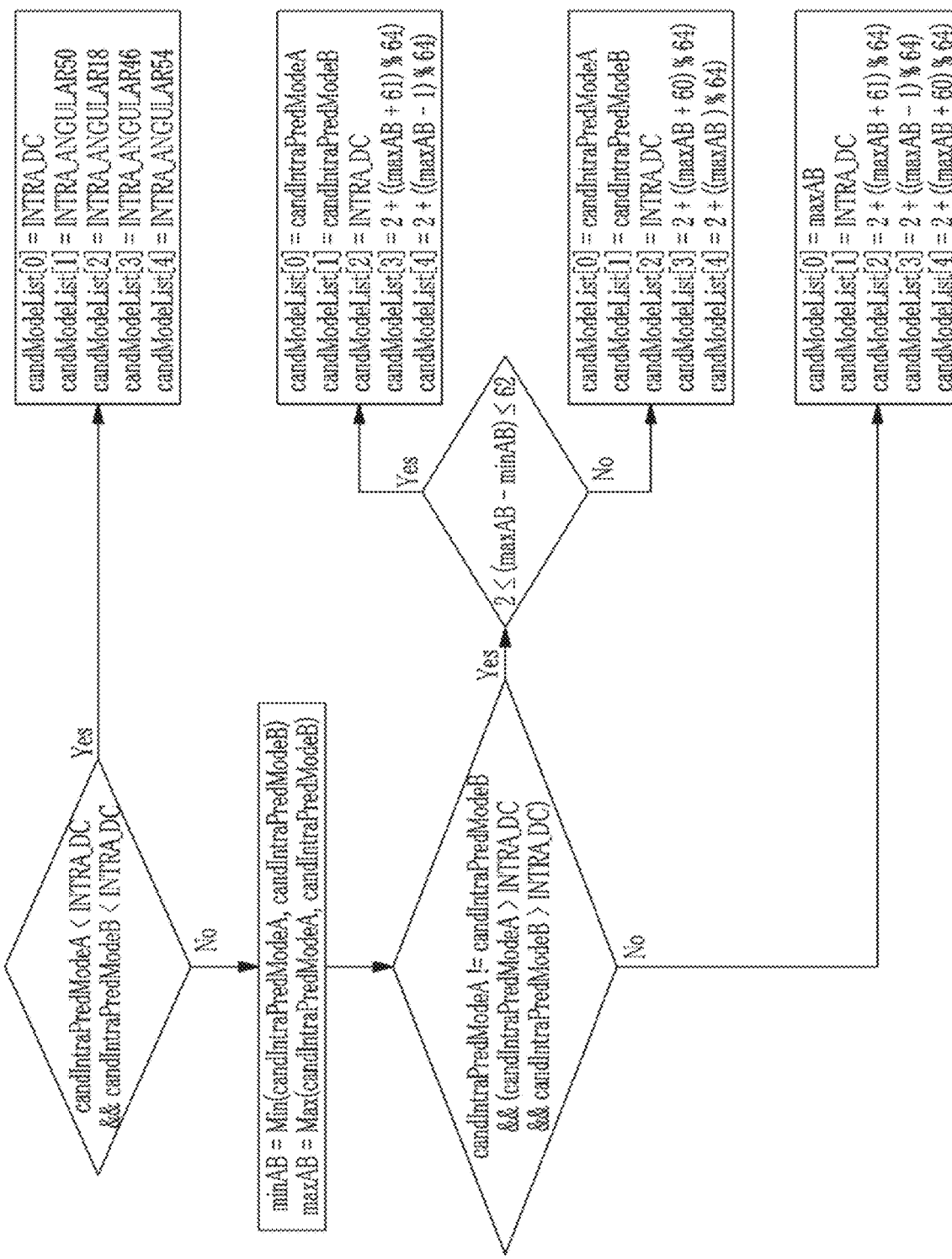
FIG. 34 is a flowchart illustrating a method of generating an MPM list according to another embodiment of the present invention.

FIG. 33 is a diagram illustrating a syntax structure according to another embodiment of the present invention. FIG. 34 is a flowchart illustrating a method of generating an MPM list according to another embodiment of the present invention. For example, FIG. 34 may be a flowchart illustrating the syntax structure in FIG. 33.

According to at least one of the intra prediction modes of the neighboring blocks that are positioned on the spatial left of the current block or the neighboring blocks that are positioned on the spatial top, the MPM list of the current block may be derived.

For example, the MPM list of the current block may be derived according to at least one among candIntraPredModeA and candIntraPredModeB. In the following description or tables, candIntraPredModeA may be referred to as Left, and candIntraPredModeB may be referred to as Above.

For example, the MPM list may be determined to be one of three categories in Table 5 and Table 6 below according to the intra prediction mode of the neighboring block.

TABLE 5

| Categories | MPM list |
| --- | --- |
| Category 1 | {Planar, DC, VER, HOR, VER − 4, VER + 4} |
| Category 2 | {Planar, Left, Above, DC, Max − 1, Max + 1} |
| Category 3 | {Planar, Max, DC, Max − 1, Max + 1, Max − 2} |

TABLE 6

| Categories | MPM list |
| --- | --- |
| Category 1 | {DC, VER, HOR, VER − 4, VER + 4} |
| Category 2 | {Left, Above, DC, Max − 1, Max + 1} |
| Category 3 | {Max, DC, Max − 1, Max + 1, Max − 2} |

For example, the MPM list may be composed of six MPMs including the Planar mode or may be composed of five MPMs excluding the Planar mode.

In Table 5 and Table 6, Max may denote the prediction mode having a higher mode number among candIntraPredModeA and candIntraPredModeB. Further, VER may denote the mode number of the intra prediction mode in vertical direction, and HOR may denote the mode number of the intra prediction mode in horizontal direction.

Each category in Table 5 and Table 6 may represent the form of the MPM list constructed in the following cases.

Category 1 may be an example of an MPM list generated when both candIntraPredModeA and candIntraPredModeB are equal to or smaller than INTRA_DC, specifically, when candIntraPredModeA and candIntraPredModeB are the Planar or DC mode. For example, category 1 may be an example of an MPM list generated when both candIntraPredModeA and candIntraPredModeB are non-angular modes.

For example, category 1 may be configured as the MPM list including six MPMs that are Planar mode, DC mode, VER mode, HOR mode, VER−4 mode, and VER+4 mode. As another example, category 1 may be configured as the MPM list including five MPMs that are DC mode, VER mode, HOR mode, VER−4 mode, and VER+4 mode, in that order.

Category 2 may be an example of an MPM list generated when candIntraPredModeA and candIntraPredModeB differ and are greater than INTRA_DC, specifically, when candIntraPredModeA and candIntraPredModeB differ and are angular modes.

For example, category 2 may be configured as the MPM list including six MPMs that are Planar mode, Left mode, Above mode, DC mode, Max−1 mode, and Max+1 mode. As another example, category 2 may be configured as the MPM list including five MPMs that are Left mode, Above mode, DC mode, Max−1 mode, and Max+1 mode.

Category 3 may be an example of an MPM list generated when candIntraPredModeA and candIntraPredModeB are the same and are greater than INTRA_DC, or when candIntraPredModeA and candIntraPredModeB differ and one thereof is greater than INTRA_DC.

For example, category 3 may be configured as the MPM list including six MPMs that are Planar mode, Max mode, DC mode, Max−1 mode, Max+1 mode, and Max−2 mode. As another example, category 3 may be configured as the MPM list including five MPMs that are Max mode, DC mode, Max−1 mode, Max+1 mode, and Max−2 mode.

Specifically, the MPM list may be determined differently according to some conditions below.

For example, when both candIntraPredModeA and candIntraPredModeB are equal to or smaller than INTRA_DC, the MPM list of the current block is derived as follows. Hereinbelow, this condition may be defined as condition 1.

That is, when both the intra prediction mode of the neighboring block positioned on the spatial left and the intra prediction mode of the neighboring block positioned on the spatial top are non-angular modes, the MPM list of the current block is derived according to Equation 11 below.

That is, when candIntraPredModeA and candIntraPredModeB are the Planar or DC mode, the MPM list (candModeList) of the current block is derived according to Equation 11 below.

candModeList[0]=INTRA_DC candModeList[1]=INTRA_ANGULAR50 candModeList[2]=INTRA_ANGULAR18 candModeList[3]=INTRA_ANGULAR46 candModeList[4]=INTRA_ANGULAR54    [Equation 17]

As another example, when the condition 1 indicates false, when candIntraPredModeA and candIntraPredModeB differ, and when both candIntraPredModeA and candIntraPredModeB are greater than INTRA_DC, the MPM list of the current block is derived as follows. Hereinbelow, the case where candIntraPredModeA and candIntraPredModeB differ and both candIntraPredModeA and candIntraPredModeB are greater than INTRA_DC may be defined as condition 2.

That is, when the intra prediction mode of the neighboring block positioned on the spatial left is different from the intra prediction mode of the neighboring block positioned on the spatial top, and when both the intra prediction mode of the neighboring block positioned on the spatial left and the intra prediction mode of the neighboring block positioned on the spatial top are angular modes, the MPM list of the current block is derived according to Equation 18 or Equation 19 below.

For example, when MaxAB−MinAB is equal to or greater than 2 and is equal to or smaller than 62, the MPM list (candModeList) of the current block is derived according to Equation 18 below.

candModeList[0]=candIntraPredModeA candModeList[1]=candIntraPredModeB candModeList[2]=INTRA_DC candModeList[3]=2+((maxAB+61)%64)

candModeList[4]=2+((maxAB−1)%64)    [Equation 18]

In the meantime, when MaxAB−MinAB is smaller than 2 or greater than 62, the MPM list (candModeList) of the current block is derived according to Equation 19 below.

candModeList[0]=candIntraPredModeA candModeList[1]=candIntraPredModeB candModeList[2]=INTRA_DC candModeList[3]=2+((maxAB+60)%64)

candModeList[4]=2+((maxAB)%64)    [Equation 19]

As still another example, when both the condition 1 and the condition 2 are false, the MPM list of the current block is derived as follows.

For example, in the case where candIntraPredModeA and candIntraPredModeB are the same and candIntraPredModeA is greater than INTRA_DC; or where candIntraPredModeA and candIntraPredModeB differ and either candIntraPredModeA or candIntraPredModeB is greater than INTRA_DC, the MPM list of the current block is derived as follows.

That is, in the case where the intra prediction mode of the neighboring block positioned on the spatial left and the intra prediction mode of the neighboring block positioned on the spatial top are the same and are angular modes; or where the intra prediction mode of the neighboring block positioned on the spatial left is different from the intra prediction mode of the neighboring block positioned on the spatial top, either the intra prediction mode of the neighboring block positioned on the spatial left or the intra prediction mode of the neighboring block positioned on the spatial top is an angular mode, and the other is a non-angular mode, the MPM list of the current block is derived as follows.

That is, when condition 1 and condition 2 are false and candIntraPredModeA and candIntraPredModeB include only one angular mode, the MPM list (candModeList) of the current block is derived according to Equation 20 below.

candModeList[0]=maxAB candModeList[1]=INTRA_DC candModeList[2]=2+((maxAB+61)%64)

candModeList([3]=2+((maxAB−1)%64)

candModeList[4]=2+((maxAB+60)%64)          [Equation 20]

FIG. 35 is a diagram illustrating a syntax structure according to still another embodiment of the present invention. For example, FIG. 35 may be another example of the syntax structure representing a method of deriving an MPM candidate list of a current block.

Figure 37:
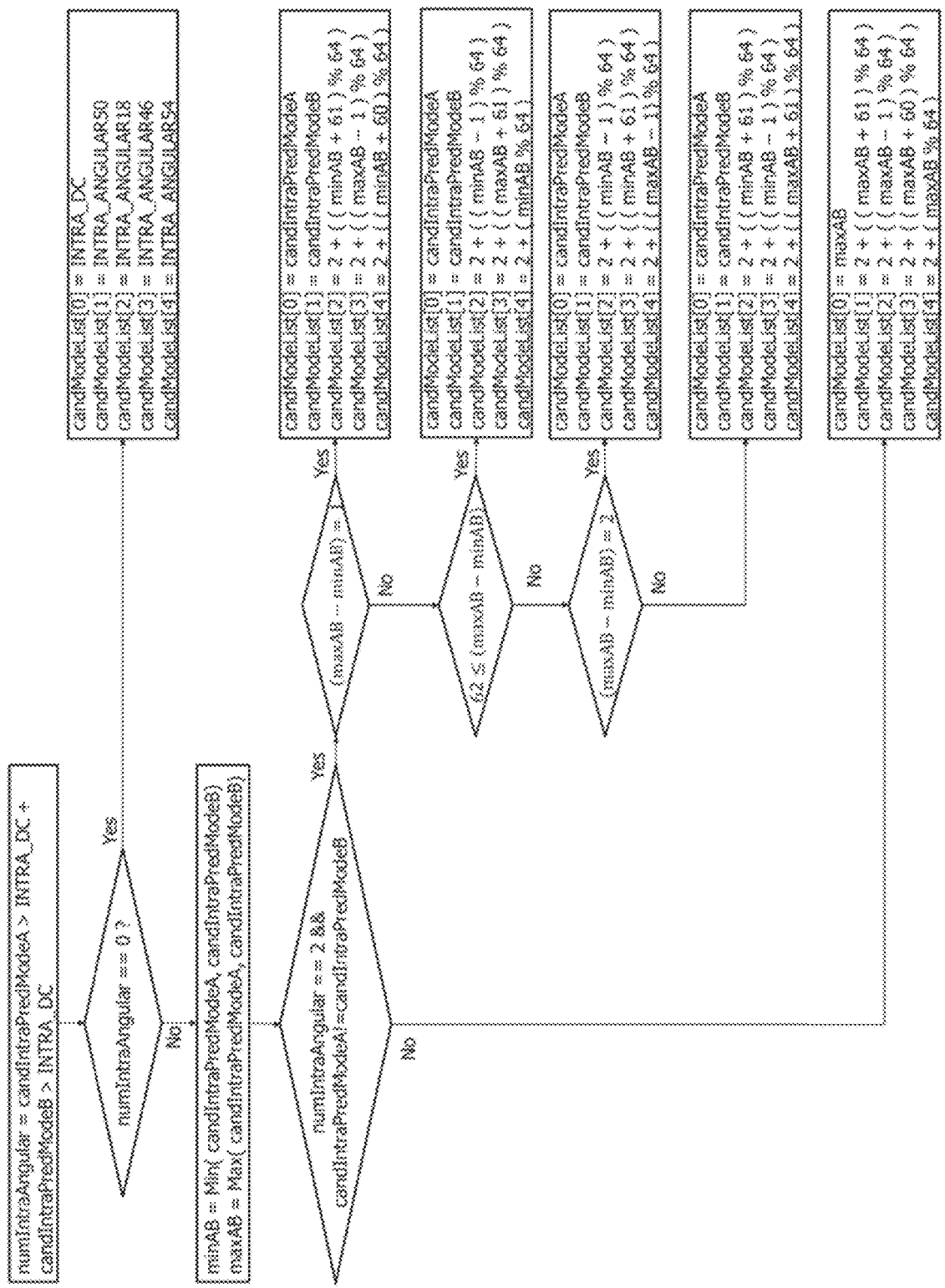
FIG. 37 is a flowchart illustrating a method of generating an MPM list according to still another embodiment of the present invention.

FIG. 36 is a diagram illustrating a syntax structure according to still another embodiment of the present invention. FIG. 37 is a flowchart illustrating a method of generating an MPM list according to still another embodiment of the present invention.

For example, the MPM list may be determined to be one of three or six categories in Table 7 and Table 8 below according to the intra prediction mode of the neighboring block.

TABLE 7

| Categories | MPM list |
|---|---|
| Category 1 | {Planar, DC, VER, HOR, VER − 4, VER + 4} |
| Category 2-1 | {Planar, Left, Above, Min − 1, Max + 1, Min − 2} |
| Category 2-2 | {Planar, Left, Above, Min + 1, Max − 1, Min + 2} |
| Category 2-3 | {Planar, Left, Above, Min + 1, Min − 1, Max + 1} |
| Category 2-4 | {Planar, Left, Above, Min − 1, Min + 1, Max − 1} |
| Category 3 | {Planar, Max, Max − 1, Max + 1, Max − 2, Max + 2} |

TABLE 8

| Categories | MPM list |
|---|---|
| Category 1 | {DC, VER, HOR, VER − 4, VER + 4} |
| Category 2-1 | {Left, Above, Min − 1, Max + 1, Min − 2} |
| Category 2-2 | {Left, Above, Min + 1, Max − 1, Min + 2} |
| Category 2-3 | {Left, Above, Min + 1, Min − 1, Max + 1} |
| Category 2-4 | {Left, Above, Min − 1, Min + 1, Max − 1} |
| Category 3 | {Max, Max − 1, Max + 1, Max − 2, Max + 2} |

In Table 7 and Table 8, Max may denote the prediction mode having a higher mode number among candIntraPredModeA and candIntraPredModeB, and Min may denote the prediction mode having a lower mode number among candIntraPredModeA and candIntraPredModeB. The Max and the Min may be referred to as MaxAB and MinAB, respectively. Further, VER may denote the mode number of the intra prediction mode in vertical direction, and HOR may denote the mode number of the intra prediction mode in horizontal direction.

Each category in Table 7 and Table 8 may represent the form of the MPM list constructed in the following cases.

Category 1 may be an example of an MPM list generated when both candIntraPredModeA and candIntraPredModeB are equal to or smaller than INTRA_DC, specifically, when candIntraPredModeA and candIntraPredModeB are the Planar or DC mode. For example, category 1 may be an example of an MPM list generated when both candIntraPredModeA and candIntraPredModeB are non-angular modes.

For example, category 1 may be configured as the MPM list including six MPMs that are Planar mode, DC mode, VER mode, HOR mode, VER−4 mode, and VER+4 mode. As another example, category 1 may be configured as the MPM list including five MPMs that are DC mode, VER mode, HOR mode, VER−4 mode, and VER+4 mode, in that order.

Category 2 may be an example of an MPM list generated when candIntraPredModeA and candIntraPredModeB differ and are greater than INTRA_DC, specifically, when candIntraPredModeA and candIntraPredModeB differ and are angular modes.

For example, category 2 may be configured according to MaxAB and MinAB as follows.

When the difference between MaxAB and MinAB is 1, the MPM list including six MPMs that are Planar mode, Left mode, Above mode, MinAB−1, MaxAB+1 mode, and MinAB−2 mode is configured.

As another example, when the difference between MaxAB and MinAB is 1, the MPM list including five MPMs that are Left mode, Above mode, MinAB−1, MaxAB+1 mode, and MinAB−2 mode is configured.

When the difference between maxAB and minAB is equal to or greater than 62, the MPM list including six MPMs that are Planar mode, Left mode, Above mode, MinAB+1, MaxAB−1 mode, and MinAB+2 mode is configured.

As another example, when the difference between maxAB and minAB is equal to or greater than 62, the MPM list including five MPMs that are Left mode, Above mode, MinAB+1, MaxAB−1 mode, and MinAB+2 mode is configured.

When the difference between maxAB and minAB is 2, the MPM list including six MPMs that are Planar mode, Left mode, Above mode, minAB+1 mode, minAB−1 mode, and maxAB+1 mode is configured.

As another example, when the difference between maxAB and minAB is 2, the MPM list including five MPMs that are Left mode, Above mode, minAB+1 mode, minAB−1 mode, and maxAB+1 mode is configured.

When the conditions are not met, the MPM list including six MPMs that are Planar mode, Left mode, Above mode, minAB−1 mode, minAB+1 mode, and maxAB−1 mode is configured.

As another example, when the conditions are not met, the MPM list including five MPMs that are Left mode, Above mode, minAB−1 mode, minAB+1 mode, and maxAB−1 mode is configured.

Category 3 may be an example of an MPM list generated when candIntraPredModeA and candIntraPredModeB are the same and are greater than INTRA_DC, or when candIntraPredModeA and candIntraPredModeB differ and one thereof is greater than INTRA_DC.

For example, category 3 may be configured as the MPM list including six MPMs that are Planar mode, MaxAB mode, MaxAB−1 mode, MaxAB+1 mode, MaxAB−2, and MaxAB+2 mode. As another example, category 3 may be configured as the MPM list including five MPMs that are MaxAB mode, MaxAB−1 mode, MaxAB+1 mode, MaxAB−2, and MaxAB+2 mode.

For example, in candIntraPredModeA and candIntraPredModeB, the number of angular modes may be derived according to Equation 21 below.

numIntraAngular=candIntraPredModeA>INTRA_DC+
candIntraPredModeB>INTRA_DC   [Equation 21]

As an example of Equation 21, when candIntraPredModeA is an angular mode and candIntraPredModeB is not an angular mode, the number (numIntraAngular) of angular modes has a value of 1.

For example, when both candIntraPredModeA and candIntraPredModeB are equal to or smaller than INTRA_DC, the MPM list of the current block is derived as follows. Hereinbelow, this condition may be defined as condition 1.

That is, condition 1 may be defined as a case where in candIntraPredModeA and candIntraPredModeB, the number of angular modes is 0.

That is, when both the intra prediction mode of the neighboring block positioned on the spatial left and the intra prediction mode of the neighboring block positioned on the spatial top are non-angular modes, the MPM list of the current block is derived according to Equation 22 below.

That is, when candIntraPredModeA and candIntraPredModeB are the Planar or DC mode, the MPM list (candModeList) of the current block is derived according to Equation 22 below.

candModeList[0]=INTRA_DC candModeList[1]=INTRA_ANGULAR50 candModeList[2]=INTRA_ANGULAR18 candModeList[3]=INTRA_ANGULAR46 candModeList[4]=INTRA_ANGULAR54   [Equation 22]

As another example, when the condition 1 indicates false, when candIntraPredModeA and candIntraPredModeB differ, and when both candIntraPredModeA and candIntraPredModeB are greater than INTRA_DC, the MPM list of the current block is derived as follows. Hereinafter, the case where candIntraPredModeA and candIntraPredModeB differ and both candIntraPredModeA and candIntraPredModeB are greater than INTRA_DC may be defined as condition 2.

That is, condition 2 may be defined as a case where in candIntraPredModeA and candIntraPredModeB, the number of angular modes is two and candIntraPredModeA and candIntraPredModeB differ.

That is, when the intra prediction mode of the neighboring block positioned on the spatial left is different from the intra prediction mode of the neighboring block positioned on the spatial top, and when both the intra prediction mode of the neighboring block positioned on the spatial left and the intra prediction mode of the neighboring block positioned on the spatial top are angular modes, the MPM list of the current block is derived according to Equation 23, Equation 24, Equation 25, or Equation 26 below.

For example, when maxAB−minAB is equal to 1, the MPM list (candModeList) of the current block is derived according to Equation 23 below.

candModeList[0]=candIntraPredModeA candModeList[1]=candIntraPredModeB candModeList[2]=2+((minAB+61)%64)

candModeList[3]=2+((maxAB−1)%64)

candModeList[4]=2+((minAB+60)%64)   [Equation 23]

For example, when maxAB−minAB is equal to or greater than 62, the MPM list (candModeList) of the current block is derived according to Equation 24 below.

candModeList[0]=candIntraPredModeA candModeList[1]=candIntraPredModeB candModeList[2]=2+((minAB−1)%64)

candModeList([3]=2+((maxAB+61)%64)

candModeList[4]=2+(minAB%64)   [Equation 24]

For example, when maxAB−minAB is equal to 2, the MPM list (candModeList) of the current block is derived according to Equation 25 below.

candModeList[0]=candIntraPredModeA candModeList[1]=candIntraPredModeB candModeList[2]=2+((minAB−1)%64)

candModeList[3]=2+((minAB+61)%64)

candModeList[4]=2+((maxAB−1)%64)   [Equation 25]

For example, when the conditions are not met, the is MPM list (candModeList) of the current block is derived according to Equation 26 below.

candModeList[0]=candIntraPredModeA candModeList[1]=candIntraPredModeB candModeList[2]=2+((minAB+61)%64)

candModeList[3]=2+((minAB−1)%64)

candModeList[4]=2+((maxAB+61)%64)   [Equation 26]

As still another example, when the condition 2 is not met, in other words, when candIntraPredModeA and candIntraPredModeB are the same or when candIntraPredModeA and candIntraPredModeB include only one angular mode, the MPM list of the current block is derived according to Equation 27 below.

candModeList[0]=maxAB candModeList[1]=2+((maxAB+61)%64)

candModeList[2]=2+((maxAB-1)%64)

candModeList[3]=2+((maxAB+60)%64)

candModeList[4]=2+(maxAB%64)  [Equation 27]

Figure 39:
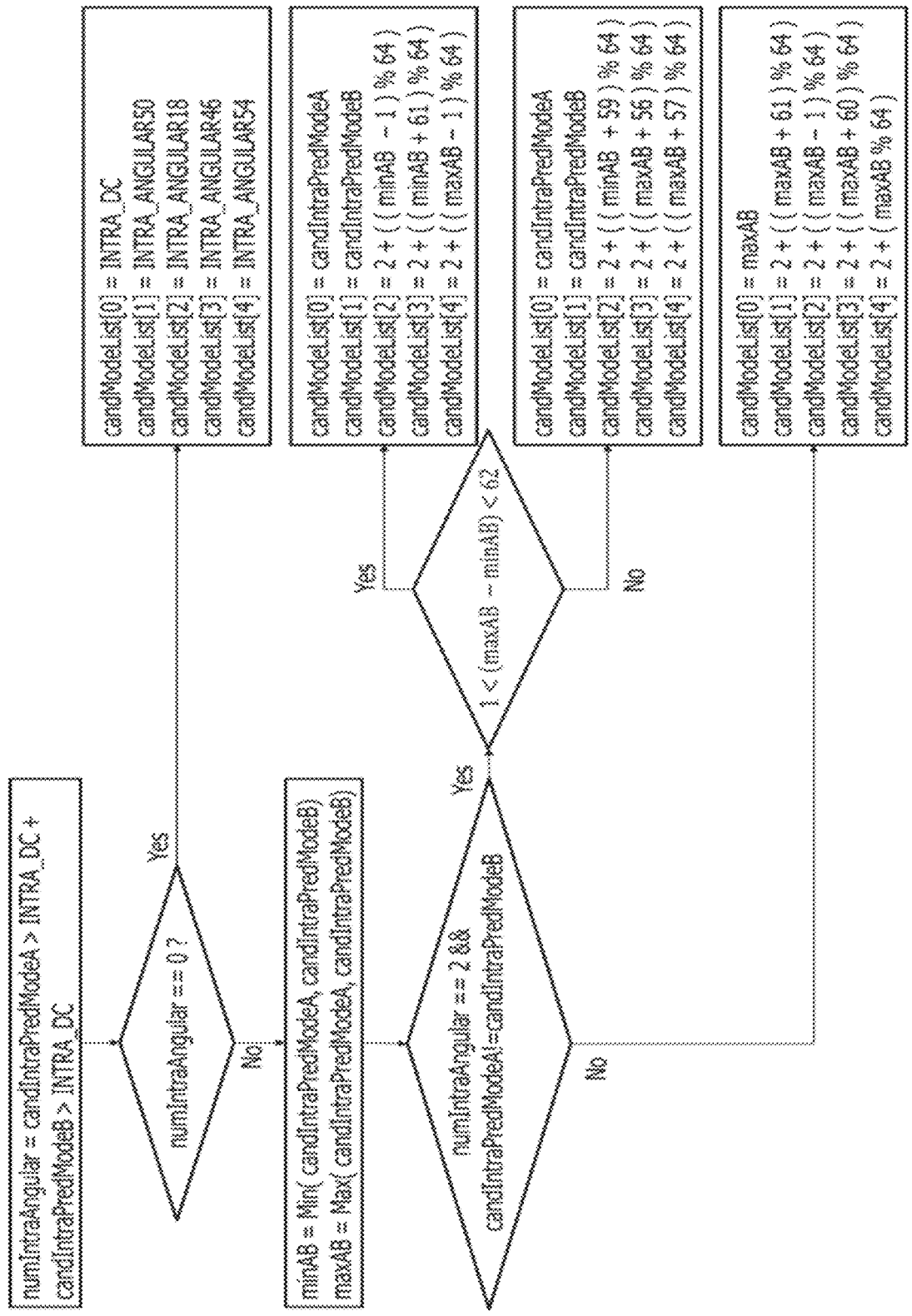
FIG. 39 is a flowchart illustrating a method of generating an MPM list according to still another embodiment of the present invention.

FIG. 38 is a diagram illustrating a syntax structure according to still another embodiment of the present invention. FIG. 39 is a flowchart illustrating a method of generating an MPM list according to still another embodiment of the present invention.

For example, the MPM list may be determined to be one of three or four categories in Table 9 and Table 10 below according to the intra prediction mode of the neighboring block.

TABLE 9

| Categories | MPM list |
| --- | --- |
| Category 1 | {Planar, DC, VER, HOR, VER − 4, VER + 4} |
| Category 2-1 | {Planar, Left, Above, Min + 1, Min − 1, Max + 1} |
| Category 2-2 | {Planar, Left, Above, Min − 3, Max − 6, Max − 5} |
| Category 3 | {Planar, Max, Max − 1, Max + 1, Max − 2, Max + 2} |

TABLE 10

| Categories | MPM list |
| --- | --- |
| Category 1 | {DC, VER, HOR, VER − 4, VER + 4} |
| Category 2-1 | {Left, Above, Min + 1, Min − 1, Max + 1} |
| Category 2-2 | {Left, Above, Min − 3, Max − 6, Max − 5} |
| Category 3 | {Max, Max − 1, Max + 1, Max − 2, Max + 2} |

For example, the MPM list may be composed of six MPMs including the Planar mode or may be composed of five MPMs excluding the Planar mode.

In Table 9 and Table 10, Max may denote the prediction mode having a higher mode number among candIntraPredModeA and candIntraPredModeB, and Min may denote the prediction mode having a lower mode number among candIntraPredModeA and candIntraPredModeB. The Min and the Max may be referred to as MinAB and MaxAB, respectively. Further, VER may denote the mode number of the intra prediction mode in vertical direction, and HOR may denote the mode number of the intra prediction mode in horizontal direction.

Each category in Table 9 and Table 10 may represent the form of the list of MPMs which is constructed in the following cases.

Category 1 may be an example of an MPM list generated when both candIntraPredModeA and candIntraPredModeB are equal to or smaller than INTRA_DC, specifically, when candIntraPredModeA and candIntraPredModeB are the Planar or DC mode. For example, category 1 may be an example of an MPM list generated when both candIntraPredModeA and candIntraPredModeB are non-angular modes.

For example, category 1 may be configured as the MPM list including six MPMs that are Planar mode, DC mode, VER mode, HOR mode, VER−4 mode, and VER+4 mode. As another example, category 1 may be configured as the MPM list including five MPMs that are DC mode, VER mode, HOR mode, VER−4 mode, and VER+4 mode, in that order.

Category 2 may be an example of an MPM list generated when candIntraPredModeA and candIntraPredModeB differ and are greater than INTRA_DC, specifically, when candIntraPredModeA and candIntraPredModeB differ and are angular modes.

For example, category 2 may be configured according to MaxAB and MinAB as follows.

When the difference between MaxAB and MinAB is equal to or greater than 2 and is equal to or smaller than 61, the MPM list including six MPMs that are Planar mode, Left mode, Above mode, MinAB+1, MinAB−1 mode, and MaxAB+1 mode is configured.

As another example, when the difference between Max and Min is equal to or greater than 2 and is equal to or smaller than 61, the MPM list including five MPMs that are Left mode, Above mode, MinAB+1, MinAB−1 mode, and MaxAB+1 mode is configured.

When the condition is not met, specifically, when the difference between MaxAB and MinAB is smaller than 2 or is greater than 61, the MPM list including six MPMs that are Planar mode, Left mode, Above mode, MinAB−3, MaxAB−6 mode, and MaxAB−5 mode is configured.

As another example, when the condition is not met, specifically, when the difference between MaxAB and MinAB is smaller than 2 or greater than 61, the MPM list including five MPMs that are Left mode, Above mode, MinAB−3, MaxAB−6 mode, and MaxAB−5 mode is configured.

Category 3 may be an example of an MPM list generated when candIntraPredModeA and candIntraPredModeB are the same and are greater than INTRA_DC, or when candIntraPredModeA and candIntraPredModeB differ and one thereof is greater than INTRA_DC.

For example, category 3 may be configured as the MPM list including six MPMs that are Planar mode, MaxAB mode, MaxAB−1 mode, MaxAB+1 mode, MaxAB−2, and MaxAB+2 mode. As another example, category 3 may be configured as the MPM list including five MPMs that are MaxAB mode, MaxAB−1 mode, MaxAB+1 mode, MaxAB−2, and MaxAB+2 mode.

For example, in candIntraPredModeA and candIntraPredModeB, the number of angular modes may be derived according to Equation 28 below.

$$\text{numIntraAngular} = \text{candIntraPredModeA} > \text{INTRA\_DC} + \text{candIntraPredModeB} > \text{INTRA\_DC} \quad \text{[Equation 28]}$$

As an example of Equation 28, when candIntraPredModeA is an angular mode and candIntraPredModeB is not an angular mode, the number (numIntraAngular) of angular modes has a value of 1. For example, when both candIntraPredModeA and candIntraPredModeB are equal to or smaller than INTRA_DC, the MPM list of the current block is derived as follows. Hereinbelow, this condition may be defined as condition 1.

That is, condition 1 may be defined as a case where in candIntraPredModeA and candIntraPredModeB, the number of angular modes is 0.

That is, when both the intra prediction mode of the neighboring block positioned on the spatial left and the intra prediction mode of the neighboring block positioned on the spatial top are non-angular modes, the MPM list of the current block is derived according to Equation 29 below.

That is, when candIntraPredModeA and candIntraPredModeB are the Planar or DC mode, the MPM list (candModeList) of the current block is derived according to Equation 29 below.

candModeList[0]=INTRA_DC candModeList[1]=INTRA_ANGULAR50 candModeList[2]=INTRA_ANGULAR18 candModeList[3]=INTRA_ANGULAR46 candModeList[4]=INTRA_ANGULAR54     [Equation 29]

As another example, when the condition 1 indicates false, when candIntraPredModeA and candIntraPredModeB differ, and when both candIntraPredModeA and candIntraPredModeB are greater than INTRA_DC, the MPM list of the current block is derived as follows. Hereinafter, the case where candIntraPredModeA and candIntraPredModeB differ and both candIntraPredModeA and candIntraPredModeB are greater than INTRA_DC may be defined as condition 2.

That is, condition 2 may be defined as a case where in candIntraPredModeA and candIntraPredModeB, the number of angular modes is two and candIntraPredModeA and candIntraPredModeB differ.

That is, when the intra prediction mode of the neighboring block positioned on the spatial left is different from the intra prediction mode of the neighboring block positioned on the spatial top, and when both the intra prediction mode of the neighboring block positioned on the spatial left and the intra prediction mode of the neighboring block positioned on the spatial top are angular modes, the MPM list of the current block is derived according to Equation 30 or Equation 31 below.

For example, when maxAB−minAB is equal to or greater than 2 and is smaller than 62, the MPM list (candModeList) of the current block is derived according to Equation 30 below.

candModeList[0]=candIntraPredModeA candModeList[1]=candIntraPredModeB candModeList[2]=2+((minAB−1)%64)

candModeList[3]=2+((minAB+61)%64)

candModeList[4]=2+(maxAB%64)     [Equation 30]

For example, when the condition is not met (when maxAB−minAB is smaller than 2 or is equal to or greater than 62), the MPM list (candModeList) of the current block is derived according to Equation 31 below.

candModeList[0]=candIntraPredModeA candModeList[1]=candIntraPredModeB candModeList[2]=2+((minAB+59)%64)

candModeList[3]=2+((maxAB+56)%64)

candModeList[4]=2+((maxAB+57)%64)     [Equation 31]

As still another example, when the condition 2 is not met, in other words, when candIntraPredModeA and candIntraPredModeB are the same or when candIntraPredModeA and candIntraPredModeB include only one angular mode, the MPM list of the current block is derived according to Equation 32 below.

candModeList[0]=maxAB candModeList[1]=2+((maxAB+61)%64)

candModeList[2]=2+((maxAB−1)%64)

candModeList[3]=2+((maxAB+60)%64)

candModeList[4]=2+(maxAB%64)     [Equation 32]

Figure 41:
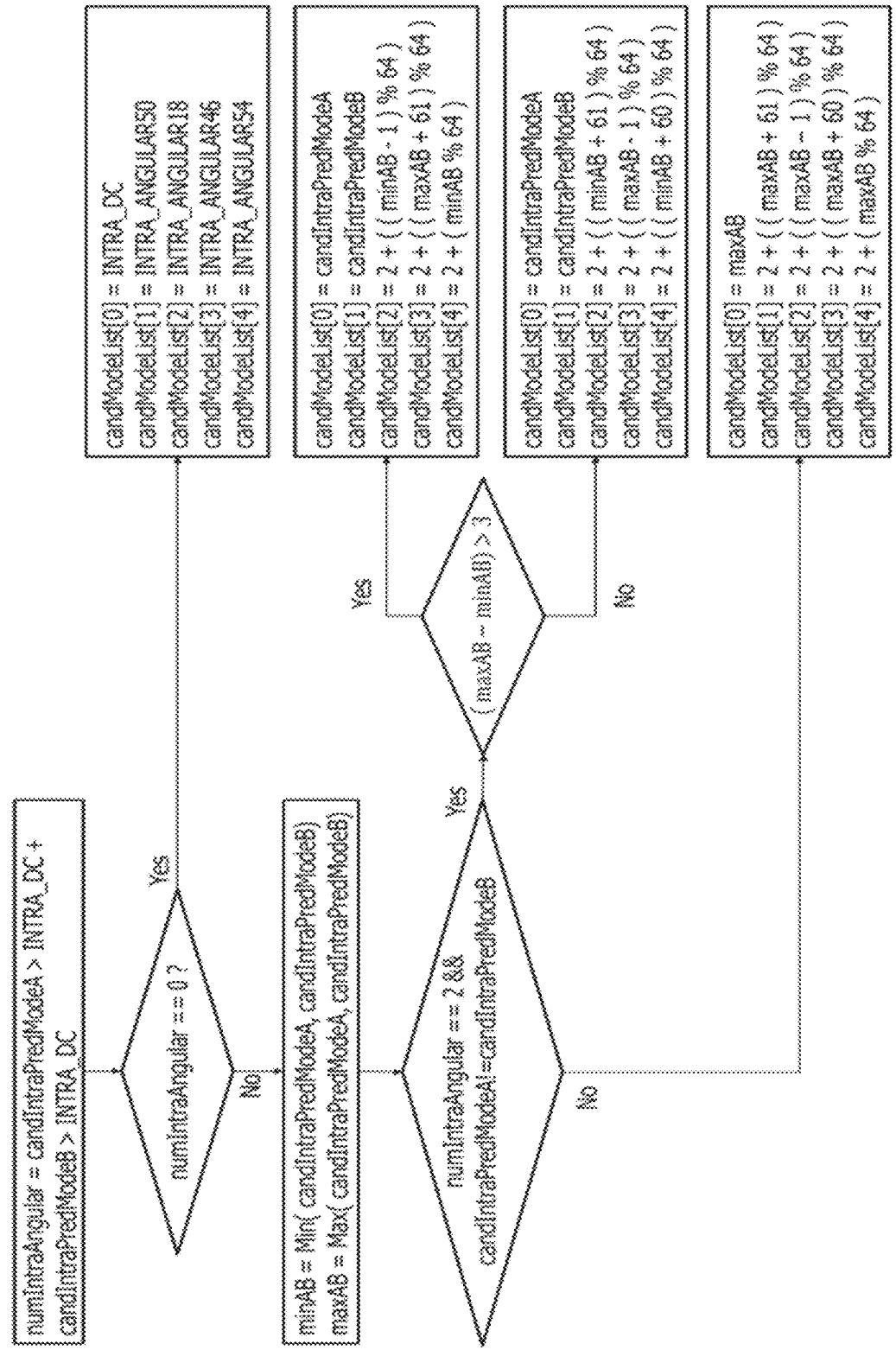
FIG. 41 is a flowchart illustrating a method of generating an MPM list according to still another embodiment of the present invention.

FIG. 40 is a diagram illustrating a syntax structure according to still another embodiment of the present invention. FIG. 41 is a flowchart illustrating a method of generating an MPM list according to still another embodiment of the present invention.

For example, the MPM list may be determined to be one of three or four categories in Table 11 and Table 12 below according to the intra prediction mode of the neighboring block.

TABLE 11

| Categories | MPM list |
|---|---|
| Category 1 | {Planar, DC, VER, HOR, VER − 4, VER + 4} |
| Category 2-1 | {Planar, Left, Above, Min + 1, Max − 1, Min + 2} |
| Category 2-2 | {Planar Left, Above, Min − 1, Max + 1, Min − 2} |
| Category 3 | {Planar, Max, Max − 1, Max + 1, Max − 2, Max + 2} |

TABLE 12

| Categories | MPM list |
|---|---|
| Category 1 | {DC, VER, HOR, VER − 4, VER + 4} |
| Category 2-1 | {Left, Above, Min + 1, Max − 1, Min + 2} |
| Category 2-2 | {Left, Above, Min − 1, Max + 1, Min − 2} |
| Category 3 | {Max, Max − 1, Max + 1, Max − 2, Max + 2} |

For example, the MPM list may be composed of six MPMs including the Planar mode or may be composed of five MPMs excluding the Planar mode.

In Table 11 and Table 12, Max may denote the prediction mode having a higher mode number among candIntraPredModeA and candIntraPredModeB, and Min may denote the prediction mode having a lower mode number among candIntraPredModeA and candIntraPredModeB. The Min and the Max may be referred to as MinAB and MaxAB, respectively. Further, VER may denote the mode number of the intra prediction mode in vertical direction, and HOR may denote the mode number of the intra prediction mode in horizontal direction.

Each category in Table 11 and Table 12 may represent the form of the list of MPMs which is constructed in the following cases.

Category 1 may be an example of an MPM list generated when both candIntraPredModeA and candIntraPredModeB are equal to or smaller than INTRA_DC, specifically, when candIntraPredModeA and candIntraPredModeB are the Planar or DC mode. For example, category 1 may be an example of an MPM list generated when both candIntraPredModeA and candIntraPredModeB are non-angular modes.

For example, category 1 may be configured as the MPM list including six MPMs that are Planar mode, DC mode, VER mode, HOR mode, VER−4 mode, and VER+4 mode. As another example, category 1 may be configured as the MPM list including five MPMs that are DC mode, VER mode, HOR mode, VER−4 mode, and VER+4 mode, in that order.

Category 2 may be an example of an MPM list generated when candIntraPredModeA and candIntraPredModeB differ and are greater than INTRA_DC, specifically, when candIntraPredModeA and candIntraPredModeB differ and are angular modes.

For example, category 2 may be configured according to MaxAB and MinAB as follows.

When the difference between MaxAB and MinAB is greater than 3, the MPM list including six MPMs that are Planar mode, Left mode, Above mode, MinAB+1, MaxAB−1 mode, and MinAB+2 mode is configured.

As another example, when the difference between MaxAB and MinAB is greater than 3, the MPM list including five MPMs that are Left mode, Above mode, MinAB+1, MaxAB−1 mode, and MinAB+2 mode is configured.

When the condition is not met, specifically, when the difference between MaxAB and MinAB is equal to or smaller than 3, the MPM list including six MPMs that are Planar mode, Left mode, Above mode, MinAB−1, MaxAB+1 mode, and MinAB−2 mode is configured.

As another example, when the condition is not met, specifically, when the difference between MaxAB and MinAB is equal to or smaller than 3, the MPM list including five MPMs that are Left mode, Above mode, MinAB−1, MaxAB+1 mode, and MinAB−2 mode is configured.

Category 3 may be an example of an MPM list generated when candIntraPredModeA and candIntraPredModeB are the same and are greater than INTRA_DC, or when candIntraPredModeA and candIntraPredModeB differ and one thereof is greater than INTRA_DC.

For example, category 3 may be configured as the MPM list including six MPMs that are Planar mode, MaxAB mode, MaxAB−1 mode, MaxAB+1 mode, MaxAB−2, and MaxAB+2 mode. As another example, category 3 may be configured as the MPM list including five MPMs that are MaxAB mode, MaxAB−1 mode, MaxAB+1 mode, MaxAB−2, and MaxAB+2 mode. For example, in candIntraPredModeA and candIntraPredModeB, the number of angular modes may be derived according to Equation 33 below.

$$numIntraAngular = candIntraPredModeA > INTRA\_DC + candIntraPredModeB > INTRA\_DC \quad \text{[Equation 33]}$$

As an example of Equation 33, when candIntraPredModeA is an angular mode and candIntraPredModeB is not an angular mode, the number (numIntraAngular) of angular modes has a value of 1.

For example, when both candIntraPredModeA and candIntraPredModeB are equal to or smaller than INTRA_DC, the MPM list of the current block is derived as follows. Hereinbelow, this condition may be defined as condition 1.

That is, condition 1 may be defined as a case where in candIntraPredModeA and candIntraPredModeB, the number of angular modes is 0.

That is, when both the intra prediction mode of the neighboring block positioned on the spatial left and the intra prediction mode of the neighboring block positioned on the spatial top are non-angular modes, the MPM list of the current block is derived according to Equation 34 below.

That is, when candIntraPredModeA and candIntraPredModeB are the Planar or DC mode, the MPM list (candModeList) of the current block is derived according to Equation 34 below.

candModeList[0]=INTRA_DC candModeList[1]=INTRA_ANGULAR50 candModeList([2]=INTRA_ANGULAR18 candModeList[3]=INTRA_ANGULAR46 candModeList[4]=INTRA_ANGULAR54 [Equation 34]

As another example, when the condition 1 indicates false, when candIntraPredModeA and candIntraPredModeB differ, and when both candIntraPredModeA and candIntraPredModeB are greater than INTRA_DC, the MPM list of the current block is derived as follows. Hereinafter, the case where candIntraPredModeA and candIntraPredModeB differ and both candIntraPredModeA and candIntraPredModeB are greater than INTRA_DC may be defined as condition 2.

That is, condition 2 may be defined as a case where in candIntraPredModeA and candIntraPredModeB, the number of angular modes is two and candIntraPredModeA and candIntraPredModeB differ.

That is, when the intra prediction mode of the neighboring block positioned on the spatial left is different from the intra prediction mode of the neighboring block positioned on the spatial top, and when both the intra prediction mode of the neighboring block positioned on the spatial left and the intra prediction mode of the neighboring block positioned on the spatial top are angular modes, the MPM list of the current block is derived according to Equation 35 or Equation 36 below.

For example, when maxAB−minAB is greater than 3, the MPM list (candModeList) of the current block is derived according to Equation 35 below.

candModeList[0]=candIntraPredModeA candModeList[1]=candIntraPredModeB candModeList[2]=2+((minAB−1)%64)

candModeList[3]=2+((maxAB+61)%64)

candModeList[4]=2+(minAB%64) [Equation 35]

For example, when the condition is not met (when maxAB−minAB is equal to or smaller than 3), the MPM list (candModeList) of the current block is derived according to Equation 36 below.

candModeList[0]=candIntraPredModeA candModeList[1]=candIntraPredModeB candModeList[2]=2+((minAB+61)%64)

candModeList[3]=2+((maxAB−1)%64)

candModeList[4]=2+((minAB+60)%64) [Equation 36]

As still another example, when the condition 2 is not met, in other words, when candIntraPredModeA and candIntraPredModeB are the same or when candIntraPredModeA and candIntraPredModeB include only one angular mode, the MPM list of the current block is derived according to Equation 37 below.

candModeList[0]=maxAB candModeList[1]=2+((maxAB+61)%64)

candModeList[2]=2+((maxAB−1)%64)

candModeList[3]=2+((maxAB+60)%64)

candModeList[4]=2+(maxAB%64) [Equation 37]

Hereinafter, a method of encoding and decoding an image on the basis of a syntax element merge mode according to another embodiment of the present invention will be described with reference to the accompanying drawings.

Figure 42:
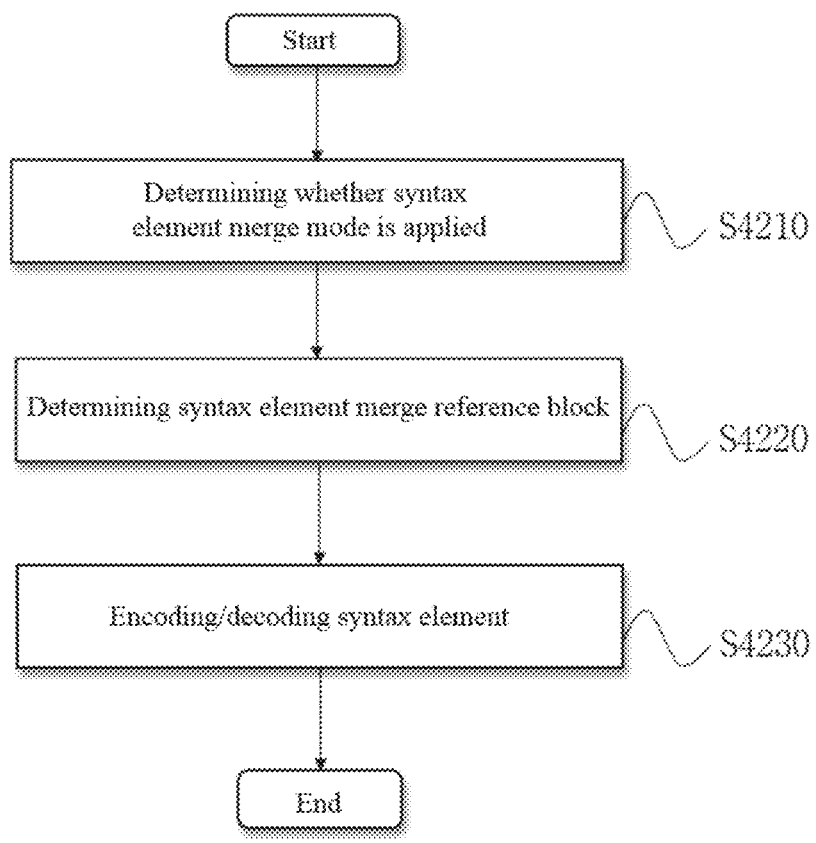
FIG. 42 is a diagram illustrating an encoding or decoding method using a syntax element merge mode according to an embodiment of the present invention.

FIG. 42 is a diagram illustrating an encoding or decoding method using a syntax element merge mode according to an embodiment of the present invention.

The encoding/decoding method shown in FIG. 42 may be performed by the encoding apparatus 100 or the decoding apparatus 200.

The encoding/decoding method according to the present invention may include, determining whether a syntax element merge mode for a current block is applied at step S4210, determining a syntax element merge reference block at step S4220, and encoding/decoding a syntax element of the current block at step S4230.

For example, at step S4210, whether the syntax element merge mode for encoding/decoding the current block is applied may be determined by a syntax element merge mode flag, whether the syntax element merge mode for the current block is permitted may be determined by a syntax element merge mode permission flag, and the maximum number of reference blocks that are possibly used in the syntax element merge mode may be selected according to the maximum number (max_num) of syntax element merge reference blocks.

For example, in selecting the syntax element merge reference block at step S4220, at least one among the spatially neighboring block, the temporally neighboring block, a corresponding attribute block, and a syntax element merge index of the current block may be used.

For example, at step S4230, for encoding/decoding of the current block, at least one piece of syntax element information among partitioning-related encoding information, prediction-related encoding information, and transform-related encoding information of the syntax element merge reference block may be determined as a syntax element of the current block.

For example, whether step S4210 and/or step S4220 is performed may be determined on the basis of at least one among an encoding parameter, picture information, slice information, tile information, a quantization parameter (QP), a coded block flag (CBF), a block size, a block depth, a block shape, an entropy encoding/decoding method, partitioning information of a neighboring block, and a temporal hierarchy level.

As another example, at step S4210, the syntax element merge mode flag, the syntax element merge mode permission flag, and the maximum number of the syntax element merge reference blocks may be signaled to the decoder on the basis of at least one among a sequence parameter set, a picture parameter set, a picture level, a subpicture level, a slice level, a tile level, and a block level.

Herein, the block may be at least one among a coding tree block, a coding block, a prediction block, a transform block, and a block in a predetermined size.

In the following description, the terms below may have the meanings as follows.

The syntax element may refer to each piece of information that is present for image decoding within a bitstream in a video compression standard.

The syntax element merge reference block may refer to a reference block that is used to determine syntax element information of the current block.

The syntax element merge mode may refer to a mode for determining the syntax element of the current block by using the syntax element merge reference block.

The syntax element merge mode flag may refer to a syntax element that indicates whether the syntax element merge mode for the current block is applied.

The syntax element merge mode permission flag may refer to a syntax element that indicates whether the syntax element merge mode for the current block is permitted.

A syntax element merge reference block list may refer to a set (list) of candidate blocks that may be referenced to determine the syntax element information of the current block.

The maximum number (max_num) of syntax element merge reference blocks may refer to a syntax element for indicating the maximum number of candidate blocks in the syntax element merge reference block list.

The syntax element merge index may refer to a syntax element that is used to indicate the reference block referenced to determine the syntax element of the current block in the syntax element merge reference block list.

Hereinafter, a method of determining whether the syntax element merge mode is applied according to several embodiments of the present invention will be described.

For example, according to the syntax element merge mode flag, it is determined whether the syntax element merge mode for the current block is applied.

The syntax element merge mode flag may have a first value signaling that the syntax element merge mode for the current block is not applied, and may have a second value signaling that the syntax element merge mode for the current block is applied. For example, the first value may be 0, and the second value may be 1. However, no limitation to the values is imposed. The first value may be 1, and the second value may be 0.

The syntax element merge mode flag may be signaled at the level of at least one among a sequence, a picture, a slice, a CTU, and a block in a predetermined size.

When the value of the syntax element merge mode flag is a second value, the syntax element merge index is signaled or parsed.

For example, according to the syntax element merge mode permission flag, whether the syntax element merge mode is permitted may be determined.

The syntax element merge mode permission flag may signal whether the syntax element merge mode is permitted for at least one among a sequence, a picture, a slice, a tile, a CTU, and a block in a predetermined size. The syntax element merge mode permission flag may be signaled at the level of at least one among a sequence, a picture, a subpicture, a slice, a tile, a CTU, and a block in a predetermined size.

The syntax element merge mode permission flag may have a first value signaling that the syntax element merge mode for the current block is not permitted, and may have a second value signaling that the syntax element merge mode for the current block is permitted. For example, the first value may be 0, and the second value may be 1. However, no limitation to the values is imposed. The first value may be 1, and the second value may be 0.

When the syntax element merge mode permission flag has a first value, at least one among the syntax element merge mode flag, the syntax element merge index, and the maximum number (max_num) of syntax element merge reference blocks is not signaled. On the other hand, when the syntax element merge mode permission flag has a second value, at least one among the syntax element merge mode flag, the syntax element merge index, and the maximum number (max_num) of syntax element merge reference blocks is signaled.

For example, according to the maximum number (max_num) of syntax element merge reference blocks, the maximum number of syntax element merge reference block candidates of the current block may be determined. The maximum number (max_num) of syntax element merge reference blocks may indicate the maximum number of candidates in the syntax element merge reference block list.

The maximum number (max_num) of syntax element merge reference blocks may be signaled at the level of at least one among a sequence, a picture, a subpicture, a slice, a tile, a CTU, and a block in a predetermined size. Further, the encoder and the decoder may predefine the number of candidate blocks in the syntax element merge reference block list. Alternatively, the number of candidate blocks may be determined on the basis of the encoding parameter of the current block and/or the adjacent block. The encoding parameter may include, for example, at least one among the size, the shape of the block, and/or the availability of the adjacent block. For example, when the adjacent block is unavailable, the syntax element of the unavailable adjacent block is replaced on the basis of the syntax element of the available adjacent block.

For example, according to binarization in Table 13 below, the maximum number of syntax element merge reference block candidates may be signaled through the maximum number (max_num) of syntax element merge reference blocks.

TABLE 13

| syntax element merge max_num | binarization |
|---|---|
| 1 | 0 |
| 2 | 10 |
| 3 | 110 |
| 4 | 1110 |
| 5 | 1111 |

Figure 43:
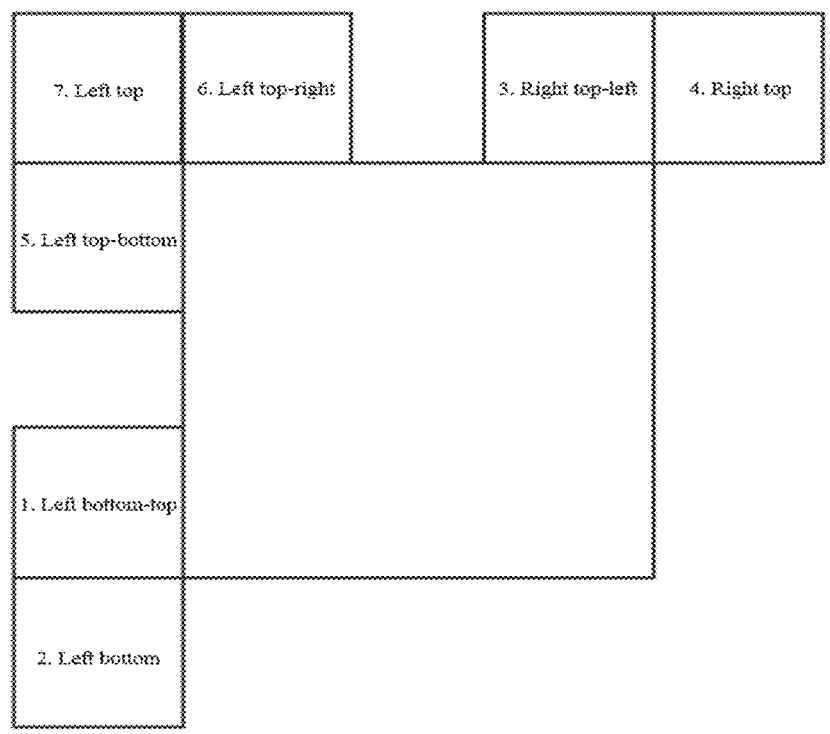
FIG. 43 is a diagram illustrating a neighboring block that may be used in several embodiments of the present invention.

FIG. 43 is a diagram illustrating a neighboring block that may be used in several embodiments of the present invention.

According to the maximum number of syntax element merge reference candidate blocks, the position of the block that is possibly referenced may be determined. For example, the position of the reference block may be determined as shown in FIG. 43.

As another example, the search order of reference blocks may be determined. For example, when the maximum number (max_num) of syntax element merge reference blocks is equal to or greater than 2, the candidate block for a usable syntax element merge reference block is determined according to the search order. For example, the search order may be the same as the numbers shown in respective neighboring blocks in FIG. 43.

For example, when a particular candidate block is unavailable, the candidate block is not included in the merge reference block list.

When a particular candidate block is unavailable, the syntax element of the unavailable candidate block is replaced on the basis of the syntax element of another available candidate block. For example, the syntax element of the immediately preceding available candidate block in search order may be used to replace the syntax element of the unavailable candidate block. Alternatively, by using a statistical value of the syntax elements of two or more preceding and following candidate blocks in search order, the syntax element of the unavailable candidate block may be replaced. Herein, the statistical value may be one among an average value, a maximum value, a mode value, a minimum value, a median value, and a representative value.

Hereinafter, a method of determining a syntax element merge reference block according to several embodiments of the present invention will be described.

In selecting the syntax element merge reference block for the current block, at least one among the spatially neighboring block, the temporally corresponding block, the corresponding attribute (luma-chroma) block, and the syntax element merge index of the current block may be used.

For example, the spatially neighboring block of the current block may be selected as the syntax element merge reference block for the current block. For example, at least one of the spatially neighboring blocks according to FIG. 43 may be selected as the syntax element merge reference block.

As another example, the corresponding luma block of the current chroma block may be selected as the syntax element merge reference block for the current block.

Figure 44:
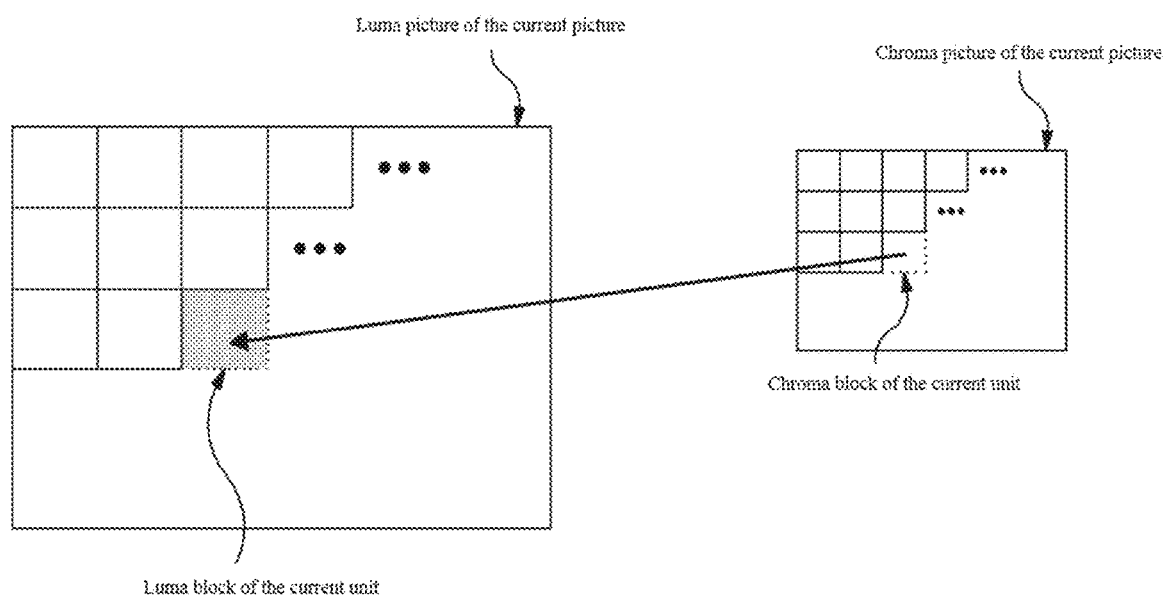
FIG. 44 is a diagram illustrating a corresponding luma block of a chroma block according to an embodiment of the present invention.

FIG. 44 is a diagram illustrating a corresponding luma block of a chroma block according to an embodiment of the present invention.

For example, in deriving the partitioning information of at least one among QT, BT, TT, and BTS of the current chroma block, the corresponding luma block of the current chroma block may be selected as the syntax element merge reference block of the current chroma block.

As another example, in deriving the prediction information of the current chroma block, the corresponding luma block of the current chroma block may be selected as the syntax element merge reference block of the current chroma block.

As still another example, in deriving/selecting the transform information of the current chroma block, the corresponding luma block of the current chroma block may be selected as the syntax element merge reference block of the current chroma block.

Figure 45:
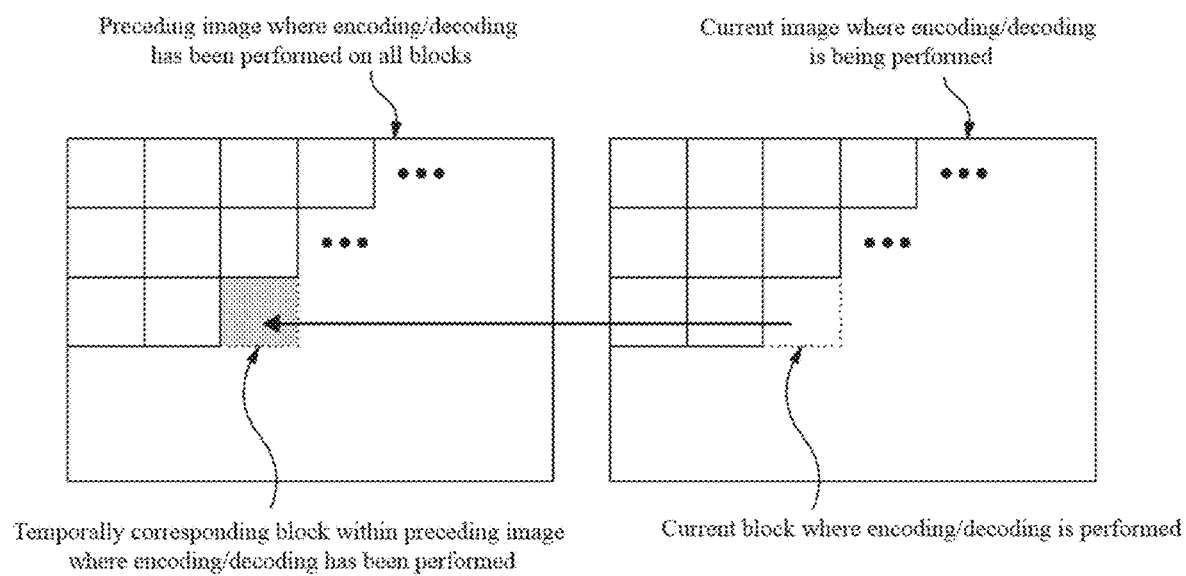
FIG. 45 is a diagram illustrating a method of referencing a temporally neighboring block according to an embodiment of the present invention.

FIG. 45 is a diagram illustrating a method of referencing a temporally neighboring block according to an embodiment of the present invention.

As still another example, in selecting the syntax element merge reference block of the current block, the temporally corresponding block of the current block may be selected as the syntax element merge reference block. Herein, the temporally corresponding block may be determined on the basis of the position of the current block. For example, the block at the same position as the current block may be determined as the temporally corresponding block. Alternatively, a block adjacent to the block at the same position as the current block may be determined as the temporally corresponding block. For example, a block adjacent to a corner of the block at the same position as the current block may be determined as the temporally corresponding block.

For example, as shown in FIG. 45, a corresponding position block (temporally corresponding block) of an already decoded image may be selected as the syntax element merge reference block.

As still another example, in selecting the syntax element merge reference block of the current block, the syntax element merge reference block candidates may constitute a list, and according to the syntax element merge index indicating at least one of the candidates in the list, the syntax element merge reference block may be selected.

Herein, by using at least one among the spatially neighboring block, the temporally corresponding block, and the corresponding attribute block (luma-chroma) of the current block, the syntax element merge reference block candidate list is constructed.

The syntax element merge index may be a syntax element indicating which block in the list is selected as the syntax element merge reference block. Herein, the syntax element merge index may be signaled at the level of at least one among a sequence, a picture, a slice, a tile, a CTU, and a block in a predetermined size.

Hereinafter, a method of performing determination of whether the syntax element merge mode is applied and of the syntax element merge reference block simultaneously or by using one syntax element will be described.

According to information on whether the syntax element merge mode is applied and information on a syntax element merge target, whether the syntax element merge mode for the current block is applied and the syntax element merge reference block may be determined.

The information on whether the syntax element merge mode is applied and the information on the syntax element merge target may be signaled as one syntax element. For example, syntax element merge information (syntax_merge_info) may be signaled.

For example, the syntax element merge information may have at least two values. The syntax element merge information may have a first value indicating that the syntax element merge mode is not applied, and may have a second value indicating that the syntax element merge mode is applied and that which block is used as the syntax element merge reference block. Also, the syntax element merge information may have a third value indicating that the syntax element merge mode is applied and that a block other than the block indicated by the second value is used as the syntax element merge reference block. In this manner, by using fourth, fifth values, and the like of the syntax element merge information, whether the syntax element merge mode is applied and the syntax element merge reference block may be determined.

As another example, when the syntax element merge information of the current block has a first value, the syntax element merge mode is not applied to the current block.

In the meantime, when the syntax element merge information of the current block does not have a first value, the syntax element merge mode is applied to the current block.

Also, when the syntax element merge information of the current block does not have a first value, the syntax element merge mode is applied to the current block while the syntax element merge reference block is specified.

The syntax element merge information may be signaled at the level of at least one among a sequence, a picture, a subpicture, a slice, a tile, a CTU, and a block in a predetermined size.

For example, through the syntax element merge information (syntax_merge_info), whether the syntax element merge mode is applied to the current block and specification of the syntax element merge reference block may be signaled.

For example, according to Table 14 below, whether the syntax element merge mode is applied and the syntax element merge reference block may be determined by the syntax element merge information. The determination of whether the syntax element merge mode is applied and the selection of the syntax element merge reference block according to the syntax element merge information shown in Table 14 is an example, and according to various values of syntax element merge information, whether the syntax element merge mode is applied and the selection of the syntax element merge reference block may be determined.

TABLE 14

| Syntax element merge information (syntax_merge_info) | Binarization | Application of syntax element merge mode | Syntax element merge reference block |
|---|---|---|---|
| 0 | 00 | Not Applied | — |
| 1 | 01 | Applied | Block on left of current block |
| 2 | 10 | Applied | Block on top of current block |
| 3 | 11 | Applied | Block on top left of current block |

According to the example in Table 14, when the syntax element merge information of the current block has a first value, the syntax element merge mode is not applied to the current block.

When the syntax element merge information of the current block does not have a first value, the syntax element merge mode for the current block is applied while the syntax element merge reference block is specified.

When the syntax element merge information of the current block has a second value, the syntax element merge mode for the current block is applied and the syntax element merge mode is performed by referencing the block at the left position.

When the syntax element merge information of the current block has a third value, the syntax element merge mode for the current block is applied and the syntax element merge mode is performed by referencing the block at the top position.

When the syntax element merge information of the current block has a third value, the syntax element merge mode for the current block is applied and the syntax element merge mode is performed by referencing the block at the top left position.

As another example, a block partitioning syntax element for at least one among QT, BT, TT, and BTS may indicate at least one among whether the current block is partitioned and whether the partitioning information is merged. For example, according to Table 15 or Table 16 below, a BT block partitioning syntax element may be defined.

TABLE 15

| Syntax | Descriptor | Semantics | |
|---|---|---|---|
| SplitFlag | ae(v) | 0 | Non-split |
| | | 1 | Split |
| BTSplitMode | ae(v) | 0 | Non-split |
| | | 10 | Horizontal Split |
| | | 11 | Vertical Split |

TABLE 16

| BT partitioning information (BTSplitMode) | Binarization | Semantics | |
|---|---|---|---|
| 0 | 0 | Non-Split | Current block is not partitioned using BT |
| 1 | 10 | Horizontal Split | Current block is horizontally partitioned |
| 2 | 110 | Vertical Split | Current block is vertically partitioned |

TABLE 16-continued

| BT partitioning information (BTSplitMode) | Binarization | | Semantics |
|---|---|---|---|
| 3 | 1110 | Merge(left) | Current block is partitioned in the same manner as left block |
| 4 | 1111 | Merge(above) | Current block is partitioned in the same manner as upper block |

Figure 46:
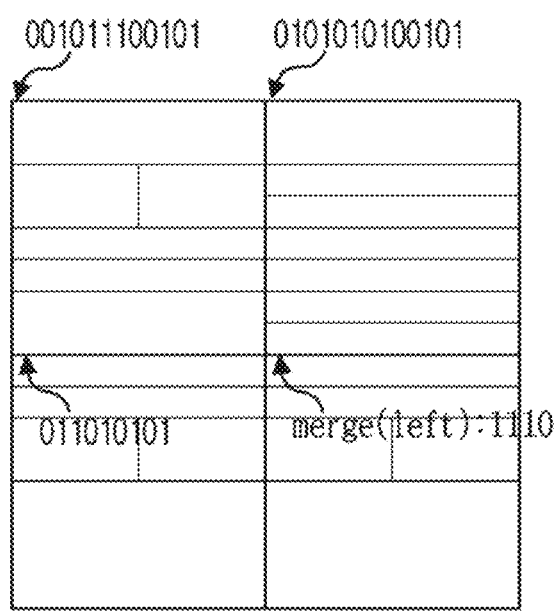
FIG. 46 is a diagram illustrating a syntax element merge mode according to an embodiment of the present invention.

FIG. 46 is a diagram illustrating a syntax element merge mode according to an embodiment of the present invention.

FIG. 46 shows binarization for representing BT partitioning at each QT leaf node. Specifically, FIG. 46 shows an example where the bottom right QT block uses the bottom left QT leaf node block as the syntax element merge reference block. That is, FIG. 46 shows an example where the bottom right block is partitioned using partitioning information of the bottom left block.

As still another example, the block partitioning syntax element of at least one among QT, BT, TT, and BTS may indicate at least one among whether the current block is partitioned and whether the partitioning information is merged, according to the partitioning depth (tree depth) of at least one among QT, BT, TT, and BTS. For example, as shown in Table 17 below, whether the block is partitioned and whether the partitioning information is merged may be determined.

TABLE 17

| Tree Depth | Partitioning information (split_mode) | Binarization | | Semantics |
|---|---|---|---|---|
| <=n | 0 | 0 | Non-Split | Current block is not partitioned |
| | 1 | 10 | Split | Current block is partitioned |
| | 2 | 110 | Merge(left) | Current block is partitioned in the same manner as left block |
| | 3 | 111 | Merge(above) | Current block is partitioned in the same manner as upper block |
| >n | 0 | 0 | Non-Split | Current block is not partitioned |
| | 1 | 1 | Split | Current block is partitioned |

For example, as shown in Table 17, when the current block has a predetermined tree depth (n) or less, the partitioning information split_mode of at least one among QT, BT, TT, and BTS has a first value to indicate that the current block is not partitioned and has a second value to indicate that the current block is partitioned. Also, the partitioning information of at least one among QT, BT, TT, and BTS may have a third value to indicate that the current block is partitioned in the same manner as the left block, and may have a fourth value to indicate that the current block is partitioned in the same manner as the upper block.

As shown in Table 17, when the current block has a depth greater than the predetermined tree depth (n), the partitioning information split_mode of at least one among QT, BT, TT, and BTS has a first value to indicate that the current block is not partitioned and has a second value to indicate that the current block is partitioned.

As another example, when the current block has a depth greater than the predetermined tree depth (n), merging of the partitioning information is not permitted and separate partitioning information is signaled.

Information on the predetermined tree depth (n) may be signaled through a bitstream, or may be predefined in the encoder and the decoder. Different predetermined tree depths (n) may be set for QT, BT, TT, and BTS, respectively, or the same value may be set for a part or all thereof.

Hereinafter, a method of encoding/decoding a syntax element of a current block by using a syntax element merge reference block will be described.

At least one among partitioning-related encoding information, prediction-related encoding information, and transform-related encoding information of the current block may be derived from the syntax element merge reference block.

Herein, the partitioning-related encoding information may include partitioning information of at least one among QT, BT, TT, and BTS.

The prediction-related encoding information may include at least one among information indicating a prediction mode of the current block, information on a merge index, information on whether CPR (current picture referencing) or IBC (Intra Block Copy) is applied, information on a reference picture index, information on a motion vector, information on a prediction direction (L0, L1, BI), information on whether affine transform prediction is applied, information on an affine transform model (4-parameter model or 6-parameter model), information on whether an adaptive motion vector resolution is applied (AMVR flag or AMVR mode), information on a motion vector resolution (1/16-pixel resolution, 1/4-pixel resolution, 1/2-pixel resolution, 1-integer-pixel resolution, or 4-integer-pixel resolution), and information related to an adaptive motion vector resolution mode.

Herein, the information on whether the adaptive motion vector resolution is applied may include a syntax element defined as amvr_flag. Herein, amvr_flag may be a value indicating the above-described AMVR flag.

Further, the information on the motion vector resolution may include a syntax element defined as amvr_precision_idx. Herein, amvr_precision_idx may be a value indicating one of the above-described motion vector resolutions.

For example, the motion vector resolution of the current block may be determined to be at least one among 1/16-pixel resolution, 1/4-pixel resolution, 1/2-pixel resolution, 1-integer-pixel resolution, and 4-integer-pixel resolution according to a combination of AMVR_flag and amvr_precision_flag.

As another example, the motion vector resolution of the current block may be determined to be at least one among 1/16-pixel resolution, 1/4-pixel resolution, 1/2-pixel resolution, 1-integer-pixel resolution, and 4-integer-pixel resolution according to AMVR_flag, amvr_precision_flag, and whether the current block operates in one of an affine mode and an IBC mode.

As still another example, the information related to the adaptive motion vector resolution mode may include a shift value that is used to change the resolution of the motion vector. Herein, the shift value may be defined as AmvrShift. The AmvrShift value may be determined depending on the amvr_flag value and amvr_precision_idx.

For example, the motion vector resolution and the AmvrShfit of the current block may be determined according to Table 18 below. In Table below, inter_affine_flag may be information indicating whether the current block operates in the affine mode, and CuPredMode may be information indicating the type of prediction mode of the current block.

TABLE 18

| | | AmvrShift | | |
|---|---|---|---|---|
| amvr_flag | amvr_precision_index | inter_affine_flag == 1 | CuPredMode[ chType ][ x0 ][ y0 ] == MODE_IBC) | inter_affine_flag == 0 && CuPredMode[ chType ][ x0 ][ y0 ] != MODE_IBC |
| 0 | — | 2 (¼ luma sample) | — | 2 (¼ luma sample) |
| 1 | 0 | 0 (1/16 luma sample) | 4 (1 luma sample) | 3 (½ luma sample) |
| 1 | 1 | 4 (1 luma sample) | 6 (4 luma sample) | 4 (1 luma sample) |
| 1 | 2 | — | — | 6 (4 luma sample) |

For example, when amvr_flag has a value of 1, when amvr_precision_idx has a value of 0, and when the current block does not operate in the affine or IBC mode, AmvrShift is determined to be 3.

Further, the information related to the adaptive motion vector resolution mode may include an interpolation filter index (HpelIfidx) for determining an interpolation filter coefficient for the current block. For example, the interpolation filter index may be determined according to the above-described AmvrShift. For example, the interpolation filter index may be determined according to Equation 38 below.

$$hpelIfIdx = AmvrShift == 3 ? 1 : 0 \qquad [\text{Equation 38}]$$

For example, when HpelIfidx of the syntax element merge reference block has a value of 1 and the motion vector of the syntax element merge reference block indicates a ½ sub-pixel position, a 6-tap interpolation filter is used as the interpolation filter for the current block. On the other hand, when HpelIfidx of the syntax element merge reference block has a value of 0 or when the motion vector indicates a position other than the ½ subpixel position, a 8-tap interpolation filter is used as the interpolation filter for the current block.

The transform-related encoding information may include at least one among information on a coded block flag (CBF), information on whether a transform skip mode is applied, information on which transform kernel is used, and residual encoding-related information.

For example, the type of transform kernel may be at least one of the following.

DST-related kernel: DST-1, DST-2, DST-3, . . . , DST-7, etc.

DCT-related kernel: DCT-1, DCT-2, DCT-3, . . . , DCT-8, etc.

KLT-related kernel: KLT-0, KLT-1, etc.

Herein, multiple kernels may be combined to specify a transform kernel set. The transform kernel set may have kernel information where the kernels in performing horizontal and vertical transform are combined. The transform kernel set may have kernel information where the kernels in performing primary transform and secondary transform (or non-separable secondary transform (NSST)) are combined.

Further, residual encoding-related information may be at least one of the following.

coded_sub_block_flag, sig_coeff_flag, coeff_abs_level_greater1_flag, coeff_abs_level_greater2_flag, coeff_sign_flag.

For example, when operating in the syntax element merge mode, the partitioning-related encoding information for the current block is derived from the syntax element merge reference block.

Figure 47:
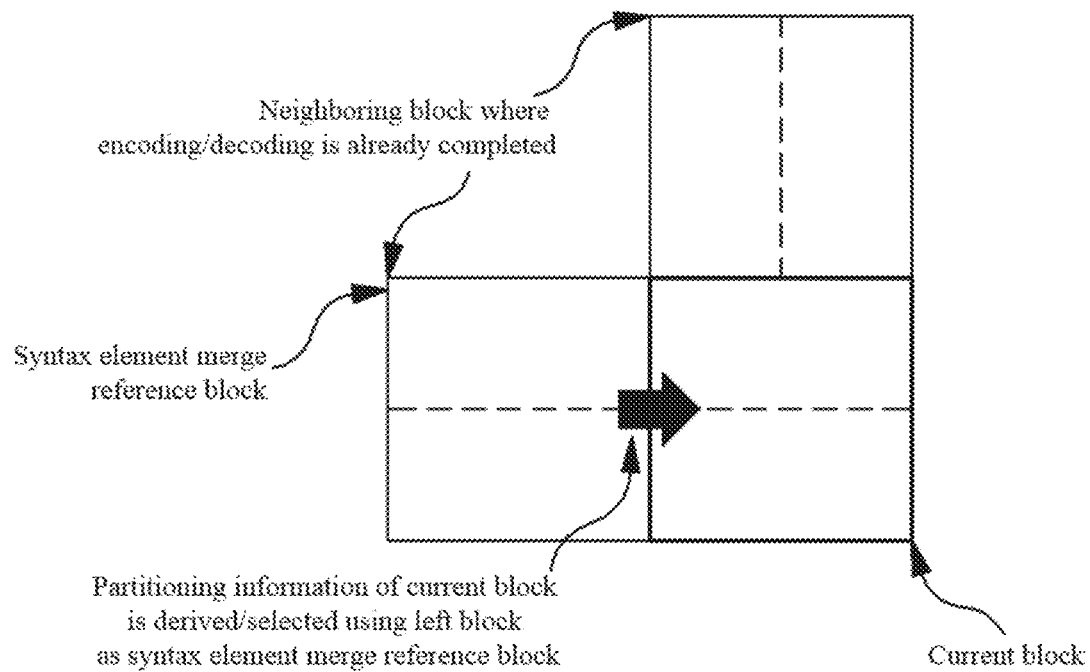
FIGS. 47 and 48 are diagrams illustrating merging of block partitioning information in a syntax element merge mode according to an embodiment of the present invention.
Figure 48:
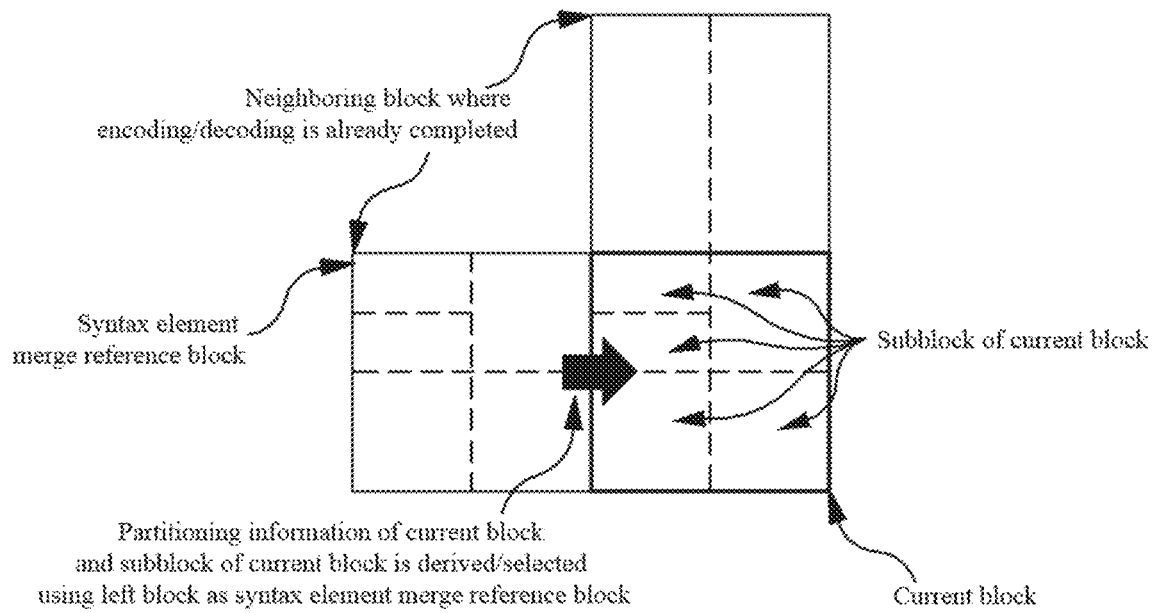

FIGS. 47 and 48 are diagrams illustrating merging of block partitioning information in a syntax element merge mode according to an embodiment of the present invention.

For example, as shown in FIG. 47, when operating in the syntax element merge mode, and when the left block is the syntax element merge reference block, partitioning information of the current block is derived from the block on the left. That is, partitioning of the current block may be performed in the same manner as that of the left block that is the syntax element merge reference block.

Further, as shown in FIG. 48, when operating in the syntax element merge mode, at least one among a block in a predetermined size, and partitioning information of sub-blocks within a block in a predetermined size is derived from the merge reference block. That is, partitioning of the current block and the subblock of the current block may be performed in the same manner as that of the syntax element merge reference block.

As another example, when operating in the syntax element merge mode, at least one of pieces of the prediction-related encoding information for the current block is derived from the syntax element merge reference block.

Figure 49:
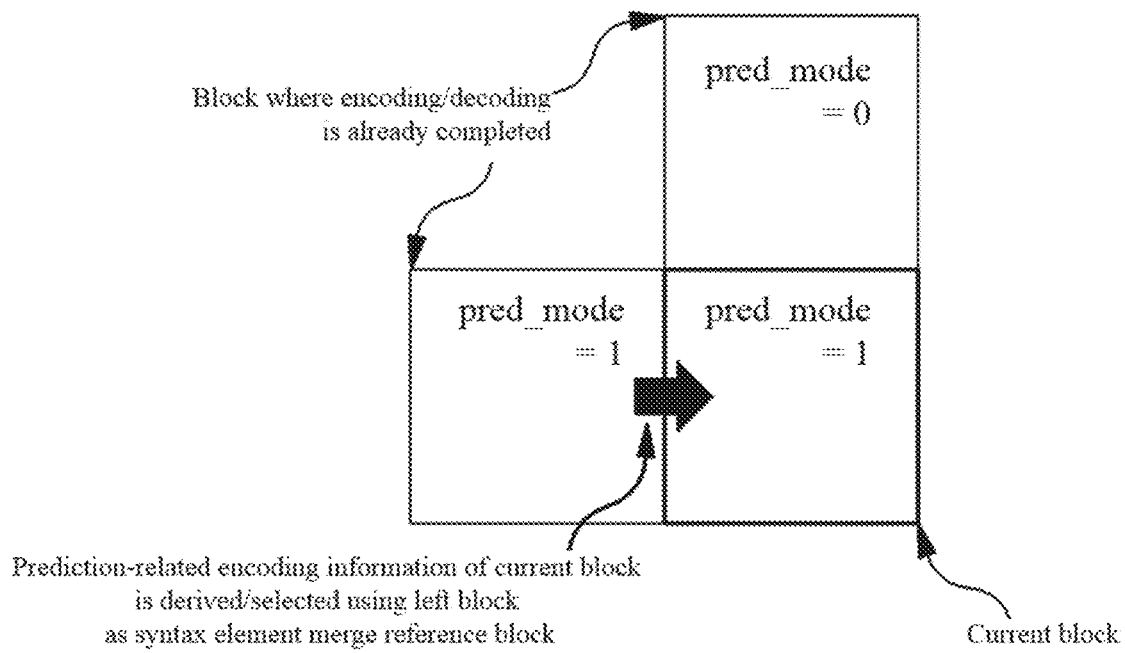
FIGS. 49 to 51 are diagrams illustrating merging of information related to a prediction mode in a syntax element merge mode according to an embodiment of the present invention.
Figure 50:
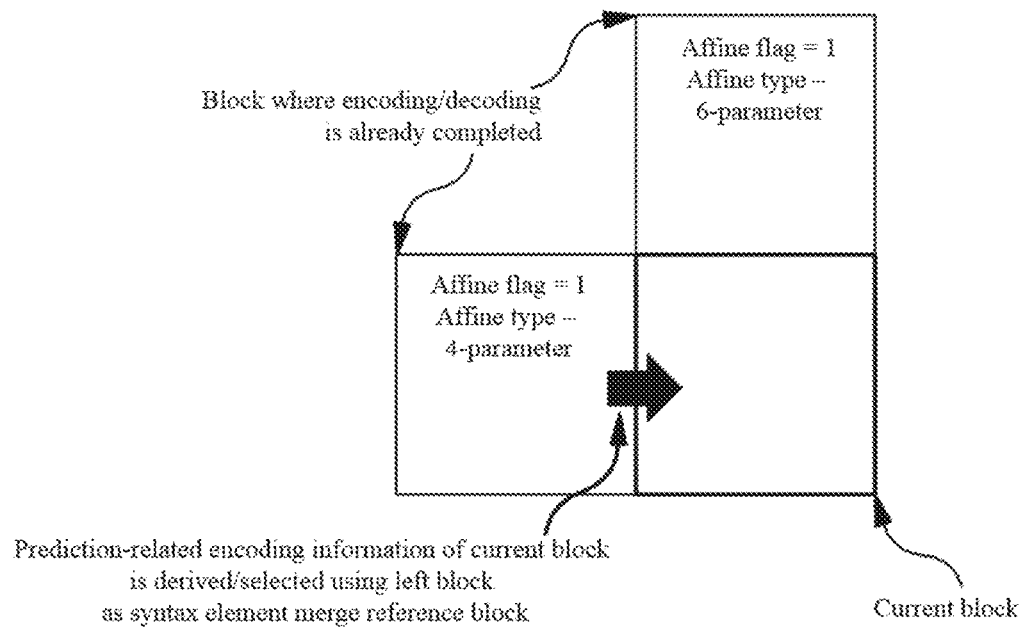
Figure 51:
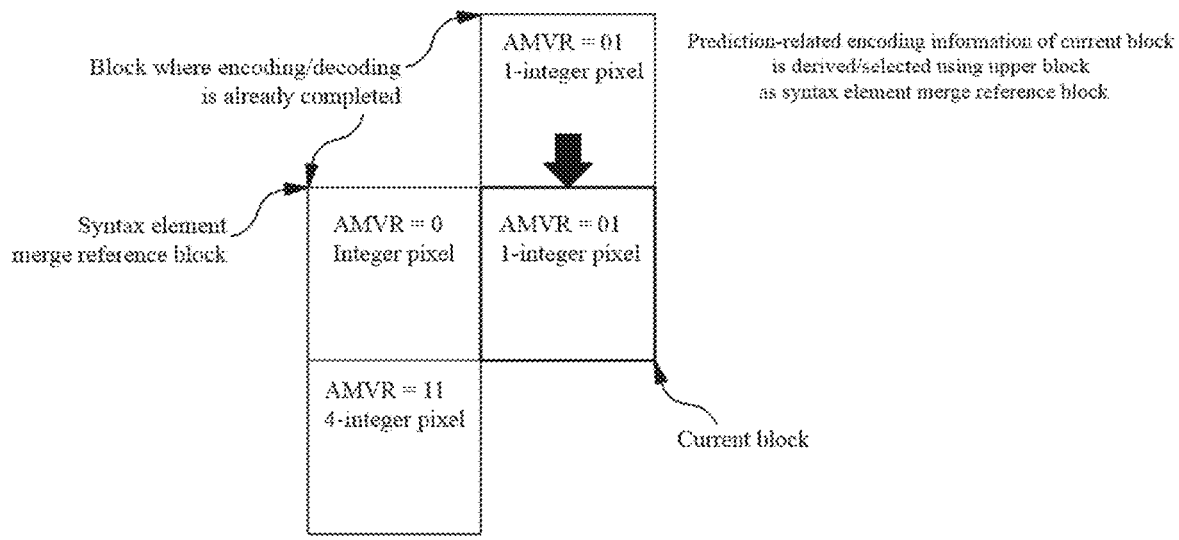

FIGS. 49 to 51 are diagrams illustrating merging of information related to a prediction mode in a syntax element merge mode according to an embodiment of the present invention.

For example, when operating in the syntax element merge mode, at least one among the information indicating the prediction mode of the current block, the information on the merge index, the information on whether CPR (current picture referencing) or IBC (Intra Block Copy) is applied, the information on the reference picture index, the information on the motion vector, the information on the prediction direction (L0, L1, BI), the information on whether affine transform prediction is performed, the information on the affine transform model (4-parameter model or 6-parameter model), the information on whether the adaptive motion vector resolution is applied (AMVR flag or AMVR mode), and the information on the motion vector resolution (¼-pixel resolution, ½-pixel resolution, 1-integer-pixel resolution, and 4-integer-pixel resolution) is derived from the syntax element merge reference block.

For example, as shown in FIG. 49, when operating in the syntax element merge mode, the pred_mode value of the current block is derived from the left syntax element merge reference block. That is, the pred_mode value of the left syntax element merge reference block may be derived as the pred_mode value of the current block.

As another example, as shown in FIG. 50, when operating in the syntax element merge mode, affine_flag and affine_type values of the current block are derived from the left syntax element merge reference block. That is, affine flag and affine_type values of the left syntax element merge reference block may be derived as affine flag and affine_type values of the current block.

As still another example, as shown in FIG. 51, when operating in the syntax element merge mode, the AMVR mode of the current block is derived from the upper syntax element merge reference block. That is, the AMVR mode of the upper syntax element merge reference block may be determined as the AMVR mode of the current block.

As still another example, when operating in the syntax element merge mode, the interpolation filter index (HpelIfidx) for determining the interpolation filter coefficient of the current block is derived from the syntax element merge reference block. That is, the interpolation filter index of the syntax element merge reference block may be determined as the interpolation filter index of the current block.

Specifically, when operating in the syntax element merge mode, the interpolation filter index (HpelIfidx) for determining the interpolation filter coefficient of the current block is derived using amvr_flag and amvr_precision_idx of the syntax element merge reference block. That is, the interpolation filter index of the syntax element merge reference block may be determined as the interpolation filter index of the current block. As still another example, when operating in the syntax element merge mode, at least one of the pieces of the transform-related encoding information for the current block is derived from the syntax element merge reference block.

For example, when operating in the syntax element merge mode, at least one among information on the coded block flag (CBF), information on whether the transform skip mode is applied, information on any transform kernel, and the residual encoding-related information is derived from the syntax element merge reference block.

For example, when operating in the syntax element merge mode, transform kernel information (TrIdx) of the current block is derived from the syntax element merge reference block.

Figure 52:
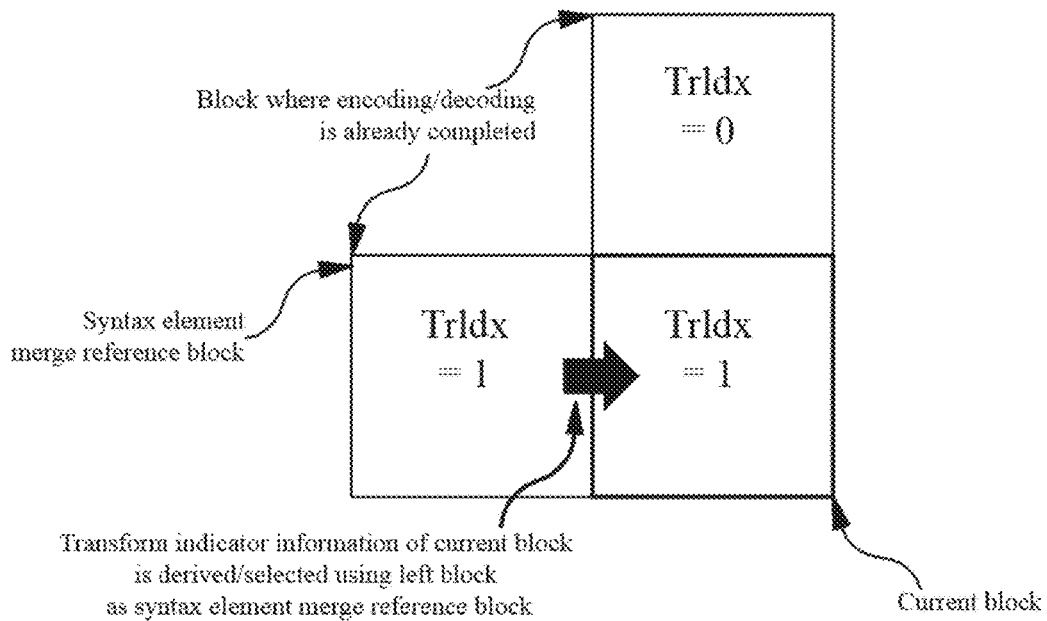
FIG. 52 is a diagram illustrating merging of information related to a transform indicator in a syntax element merge mode according to an embodiment of the present invention.

FIG. 52 is a diagram illustrating merging of information related to a transform indicator in a syntax element merge mode according to an embodiment of the present invention.

For example, the transform kernel information (TrIdx) may indicate the use of the transform kernel set according to Table 19.

TABLE 19

| Transform kernel information(Tridx) | Binarization | Transform kernel |
| --- | --- | --- |
| 0 | 00 | Transform kernel set 1 |
| 1 | 01 | Transform kernel set 2 |
| 2 | 10 | Transform kernel set 3 |
| 3 | 11 | Transform kernel set 4 |

For example, as shown in FIG. 52, when operating in the syntax element merge mode, the value of the transform kernel information of the current block is derived from the left syntax element merge reference block. That is, the value of the transform kernel information of the left syntax element merge reference block may be determined as the value of the transform kernel information of the current block.

As another example, when operating in the syntax element merge mode, and when the syntax element merge reference block uses at least one among non-separable secondary transform (NSST), and secondary transform, the current block may use the same method among the non-separable secondary transform (NSST), and the secondary transform.

For example, when operating in the syntax element merge mode, a value of a flag (nsst_flag) for indicating whether the NSST is used is derived from the syntax element merge reference block. That is, the nsst_flag value of the syntax element merge reference block may be determined as the nsst_flag value of the current block.

For example, NSST transform kernel information (NSST_TrIdx) or secondary transform kernel information (Second_TrIdx) may indicate the use of the transform kernel set according to Table 20.

TABLE 20

| NSST transform kernel information (NSST_TrIdx) or Secondary transform kernel information (Second_TrIdx) | Binarization | Transform kernel |
| --- | --- | --- |
| 0 | 00 | Transform kernel set 1 |
| 1 | 01 | Transform kernel set 2 |
| 2 | 10 | Transform kernel set 3 |
| 3 | 11 | Transform kernel set 4 |

For example, when operating in the syntax element merge mode, the value of the NSST transform kernel information (NSST_TrIdx) of the current block is derived from the syntax element merge reference block. That is, the value of NSST_TrIdx of the syntax element merge reference block may be determined as the value of NSST_TrIdx of the current block.

Further, when operating in the syntax element merge mode, a value of a flag (secondtr_flag) for indicating whether the secondary transform is used is derived from the syntax element merge reference block. That is, the value of secondtr_flag of the syntax element merge reference block may be determined as the value of secondtr_flag of the current block.

Further, when operating in the syntax element merge mode, the value of secondary transform kernel information (Second_TrIdx) of the current block is derived from the syntax element merge reference block. That is, the value of Second_TrIdx of the syntax element merge reference block may be determined as the value of Second_TrIdx of the current block.

As still another example, when operating in the syntax element merge mode, and when the syntax element merge reference block uses a transform kernel of one of DST types, the current block uses the transform kernel of the same DST type.

As still another example, when operating in the syntax element merge mode, and when the syntax element merge reference block uses a transform kernel of one of the DCT types, the current block uses the transform kernel of the same DCT type.

For example, when operating in the syntax element merge mode, a value of a flag (DCT_flag) for indicating whether the DCT-2 type is used is derived from the syntax element merge reference block. That is, the value of DCT_flag of the syntax element merge reference block may be determined as the value of DCT_flag of the current block.

Herein, DCT_flag may indicate whether the current block is subjected to horizontal and vertical transform using a DCT-2 transform kernel.

As still another example, when the syntax element merge reference block uses a particular transform kernel with multiple transform selection (MTS), the current block uses the same transform kernel with MTS.

For example, when operating in the syntax element merge mode, a value of a flag (at least one among MTS_flag, MTS_vertical_transform_flag, and MTS_Horizontal_transform_flag) indicating which transform kernel is used for horizontal and vertical transform of the MTS is derived from the syntax element merge reference block. That is, at least one of the values of MTS_flag, MTS_vertical_transform_flag, and MTS_Horizontal_transform_flag of the syntax element merge reference block may be determined to be at least one of the values of MTS_flag, MTS_vertical_transform_flag, and MTS_Horizontal_transform_flag of the current block.

For example, use of MTS_vertical_transform_flag and of MTS_Horizontal_transform_flag may be determined according to MTS_flag. For example, the transform kernel indicated by MTS_flag may be determined according to Table 21 below.

TABLE 21

| MTS_flag | Transform orientation flag of MTS | | Transform kernel |
|---|---|---|---|
| 0 | — | — | DCT-2 (for vertical and horizontal transform) |
| 1 | MTS_vertical_transform_flag | 0 | DST-7 |
|   |   | 1 | DCT-8 |
|   | MTS_horizontal_transform_flag | 0 | DST-7 |
|   |   | 1 | DCT-8 |

In the example in Table 21, when the MTS_flag has a first value, horizontal and vertical transform is performed on the current block using the DCT-2 transform kernel. On the other hand, when the MTS_flag has a second value, horizontal and vertical transform is performed on the current block using the transform kernel determined according to the values of MTS_vertical_transform_flag and MTS_Horizontal_transform_flag.

When MTS_vertical_transform_flag has a first value, a DST-7 transform kernel is applied for vertical transform. On the other hand, when MTS_vertical_transform_flag has a second value, a DCT-8 transform kernel is applied.

When MTS_Horizontal_transform_flag has a first value, a DST-7 transform kernel is applied for horizontal transform. On the other hand, when MTS_Horizontal_transform_flag has a second value, a DCT-8 transform kernel is applied.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A method of decoding an image using a bitstream comprising:
   determining an intra prediction mode for a current block using at least one of a first indicator, a second indicator, a third indicator and a fourth indicator from the bitstream; and
   performing intra prediction on the current block based on the intra prediction mode for the current block,
   wherein:
   one of a first intra prediction mode and a plurality of second intra prediction modes is used as the intra prediction mode for the current block in a case in which a first value of the first indicator is equal to a first predefined value,
   the first intra prediction mode is used as the intra prediction mode for the current block in a case in which the first value of the first indicator is equal to the first predefined value and a second value of the second indicator is equal to a second predefined value,
   one of the plurality of the second intra prediction modes is used as the intra prediction mode for the current block in a case in which the first value of the first indicator is equal to the first predefined value and the second value of the second indicator is not equal to the second predefined value,
   the third indicator indicates one of the plurality of the second intra prediction modes which is used as the intra prediction mode for the current block in a case in which the first value of the first indicator is equal to the first predefined value and the second value of the second indicator is not equal to the second predefined value,
   one of a plurality of third intra prediction modes is used as the intra prediction mode for the current block using the fourth indicator in a case in which the value of the first indicator is not equal to the first predefined value,
   the fourth indicator indicates one of the plurality of the third intra prediction modes which is used as the intra prediction mode for the current block in a case in which the value of the first indicator is not equal to the first predefined value, and
   the plurality of the third intra prediction modes don't comprise the first intra prediction mode and the plurality of the second intra prediction modes.

2. The method of claim 1, wherein the plurality of the second intra prediction modes are a plurality of Most Probable Mode (MPM) candidates in a MPM list, and
   the plurality of the MPM candidates are determined intra prediction modes of a plurality of neighboring block adjacent to the current block.

3. The method of claim 1, wherein the first intra prediction mode is a planar mode, and
   a plurality of predefined intra prediction modes are used as the plurality of the second intra prediction modes.

4. The method of claim 1, wherein
   the plurality of the third intra prediction modes are derived in a case in which the first indicator indicates that the intra prediction mode for the current block is not comprised in the first intra prediction mode and the plurality of the second intra prediction modes.

5. A method of encoding an image comprising:
   determining an intra prediction mode for a current block; and
   performing intra prediction on the current block based on the intra prediction mode for the current block,
   wherein:
   a bitstream comprising at least one of a first indicator, a second indicator, a third indicator and a fourth indicator is generated,
   one of a first intra prediction mode and a plurality of second intra prediction modes is used as the intra prediction mode for the current block in a case in which a first value of the first indicator is equal to a first predefined value,
   the first intra prediction mode is used as the intra prediction mode for the current block in a case in which the first value of the first indicator is equal to the first predefined value and a second value of the second indicator is equal to a second predefined value,
   one of the plurality of the second intra prediction modes is used as the intra prediction mode for the current block in a case in which the first value of the first indicator is equal to the first predefined value and the second value of the second indicator is not equal to the second predefined value,
   the third indicator indicates one of the plurality of the second intra prediction modes which is used as the intra prediction mode for the current block in a case in which the first value of the first indicator is equal to the first predefined value and the second value of the second indicator is not equal to the second predefined value,
   one of a plurality of third intra prediction modes is used as the intra prediction mode for the current block using in a case in which the value of the first indicator is not equal to the first predefined value,
   the fourth indicator indicates one of the plurality of the third intra prediction modes which is used as the intra prediction mode for the current block in a case in which the value of the first indicator is not equal to the first predefined value, and the plurality of the third intra prediction modes don't comprise the first intra prediction mode and the plurality of the second intra prediction modes.

6. The method of claim 5, wherein the plurality of the second intra prediction modes are a plurality of Most Probable Mode (MPM) candidates in a MPM list, and the plurality of the MPM candidates are determined intra prediction modes of a plurality of neighboring block adjacent to the current block.

7. The method of claim 5, wherein the first intra prediction mode is a planar mode, and a plurality of predefined intra prediction modes are used as the plurality of the second intra prediction modes.

8. The method of claim 5, wherein encoding an MPM-excluded intra prediction mode indicator for the current block when the intra prediction mode of the current block is included in neither of the first MPM candidate and the plurality of the second MPM candidates, wherein the MPM-excluded intra prediction mode indicator indicates one of the intra prediction modes excluding MPM candidates that are included in either the first MPM candidate or the plurality of the second MPM candidates among all the intra prediction modes, the plurality of the third intra prediction modes are derived in a case in which the first indicator indicates that the intra prediction mode for the current block is not comprised in the first intra prediction mode and the plurality of the second intra prediction modes.

9. A non-transitory computer-readable recording medium storing a bitstream, the bitstream comprising:

at least one of a first indicator, a second indicator, a third indicator and a fourth indicator, wherein an intra prediction mode for a current block is determined using at least one of the first indicator, the second indicator, the third indicator and the fourth indicator, intra prediction on the current block is performed based on the intra prediction mode for the current block, one of a first intra prediction mode and a plurality of second intra prediction modes is used as the intra prediction mode for the current block in a case in which a first value of the first indicator is equal to a first predefined value, the first intra prediction mode is used as the intra prediction mode for the current block in a case in which the first value of the first indicator is equal to the first predefined value and a second value of the second indicator is equal to a second predefined value, one of the plurality of the second intra prediction modes is used as the intra prediction mode for the current block in a case in which the first value of the first indicator is equal to the first predefined value and the second value of the second indicator is not equal to the second predefined value, the third indicator indicates one of the plurality of the second intra prediction modes which is used as the intra prediction mode for the current block in a case in which the first value of the first indicator is equal to the first predefined value and the second value of the second indicator is not equal to the second predefined value, one of a plurality of third intra prediction modes is used as the intra prediction mode for the current block using the fourth indicator in a case in which the value of the first indicator is not equal to the first predefined value, the fourth indicator indicates one of the plurality of the third intra prediction modes which is used as the intra prediction mode for the current block in a case in which the value of the first indicator is not equal to the first predefined value, and the plurality of the third intra prediction modes don't comprise the first intra prediction mode and the plurality of the second intra prediction modes.

* * * * *